(12) United States Patent
Muenzel et al.

(10) Patent No.: US 12,062,815 B2
(45) Date of Patent: Aug. 13, 2024

(54) BATTERY SYSTEM

(71) Applicant: RELECTRIFY HOLDINGS PTY LTD, Melbourne (AU)

(72) Inventors: Jan Valentin Muenzel, Melbourne (AU); Daniel Crowley, Melbourne (AU)

(73) Assignee: RELECTRIFY HOLDINGS PTY LTD, Melbourne (AU)

(*) Notice: Subject to any disclaimer, the term of this patent is extended or adjusted under 35 U.S.C. 154(b) by 739 days.

(21) Appl. No.: 17/314,453

(22) Filed: May 7, 2021

(65) Prior Publication Data

US 2021/0265710 A1  Aug. 26, 2021

Related U.S. Application Data

(63) Continuation-in-part of application No. 16/737,161, filed on Jan. 8, 2020, now Pat. No. 11,264,812, which
(Continued)

(30) Foreign Application Priority Data

Sep. 30, 2015 (AU) ................. 2015903990

(51) Int. Cl.
*H01M 50/51* (2021.01)
*H01M 10/44* (2006.01)
(Continued)

(52) U.S. Cl.
CPC ....... *H01M 50/543* (2021.01); *H01M 10/441* (2013.01); *H01M 10/482* (2013.01); *H01M 50/51* (2021.01); *H02J 7/0024* (2013.01)

(58) Field of Classification Search
CPC .. H01M 50/543; H01M 50/51; H01M 10/441; H01M 10/482; H02J 7/0024
See application file for complete search history.

(56) References Cited

U.S. PATENT DOCUMENTS 3,923,116 A   12/1975 Thomspon et al.
6,043,628 A    3/2000 Perelle et al.
(Continued)

FOREIGN PATENT DOCUMENTS

EP   1273372 B1   2/2009
JP   2010220280 A  * 9/2010  .......... H01M 10/482
WO  2014/012794   1/2014

OTHER PUBLICATIONS

JP 2010220280MT (Year: 2010).*
(Continued)

*Primary Examiner* — Alexander Usyatinsky
(74) *Attorney, Agent, or Firm* — Studebaker & Brackett PC

(57) ABSTRACT

Circuit module for coupling a plurality of battery cell units. The circuit module includes a first set of terminals having a positive terminal and a negative terminal for coupling to a first battery cell unit, and a second set of terminals having a positive terminal and a negative terminal for coupling to a second battery cell unit. The positive terminal of the first set of terminals is coupled to the negative terminal of the second set of terminals either directly or via one or more passive components, and the negative terminal of the first set of terminals and the positive terminal of the second set of terminals each is coupled to a switching assembly. The switching assembly is operatively configured to selectively connect or bypass each one of the battery cell units. The invention is also directed to a battery system including the circuit module and a plurality of battery cell units.

16 Claims, 20 Drawing Sheets

Related U.S. Application Data is a continuation-in-part of application No. 15/760,173, filed as application No. PCT/AU2016/050917 on Sep. 29, 2016, now Pat. No. 10,573,935.

(51) Int. Cl.
*H01M 10/48* (2006.01)
*H01M 50/543* (2021.01)
*H02J 7/00* (2006.01)

(56) References Cited

U.S. PATENT DOCUMENTS

| | | | |
|---|---|---|---|
| 6,140,799 | A | 10/2000 | Thomasson |
| 6,430,692 | B1 | 8/2002 | Kimble et al. |
| 8,816,613 | B2 | 8/2014 | Lee |
| 9,450,274 | B2 | 9/2016 | Vo et al. |
| 2004/0164706 | A1 | 8/2004 | Osborne |
| 2007/0062744 | A1 | 3/2007 | Weidenheimer et al. |
| 2007/0275593 | A1* | 11/2007 | Barwick ............ H01M 50/213 439/500 |
| 2009/0128158 | A1 | 5/2009 | Kawai |
| 2010/0261047 | A1 | 10/2010 | Kim et al. |
| 2012/0091802 | A1 | 4/2012 | Adelson et al. |
| 2012/0091964 | A1 | 4/2012 | Vance et al. |
| 2013/0062946 | A1* | 3/2013 | Ferber, Jr. ............ H02J 7/0024 307/43 |
| 2014/0015488 | A1* | 1/2014 | Despesse ............ H01M 10/441 429/7 |
| 2016/0336623 | A1 | 11/2016 | Nayar et al. |

OTHER PUBLICATIONS

The Decision of KPO to grant a Patent for Application KR 20187012288 (Year: 2023).*

Supplementary European Search Report from corresponding EP Application No. EP16849956; mail date May 8, 2019, pp. 1-8.

International Search Report mailed Nov. 7, 2016, in International Application No. PCT/AU2016/050917, filed Sep. 29, 2016, in 4 pages.

International Preliminary Report on Patentability mailed Dec. 20, 2017 in International Application No. PCT/AU2016/050917, filed Sep. 29, 2016, in 50 pages.

International-Type Search Report dated Nov. 24, 2017 for related Australian Application No. 2017900386, filed Feb. 8, 2017, in 9 pages.

* cited by examiner

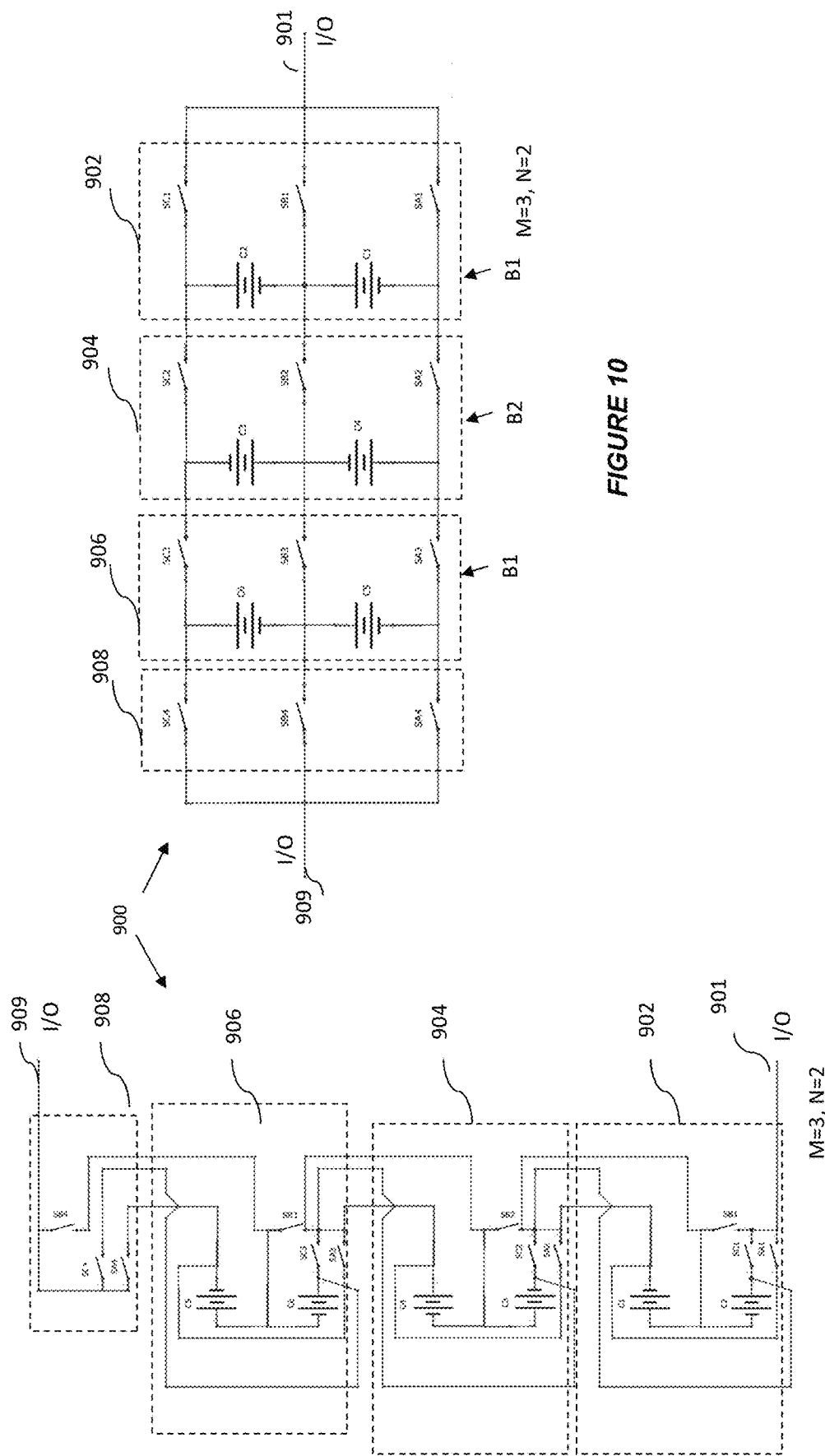

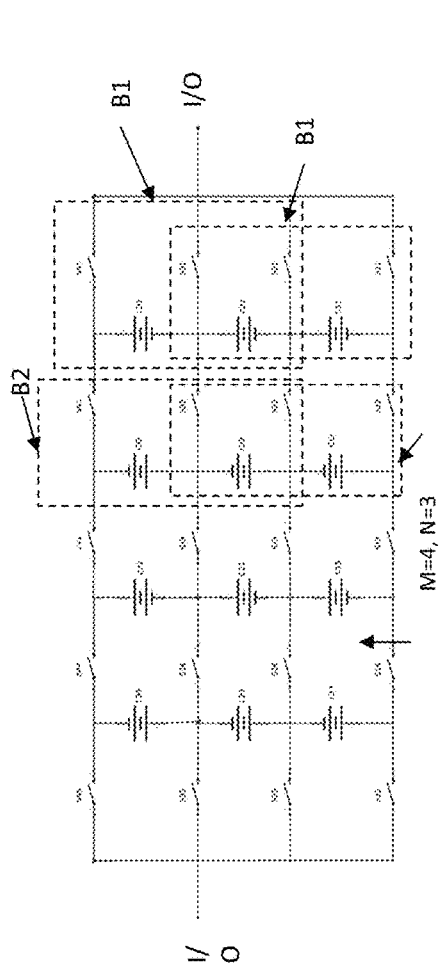
FIGURE 14A
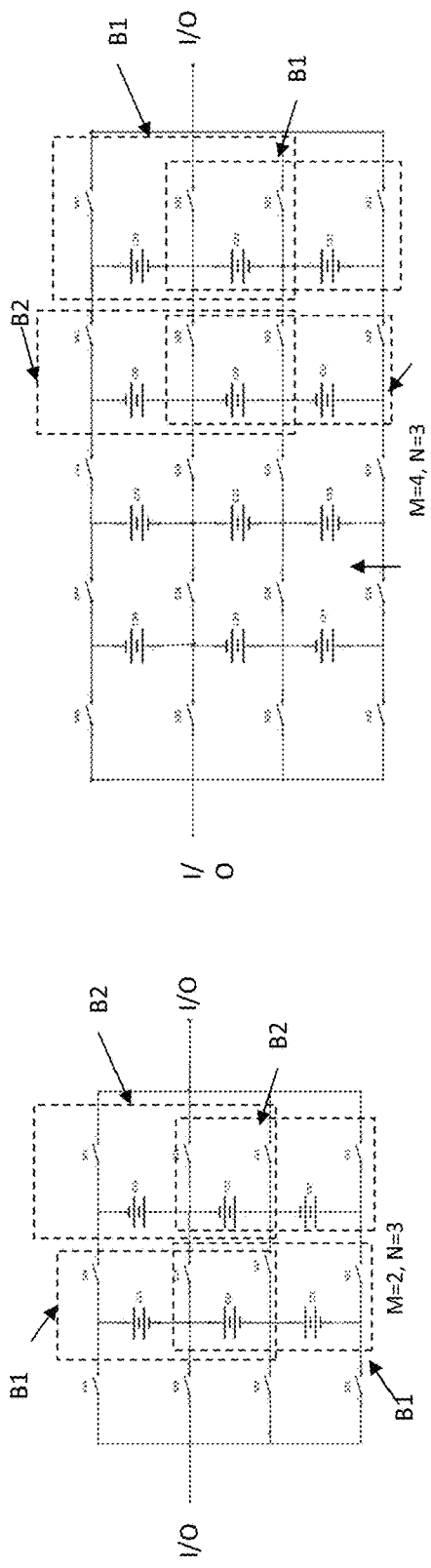
FIGURE 13
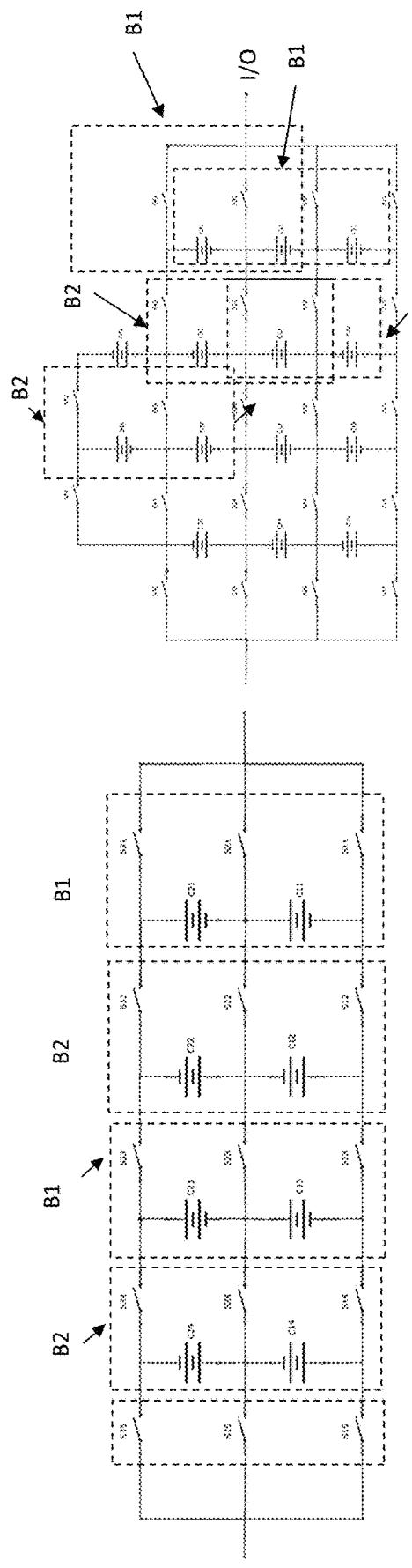
FIGURE 15
FIGURE 14B

BATTERY SYSTEM

TECHNICAL FIELD

The invention described herein generally relates to energy storage systems such as battery systems.

BACKGROUND ART

Energy storage systems for applications such as full electric vehicles, hybrid electric vehicles, and stationary energy storage in grid connected or off grid applications, frequently include an arrangement of multiple energy storage cell units. Each cell unit is limited by its functional mechanism and design to provide an output voltage within a certain range depending on its state of charge and operating conditions. Each cell unit is also limited by its functional mechanism and design to provide a certain maximum charge storage capability, depending on the operating conditions. Electrically connecting cell units in series increases the maximum achievable output voltage, therefore decreasing the magnitude of current required to supply a given power output. This increases the system efficiency as ohmic losses increase with current magnitude. Electrically connecting cell units in parallel increases the maximum achievable storage capacity for a given cell unit capacity and storage system output voltage level.

The individual cell units inevitably display some differences in terms of charge storage capacity, internal resistance, and other performance related factors. Even before entering their operating life, cell units inevitably have differences caused by manufacturing tolerances that allow for certain variations in cell units during manufacturing with even the most advanced state of the art manufacturing processes. Throughout the operating life, variations in cell unit performance degradation conditions or profiles further contribute to these differences. In applications in which used cell units are recycled for re-use, the cell units can be associated with notable performance differences, particularly if the cell units have been exposed to different usage profiles. Utilising cell units with different specifications can also contribute to cell unit differences.

In energy storage systems that include multiple energy storage units, such differences between cell units can impact how the overall energy storage system is managed and performs. In cell units that are electrically connected in parallel, lower performing cell units contribute or accept a lower current during a discharge or charge process, respectively. This leads to higher performing cell units contributing to or accept a higher current during a discharge or charge process, respectively. Such rate increases can decrease the system efficiency, increase cell unit degradation, and potentially present safety risks. It is therefore often necessary to constrain the entire system to a lower power input or output level. In cell units that are electrically connected in series, lower charge capacity cell units can contribute or accept less electric charge during a discharge or charge process, respectively. Due to the series arrangement, higher charge capacity cell units are limited to contribute only an equal amount of charge as the lowest charge capacity cell unit. This means that the cell unit with the lowest charge capacity limits the charge storage capacity of the full energy storage system.

Conventional battery management systems typically use switched resistors to dissipate surplus energy from higher charged cell units, or switched capacitors or switched inductors to transfer energy from higher charged cell units to lower charged cell units. The primary role of these systems is to equalise the state of charge differences of cell units connected in series at a particular point in the charge discharge cycles, for example at the end of charging. Equalising the state of charge at one specific point in the cycle ensures that the lowest capacity cell unit in a series arrangement is able to be fully used. It does not, however, allow higher capacity cell units to contribute more energy to the output.

For example, assume two fully charged battery cell units connected in a series arrangement have capacities for 1 Ah and 10 Ah, respectively. If this system discharges at a rate of 1 A then, assuming no equalisation during the discharge, the entire system has a discharge time of one hour during which it will provide 2 Ah consisting of 1 Ah from the lower capacity cell unit and 1 Ah from the higher capacity cell unit.

In order to overcome the limitations posed by the lowest capacity cell unit in an energy storage system comprising multiple cell units connected in series, a more advanced approach is required. Switched capacitor or switched inductor balancing systems can be operated to transfer energy on a continuous basis, for example transferring energy from higher charge capacity cell units to lower charge capacity cell units throughout part or all of the discharge process. However, the electrical pathways and components used to equalise the cell units are typically rated to energy throughputs that are only a fraction of the rating of the full energy storage system. As such, the systems typically can only account for a fraction of the difference between the cell units.

For example, assume two fully charged battery cell units connected in a series arrangement have capacities for 1 Ah and 10 Ah, respectively. If this system discharges at a rate of 1 A and additionally transfers energy from the lower charged cell unit to the higher charged cell unit at a rate of 0.1 A, then after one hour, the system has provided a capacity of 2 Ah. At this point, due to the energy transfer, the lower charge capacity cell unit still holds 0.1 Ah and the higher charge capacity cell unit still holds 8.9 Ah, allowing discharging to be continued for approximately 0.1 hours longer and resulting in a full energy storage system capacity that is around 0.2 Ah larger than without any equalisation system. The additional discharge time and energy that can be maintained from higher charge capacity cell units increases with the energy rating of the equalisation system, which can increase the cost and space requirements among other factors. This leads such battery management approaches to predominantly be useful for energy storage systems with relatively small differences only, such as energy storage systems based on not previously used cell units with the same specifications. Furthermore, using switched capacitors or switched inductors requires energy to be transferred via intermediary storage devices such as capacitors or inductors, respectively, which can be associated with losses that negatively impact the full energy storage system efficiency.

A further method to address the limitations posed by differences between cell units that are connected in series is to use voltage converters. Typically, each cell unit is connected to one voltage converter, and the voltage converters are connected in parallel leading to a coupling on the direct current side. This can then be either directly or via a further voltage converter connected to an inverter. Another option is to connect each cell unit to one voltage converter, and connect each voltage converter to an inverter and connect the inverters in parallel so that the energy from the cell units is connected on the alternating current side. A further option is to use voltage converters with the output connected in series. Disadvantages of using voltage converters include the considerable component cost of converters, some prospective limitations in controllability of cell charging and discharging depending on controller type and layout, and the limited efficiency of voltage converters, partly due to energy losses in storage elements used for voltage conversion such as inductors and/or capacitors.

Switches can also be used to connect or bypass the cell units. By bypassing lower-performing cell units, additional charge and discharge capacity can be unlocked from the other cell units. Some disadvantages of current systems using this approach are that for each cell unit connected in series, an additional switch is placed in any given current path contributing an associated on-resistance and energy loss.

It is an aim of the invention to provide a battery system which overcomes or ameliorates one or more of the disadvantages or problems described above, or which at least provides the consumer with a useful choice.

SUMMARY OF THE INVENTION

According to another aspect of the invention, there is a circuit module for coupling a plurality of battery cell units, the circuit module including
- a first set of terminals having a positive terminal and a negative terminal for coupling to a first battery cell unit,
- a second set of terminals having a positive terminal and a negative terminal for coupling to a second battery cell unit,
- a third set of terminals having a positive terminal and a negative terminal for coupling to a third battery cell unit, and
- a fourth set of terminals having a positive terminal and a negative terminal for coupling to a fourth battery cell unit,
- the positive terminal of the first set of terminals being coupled to the negative terminal of the second set of terminals either directly or via one or more passive components,
- the positive terminal of the third set of terminals being coupled to the negative terminal of the fourth set of terminals either directly or via one or more passive components,
- the negative terminal of the first set of terminals, the positive terminal of the second set of terminals, at least one of the terminals of the third set of terminals and at least one of the terminals of the fourth set of terminals each being coupled to a switching assembly, and
- wherein the switching assemblies are operatively configured to selectively connect or disconnect each one of the battery cell units, each switching assembly including one or more switching devices, each switching device operable in a conductive state and a non-conductive state,
- wherein the switching assemblies are operatively configured to selectively allow operating in a plurality of states in which any two or more battery cell units are connected in series, each state including a charging cycle and a discharging cycle of the battery cell units connected in series, the plurality of states including
  - a first state in which the first battery cell unit and the second battery cell unit are electrically connected in series and the third battery cell unit is disconnected,
  - a second state in which the second battery cell unit and the third battery cell unit are electrically connected in series and the first battery cell unit is disconnected,
  - a third state in which the first battery cell unit, the second battery cell unit, the third battery cell unit and the fourth battery cell unit are electrically connected in series,
  - a fourth state in which the first battery cell unit and the fourth battery cell unit are electrically connected in series and the second battery cell unit and the third battery cell unit are disconnected; and
- wherein the first battery cell unit, the second battery cell unit, the third battery cell unit and the fourth battery cell unit are adjacently positioned to one another such that the third state is achieved via a connection path having a minimum number of conducting switching devices within the circuit module, and
- wherein when the second battery cell unit and the third battery cell unit are connected in series, a series connection path between the second battery cell unit and the third battery cell unit includes a maximum of two switching devices operating in the conductive state.

In some embodiments, the switching assemblies are operatively configured to selectively allow operating in a plurality of connection modes, the plurality of connection modes including
- a first connection mode in which a series-connection of two or more battery cell units connect to the circuit module output in a first electrical polarity, and
- a second connection mode in which a series-connection of two or more battery cell units connect to the circuit module output in a second polarity that differs from the electrical polarity of the first electrical polarity.

In some embodiments, a series connection path between the second battery cell unit and the third battery cell unit includes a maximum of one switching device operating in the conductive state when the second battery cell unit and the third battery cell unit are connected in series.

In some embodiments, the circuit module is configured to connect a battery cell unit to a non-adjacent battery cell unit with at most one closed switch in a current path therebetween.

In some embodiments, the ratio of conductive switching devices to battery cell units is less than one during operation of the circuit module in any switching state of the switching assemblies.

In some embodiments, a ratio of conducting switching devices to active battery cell units is less than one during operation of the circuit module in one of the plurality of states.

In some embodiments, a ratio of conducting switching devices to active battery cell units is less than one during operation of the circuit module in one of the plurality of states.

In some embodiments, each switching assembly includes a first switching device for connecting an associated battery cell unit, and a second switching device for disconnecting the associated battery cell unit.

In some embodiments, the switching assemblies include one or more transistors.

In some embodiments, the switching assemblies are operatively configured to selectively connect or disconnect any one or more of the battery cell units according to a desired total voltage output from the plurality of battery cell units.

In some embodiments, the module further includes a battery mount configured to allow one or more battery cell units to be mounted for coupling to the circuit module, wherein all switching assemblies of the circuit module are located to one side of the battery mount.

In some embodiments, the module further includes a controller configured to control the switching assemblies of the circuit module.

In some embodiments, the module further includes the controller is configured to control the switching assemblies based on a determined charge and discharge behaviour of the battery cell units.

In some embodiments, the controller is configured to determine the charge and discharge behaviour of each battery cell unit based on the voltage, current and/or temperature of the battery cell unit during charging and/or discharging.

In some embodiments, the controller is configured to:
compare a measured voltage, current and/or temperature of the battery cell unit with predetermined voltage, current and/or temperature ranges,
determine the battery cell units to connect and/or bypass based on the comparison, and control the switching assemblies to connect or bypass each battery cell unit based on the determination.

In another aspect of the invention, there is a battery system including:
one or more of the above described circuit modules, and
a plurality of battery cell units coupled to the circuit module.

According to another aspect of the invention, there is provided a circuit module for coupling a plurality of battery cell units, the circuit module including a first set of terminals having a positive terminal and a negative terminal for coupling to a first battery cell unit, a second set of terminals having a positive terminal and a negative terminal for coupling to a second battery cell unit, a third set of terminals having a positive terminal and a negative terminal for coupling to a third battery cell unit, and a fourth set of terminals having a positive terminal and a negative terminal for coupling to a fourth battery cell unit, the positive terminal of the first set of terminals being coupled to the negative terminal of the second set of terminals either directly or via one or more passive components, the positive terminal of the third set of terminals being coupled to the negative terminal of the fourth set of terminals either directly or via one or more passive components, the negative terminal of the first set of terminals, the positive terminal of the second set of terminals, at least one of the terminals of the third set of terminals and at least one of the terminals of the fourth set of terminals each being coupled to a switching assembly, and wherein the switching assemblies are operatively configured to selectively connect or disconnect each one of the battery cell units, each switching assembly including one or more switching devices, each switching device operable in a conductive state and a non-conductive state, wherein the switching assemblies are operatively configured to selectively allow operating in a plurality of states in which any two or more battery cell units are connected in series, each state including a charging cycle and a discharging cycle of the battery cell units connected in series, the plurality of states including a first state in which the first battery cell unit and the second battery cell unit are electrically connected in series and the third battery cell unit is disconnected, a second state in which the first battery cell unit and the third battery cell unit are electrically connected in series and the second battery cell unit is disconnected, a third state in which the second battery cell unit and the third battery cell unit are electrically connected in series and the first battery cell unit is disconnected,
a fourth state in which the first battery cell unit, the second battery cell unit and the fourth battery cell unit are electrically connected in series and the third battery cell unit is disconnected, and a fifth state in which the first battery cell unit, the second battery cell unit, the third battery cell unit and the fourth battery cell unit are electrically connected in series; and
the first battery cell unit, the second battery cell unit, the third battery cell unit and the fourth battery cell unit are adjacently positioned to one another such that the fifth state is achieved via a connection path having a minimum number of conducting switching devices within the circuit module, and wherein when the second battery cell unit and the third battery cell unit are connected in series, a series connection path between the second battery cell unit and the third battery cell unit includes a maximum of two switching devices operating in the conductive state.

Therefore, the positive terminal of the first set of terminals may be directly coupled to the negative terminal of the second set of terminals, or the positive terminal of the first set of terminals may be coupled to the negative terminal of the second set of terminals via one or more passive components such as conductors, fuses, resistors, inductors or any other like components. In the present specification, passive components refer to any circuitry component such as conductors, fuses, resistors, inductors or any other like that operates in a non-switching manner.

In practice, arranging the circuit in such a way that the positive terminal of the first set of terminals are directly coupled or coupled via passive component(s) to the negative terminal of the second set of terminals may advantageously allow all of the switching assemblies to be located on a single side of the circuit module, thereby greatly simplifying the configuration of the circuit module. In a battery system incorporating such a circuit module, this allows all circuitry components, (e.g. PCB circuit boards and the like carrying the switching assemblies) to be located on a single side of the terminal sets (e.g. a single side of the battery cell units once coupled to the circuit module). In this manner, the overall number of circuit components can be minimised and the arrangement or configuration of the circuit components can be simplified, thus reducing impedance and losses in the overall battery system, and also reducing manufacturing time and costs. Moreover, the overall weight and size of the battery system can be minimised. This can be advantageous particularly in applications where space and weight restrictions apply.

In some embodiments, the switching assemblies are operatively configured to selectively allow operating in a plurality of connection modes, the plurality of connection modes including a first connection mode in which a series-connection of two or more battery cell units connect to the battery system output in a first electrical polarity, and a second connection mode in which a series-connection of two or more battery cell units connect to the battery system output in a second polarity that differs from the electrical polarity of the first electrical polarity.

In some embodiments, each switching assembly includes a first switching device for connecting an associated battery cell unit, and a second switching device for disconnecting the associated battery cell unit.

In some embodiments, the switching assemblies include one or more transistors.

In some embodiments, the switching assemblies can be operatively configured to selectively connect or disconnect any one or more of the battery cell units so as to vary a total voltage output from the plurality of battery cell units.

According to another aspect of the invention, there is provided a battery system which includes one or more aforementioned circuit modules and a plurality of battery cell units coupled to the circuit module.

In some embodiments, the battery system further includes a battery mount configured to allow one or more battery cell units to be mounted for coupling to the circuit module, wherein all switching assemblies of the circuit module are located to one side of the battery mount.

In some embodiments, the battery system further includes a controller for controlling the switching assemblies of the circuit module.

In some embodiments, the controller controls the switching assemblies based on the charge and discharge behaviour of the battery cell units.

In some embodiments, wherein the controller determines the charge and discharge behaviour of each battery cell unit based on the voltage, current and/or temperature of the battery cell unit during charging and/or discharging.

In some embodiments, the controller:
 compares a measured voltage, current and/or temperature of the battery cell unit with predetermined voltage, current and/or temperature ranges,
 determines the battery cell units to connect and/or bypass, and
 controls the switching assemblies to connect or bypass each battery cell unit.

Moreover, the controller may operate the switching assemblies at high frequency.

In some embodiments, in any switching state of the switching assemblies, at most one switching device is conducting in a current path between adjacent battery cell units during operation of the circuit module.

In some embodiments, in any switching state of the switching assemblies, at most one switching device is conducting in a current path between non-adjacent battery cell units during operation of the circuit module.

In some embodiments, in any switching state of the switching assemblies, the ratio of conducting switching devices to battery cell units is less than one during operation of the circuit module.

In some embodiments, when all of the battery cell units are connected to the circuit module, the ratio of closed switches to battery cell units is less than one.

In some embodiments, the switching assemblies include one or more electromechanical relays as switching devices.

In some embodiments, the switching assemblies can be operatively configured to selectively connect any one or more battery cell units to the circuit module without altering the polarity of the connected battery cell units.

In some embodiments, the battery cell units are used battery cell units. In particular, the battery cell units may have had previous use as batteries for hybrid-electric or pure electric vehicles.

In one application, the circuit module may be used for repurposing used vehicle batteries. In particular, used vehicle batteries may be coupled in series in the circuit module to provide a battery system for electrical energy storage. The battery system may provide electrical energy storage for residential or commercial use.

Reducing the number of closed switches in the current path between active battery cell units advantageously reduces losses due to switching resistance, thereby improving the overall performance of the battery system.

Each switching assembly may include a first switch for connecting an associated battery cell unit, and a second switch for bypassing the associated battery cell unit.

In one embodiment, for the first set of terminals, the first switch of the associated switching assembly is coupled to the negative terminal of the first set of terminals on one side, and the second switch on a second side; and the second switch of the associated switching assembly is coupled to the first switch on one side, and the positive terminal of the first set of terminals on a second side. In this embodiment, for the second set of terminals, the first switch of the associated switching assembly is coupled to the positive terminal of the second set of terminals on one side, and the second switch on a second side; and the second switch of the associated switching assembly is coupled to the first switch on one side, and the negative terminal of the second set of terminals on a second side.

The first and second set of terminals along with their associated switching assemblies may form one unit of the circuit module. The circuit module may include a plurality of units coupled together.

Any suitable switching devices may be used. In some embodiments, the switching assemblies may include one or more electromechanical relays. The switching assemblies may include one or more transistors.

According to another aspect of the invention, there is provided a circuit module for coupling a plurality of battery cell units, the circuit module including: a first set of terminals having a positive terminal and a negative terminal for coupling to a first battery cell unit, a second set of terminals having a positive terminal and a negative terminal for coupling to a second battery cell unit, a third set of terminals having a positive terminal and a negative terminal for coupling to a third battery cell unit, and a fourth set of terminals having a positive terminal and a negative terminal for coupling to a fourth battery cell unit, a fifth set of terminals having a positive terminal and a negative terminal for coupling to a fifth battery cell unit, the positive terminal of the first set of terminals being coupled to the negative terminal of the second set of terminals either directly or via one or more passive components, the positive terminal of the third set of terminals being coupled to the negative terminal of the fourth set of terminals either directly or via one or more passive components, the positive terminal of the fourth set of terminals being coupled to the negative terminal of the fifth set of terminals either directly or via one or more passive components, the negative terminal of the first set of terminals, the positive terminal of the second set of terminals, at least one of the terminals of the third set of terminals, at least one of the terminals of the fourth set of terminals, and at least one of the fifth set of terminals each being coupled to a switching assembly, and wherein the switching assemblies are operatively configured to selectively connect or disconnect each one of the battery cell units, each switching assembly including one or more switching devices, each switching device operable in a conductive state and a non-conductive state, wherein the switching assemblies are operatively configured to selectively allow operating in a plurality of states in which any two or more battery cell units are connected in series, each state including a charging cycle and a discharging cycle of the battery cell units connected in series, the plurality of states including a first state in which the first battery cell unit and the second battery cell unit are electrically connected in series and the third battery cell unit is disconnected, a second state in which the first battery cell unit and the third battery cell unit are electrically connected in series and the second battery cell unit is disconnected, a third state in which the second battery cell unit and the third battery cell unit are electrically connected in series and the first battery cell unit is disconnected, a fourth state in which the first battery cell unit, the second battery cell unit and the fourth battery cell unit are electrically connected in series and the third battery cell unit is disconnected, a fifth state in which the first battery cell unit, the second battery cell unit, the third battery cell unit, the fourth battery cell unit and the fifth battery cell unit are electrically connected in series, and a sixth state in which the first battery cell unit, the second battery cell unit, the fourth battery cell unit and the fifth battery cell unit are electrically connected in series, and the third battery cell unit is disconnected.

In some embodiments, each switching assembly includes a first switching device for connecting an associated battery cell unit, and a second switching device for disconnecting the associated battery cell unit.

In some embodiments, the switching assemblies include one or more transistors.

In some embodiments, the switching assemblies can be operatively configured to selectively connect or disconnect any one or more of the battery cell units so as to vary a total voltage output from the plurality of battery cell units.

According to another aspect of the invention, there is provided a battery system which includes one or more of the aforementioned circuit modules, and a plurality of battery cell units coupled to the circuit module.

In some embodiments, the battery system further includes a battery mount configured to allow one or more battery cell units to be mounted for coupling to the circuit module, wherein all switching assemblies of the circuit module are located to one side of the battery mount.

In some embodiments, the battery system further includes a controller for controlling the switching assemblies of the circuit module.

In some embodiments, the controller controls the switching assemblies based on the charge and discharge behaviour of the battery cell units.

In some embodiments, the controller determines the charge and discharge behaviour of each battery cell unit based on the voltage, current and/or temperature of the battery cell unit during charging and/or discharging.

In some embodiments, the controller
 compares a measured voltage, current and/or temperature of the battery cell unit with predetermined voltage, current and/or temperature ranges,
 determines the battery cell units to connect and/or bypass, and
 controls the switching assemblies to connect or bypass each battery cell unit.

Moreover, the controller may operate the switching assemblies at high frequency.

In some embodiments, in any switching state of the switching assemblies, at most one switching device is conducting in a current path between adjacent battery cell units during operation of the circuit module.

In some embodiments, in any switching state of the switching assemblies, at most one switching device is conducting in a current path between non-adjacent battery cell units during operation of the circuit module.

In some embodiments, in any switching state of the switching assemblies, the ratio of conducting switching devices to battery cell units is less than one during operation of the circuit module.

In some embodiments, when all of the battery cell units are connected to the circuit module, the ratio of closed switches to battery cell units is less than one.

In some embodiments, the switching assemblies include one or more electromechanical relays as switching devices.

In some embodiments, the switching assemblies can be operatively configured to selectively connect any one or more battery cell units to the circuit module without altering the polarity of the connected battery cell units.

In some embodiments, the battery cell units are used battery cell units. In particular, the battery cell units may have had previous use as batteries for hybrid-electric or pure electric vehicles.

In one application, the circuit module may be used for repurposing used vehicle batteries. In particular, used vehicle batteries may be coupled in series in the circuit module to provide a battery system for electrical energy storage. The battery system may provide electrical energy storage for residential or commercial use.

In some embodiments, the plurality of battery cell units can comprise a combination of individual battery cell units and blocks of parallel connected cells. In this specification, the terms "battery cell unit" or "cell unit" can refer to an individual battery cell or a block of cells connected in parallel, and similar reasoning applies to variations of those terms, such as plurals. It can also refer to a block of cells connected in parallel in which one or more circuit components such as fuses, resistors or inductors are connected in series and/or parallel with individual cells.

The battery cell units can be any suitable energy storage elements including for example, supercapacitors, and the like.

In this specification, the term "switch" refers to one or a plurality of circuit elements that can be controlled in a way that changes the path of current flow. In some embodiments, a switch comprises one or a plurality of electromechanical relays. In some other embodiments, a switch comprises one or a plurality of transistors.

In order that the invention may be more readily understood and put into practice, one or more preferred embodiments thereof will now be described, by way of example only, with reference to the accompanying drawings.

BRIEF DESCRIPTION OF THE DRAWINGS

FIG. 9 is a 3*2 circuit diagram (M=3 N=2) of a battery system according to a further embodiment of the invention.

FIG. 10 is an alternate depiction of the circuit diagram shown in FIG. 9.

FIG. 13 is a 2*3 circuit diagram (M=2; N=3) of a battery system according to a further embodiment of the invention.

FIG. 14A is a 4*3 circuit diagram (M=4; N=3) of a battery system according to a further embodiment of the invention.

FIG. 14B is a 4*2 circuit diagram (M=4; N=2) of a battery system according to a further embodiment of the invention.

FIG. 15 is a circuit diagram of a battery system according to a further embodiment of the invention.

DETAILED DESCRIPTION OF PREFERRED EMBODIMENT(S)

Figure 1:
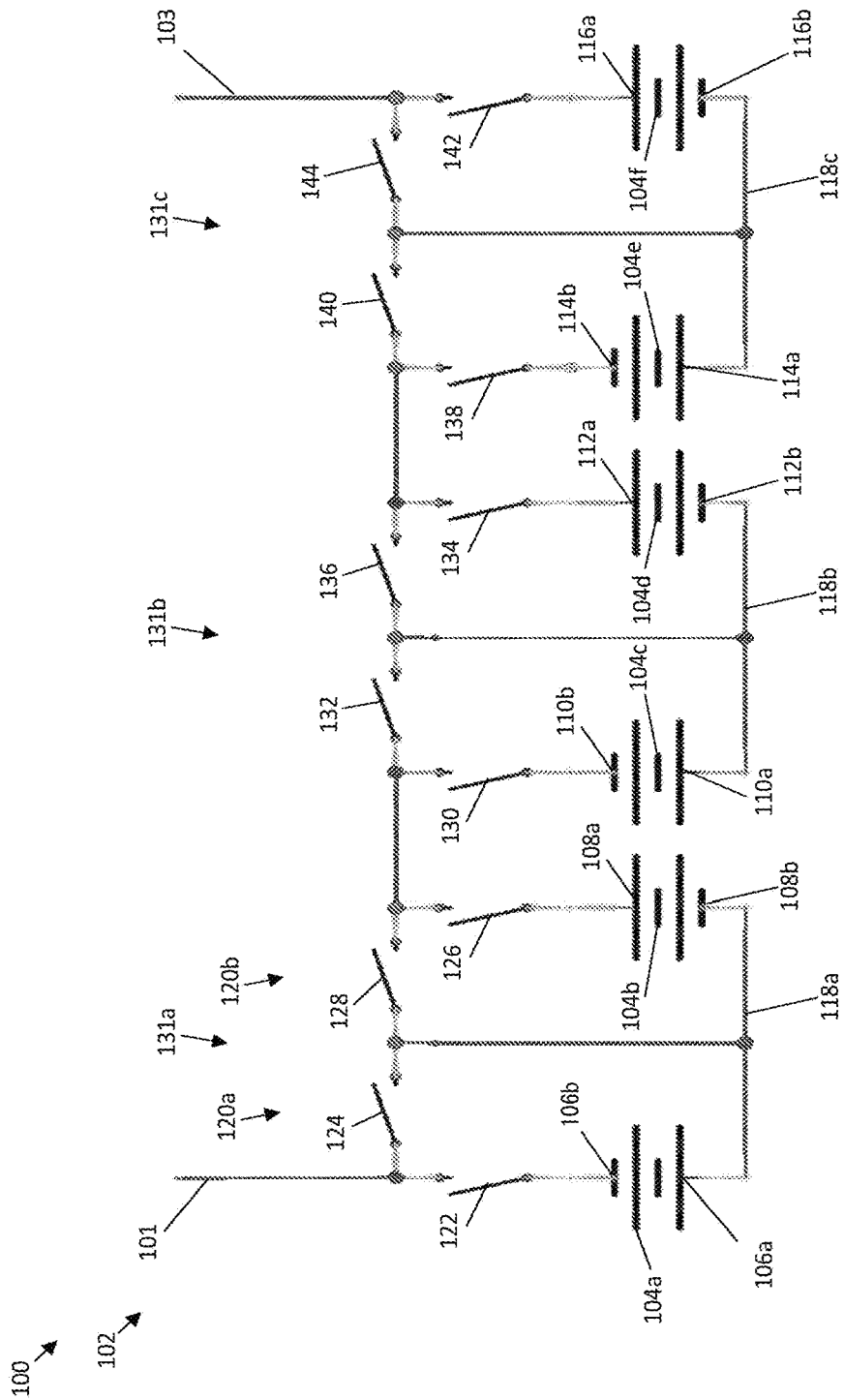
FIG. 1 is a circuit diagram of a battery system according to one embodiment of the invention.

A battery system 100 according to one embodiment of the invention is shown in FIG. 1. The battery system 100 includes a circuit module 102 for coupling to a plurality of battery cell units 104. For exemplary purposes, the battery system 100 includes six battery cell units 104a, 104b, 104c, 104d, 104e, 104e, 104f. However, any suitable number of battery cell units 104 may be used in the battery system 100. The battery system 100 includes battery pack terminals 101 and 103 for providing electrical energy to an external load or receiving electrical energy from an external supply (not shown).

The circuit module 102 includes six sets of terminals 106-116 for coupling with the battery cell units 104, each terminal set having a positive terminal 106a, 108a, 110a, 112a, 114a, 116a, and a corresponding negative terminal 106b, 108b, 110b, 112b, 114b, 116b. Each terminal set 106-116 is configured for coupling to a battery cell unit 104 (herein referred to as an associated battery cell unit 104). However, a person skilled in the art would understand that any number of terminals and battery cell units may be used in the battery system 100 or any of the battery systems described herein without departing from the scope of the invention.

In the battery system 100, the components of circuit module 102 are arranged in such a way that a positive terminal of one set of terminals 106a, 110a, 114a is directly coupled to the negative terminal of an adjacent set of terminals 108b, 118b, 116b by a conductor 118a-118c.

The negative terminal 106b of a first set of terminals 106 is coupled to a switching assembly 120a. Switching assembly 120a includes a first switch 122 for connecting battery cell unit 104a to the circuit module 102 when closed, and a second switch 124 for bypassing battery cell unit 104a when closed. More particularly, battery cell unit 104a is active or connected to the circuit module 102 when the first switch 122 is closed and the second switch 124 is open, and the battery cell unit 104a is inactive or bypassed from the circuit module 102 when the first switch 122 is open and the second switch 124 is closed.

Similarly, the positive terminal 108a of a second set of terminals 108 is coupled to a second switching assembly 120b. Switching assembly 120b includes a first switch 126 for connecting battery cell unit 104b to the circuit module 102 when closed, and a second switch 128 for bypassing battery cell unit 104b when closed. More particularly, battery cell unit 104b is connected to the circuit module 102 when the first switch 126 is closed and the second switch 128 is open, and the battery cell unit 104b is bypassed from the circuit module 102 when the first switch 126 is open and the second switch 128 is closed.

Accordingly, current flowing through battery cell unit 104a is controlled via the switches 122, 124. If switch 122 is closed and switch 124 is open, then any current flowing between pack terminals 101, 103 flows through switch 122 and battery cell unit 104a. If switch 122 is open and switch 124 is closed, then any current flowing between pack terminals 101, 103 passes through switch 124, but does not pass through battery cell unit 104a. Other battery cell units 104b-104f are controlled in a similar fashion via their associated switch assemblies.

The circuit layout including the two sets of terminals 106, 108, and the associated switching assemblies 120a, 120b respectively forms a single circuit unit block 131a of the battery system 100. The battery system 100 includes a further two circuit unit blocks 131b, 131c which are arranged in the same manner as unit block 131a. The three circuit units 131a, 131b, 131c are coupled together to form the overall system 100. However, it is understood that the system 100 may include any suitable number of unit block 131 to meet energy storage requirements of the specific application at hand.

As described, the positive terminal 106a for battery cell unit 104a is directly connected to the negative terminal 108b for battery cell unit 104b. Arranging the circuit in this way allows switches 122, 124, 126, 128 to be located in close physical vicinity on one side of the battery cell units 104a, 104b without the need to extend the length of the current path length between battery cell units 104 and the switches 122, 124, 126, 128. This advantageously results in reduced manufacturing costs, decreases space requirements, and avoids additional resistance, and thus energy losses caused by increased current path length.

However, in the battery system 100, to connect the positive terminal 106a for battery cell unit 104a to the negative terminal 112b of 104d through battery cell units 104b and 104c, the current passes through two switches 126, 130. In this embodiment, if all six battery cell units 104a-104f are to carry current, then the current also must pass through switches 122, 126, 130, 134, 138 and 142. This corresponds to current passing through one switch per cell unit, each of which has an on resistance and associated energy loss.

Figure 2:
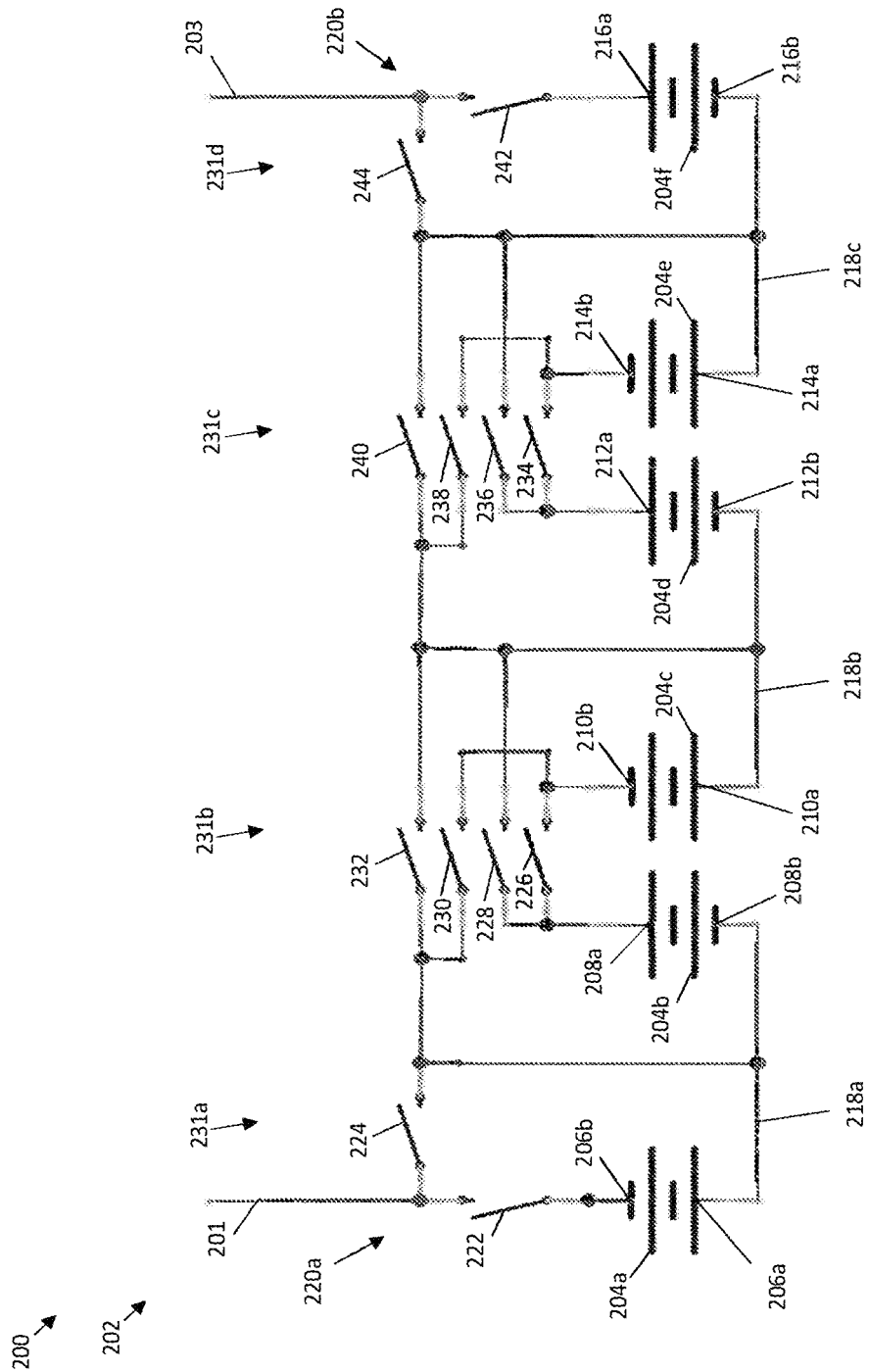
FIG. 2 is a circuit diagram of a battery system according to another embodiment of the invention.

The battery system 200 as shown in FIG. 2 further reduces the battery system on resistance and associated energy losses when all battery cell units 204 are connected to the circuit module 202 by reducing the total number of closed switches in the current path in this switching state as further explained below.

The battery system 200 includes circuit module 202 configured to receive six battery cell units 204a-204f coupled thereto. However, any suitable number of battery cell units 204 may be used in the battery system 200. The battery system 100 includes battery pack terminals 201 and 203 for providing electrical energy to an external load or receiving electrical energy from an external supply (not shown).

The circuit module 202 includes six sets of terminals 206-216 for coupling with the battery cell units 204, each terminal set having a positive terminal 206a, 208a, 210a, 212a, 214a, 216a, and a corresponding negative terminal 206b, 208b, 210b, 212b, 214b, 216b. Each terminal set 206-216 is configured for coupling to a battery cell unit 204.

In the battery system 200, the components of circuit module 202 are also arranged in such a way that a positive terminal of one set of terminals 206a, 210a, 214a is directly coupled to the negative terminal of an adjacent set of terminals 208b, 212b, 216b by a conductor 218a-218c.

The negative terminal 206b of a first set of terminals 206 is coupled to a switching assembly 220a. Switching assembly 220a includes a first switch 222 for connecting battery cell unit 204a to the circuit module 202 when closed, and a second switch 224 for bypassing battery cell unit 204a when closed. More particularly, battery cell unit 204a is connected to the circuit module 202 when the first switch 222 is closed and the second switch 224 is open, and the battery cell unit 204a is bypassed from the circuit module 202 when the first switch 222 is open and the second switch 224 is closed. The circuit layout including the set of terminals 206a, 206b and the switching assembly 220a forms a first end circuit unit block 231a.

Similarly, on an opposite end of the circuit module 202, the positive terminal 216a of terminal set 216 is coupled to switching assembly 220b. In a similar manner to switching assembly 220a, switching assembly 220b includes a first switch 242 for connecting battery cell unit 204f to the circuit module 202 when closed, and a second switch 244 for bypassing battery cell unit 204f when closed. The circuit layout including the set of terminals 216a, 216b and the switching assembly 220b forms a second end circuit unit block 231d.

Two further circuit unit blocks 231b, 231c are coupled between the end unit blocks 231a, 231d. For unit block 231b, the positive terminal 208a for battery cell unit 204b and the negative terminal 210b for battery cell unit 204c is coupled to a switching assembly comprising switches 226, 228, 230, 232. In particular, the positive terminal 208a for cell unit 204b is connected to one side of switches 226 and 228; the negative terminal 208b is connected to one side of switches 230 and 232; the negative terminal 210b for cell 204c is connected to the other side of switches 226 and 230; and the positive terminal 210a is connected to the other side of switches 228 and 232, Battery cell units 204b and 204c can be each connected and/or bypassed according to the switching states for switches 226-232 as shown in the table below.

| Cell unit 204b | Cell unit 204c | Switch 226 | Switch 228 | Switch 230 | Switch 232 |
|---|---|---|---|---|---|
| Connected/Active | Connected/Active | Closed | Open | Open | Open |
| Connected/Active | Bypassed/Inactive | Open | Closed | Open | Open |
| Bypassed/Inactive | Connected/Active | Open | Open | Closed | Open |
| Bypassed/Inactive | Bypassed/Inactive | Open | Open | Open | Closed |

Battery cell units 204b and 204c are both connected to the circuit module 202 when switch 226 is closed and switches 228, 230 and 232 are open; cell unit 204b is connected to and cell unit 204c is bypassed from the circuit module 202 when switch 228 is closed and switches 226, 230 and 232 are open; cell unit 204b is bypassed from and cell unit 204c is connected to the circuit module 202 when switch 230 is closed and switches 226, 228 and 232 are open; and cell units 204b and 204c are both bypassed from the circuit module 202 when switch 232 is closed and switches 226, 228 and 230 are open. Circuit unit block 231c operates in the same manner as circuit unit blocks 231b.

To reduce the total number of cell units 204 in battery system 200, one or more intermediate circuit unit blocks 231b, 231c can be removed or added to the circuit between end unit blocks 231a, 231b.

In battery system 200, the switches 222-244 are arranged in such a way that for at least one switching state, a battery cell unit 204 can be coupled to an adjacent battery cell unit 204 with at most one closed switch in the current path connecting the two adjacent battery cell units 204. In addition, the system 200 allows a battery cell unit to be coupled to an adjacent or non-adjacent cell unit 204 with at most one closed switch in the current path. For example, battery cell unit 204a can be coupled to adjacent battery cell unit 204b via conductor 218a and no switches; battery cell unit 204a can be coupled directly to non-adjacent battery cell unit 204c via conductors and a single closed switch 230; battery cell unit 204a can be coupled directly to non-adjacent battery cell unit 204d via conductors and a single closed switch 232. This configuration of circuit components advantageously reduces the total number of switches in the current path during operation to thereby reduce the ohmic energy losses due to on-resistance of switches, and increasing the energy efficiency of the overall battery system 200.

Accordingly, to connect the positive terminal 206a for battery cell unit 204a to the negative terminal 212b of battery cell unit 204d, whilst connecting intermediate battery cell units 204b and 204c, the current only needs to pass through a single switch 226. In this battery system 200, when all six battery cell units 204a-204f are to carry current, only four switches 222, 226, 234 and 242 are closed and all other switches are open. In this switching state, as the current only flows through four switches 222, 226, 234 and 242, a switch to active battery cell unit ratio of less than one is achieved. Battery system 200 therefore decreases switch associated energy loss.

Similar to FIG. 1, the system 200 of FIG. 2 can also a plurality of switches to be located in close vicinity to one another and on a single side of the battery cell units 204, which in practice can decrease both manufacturing cost and space constraints.

Figure 3:
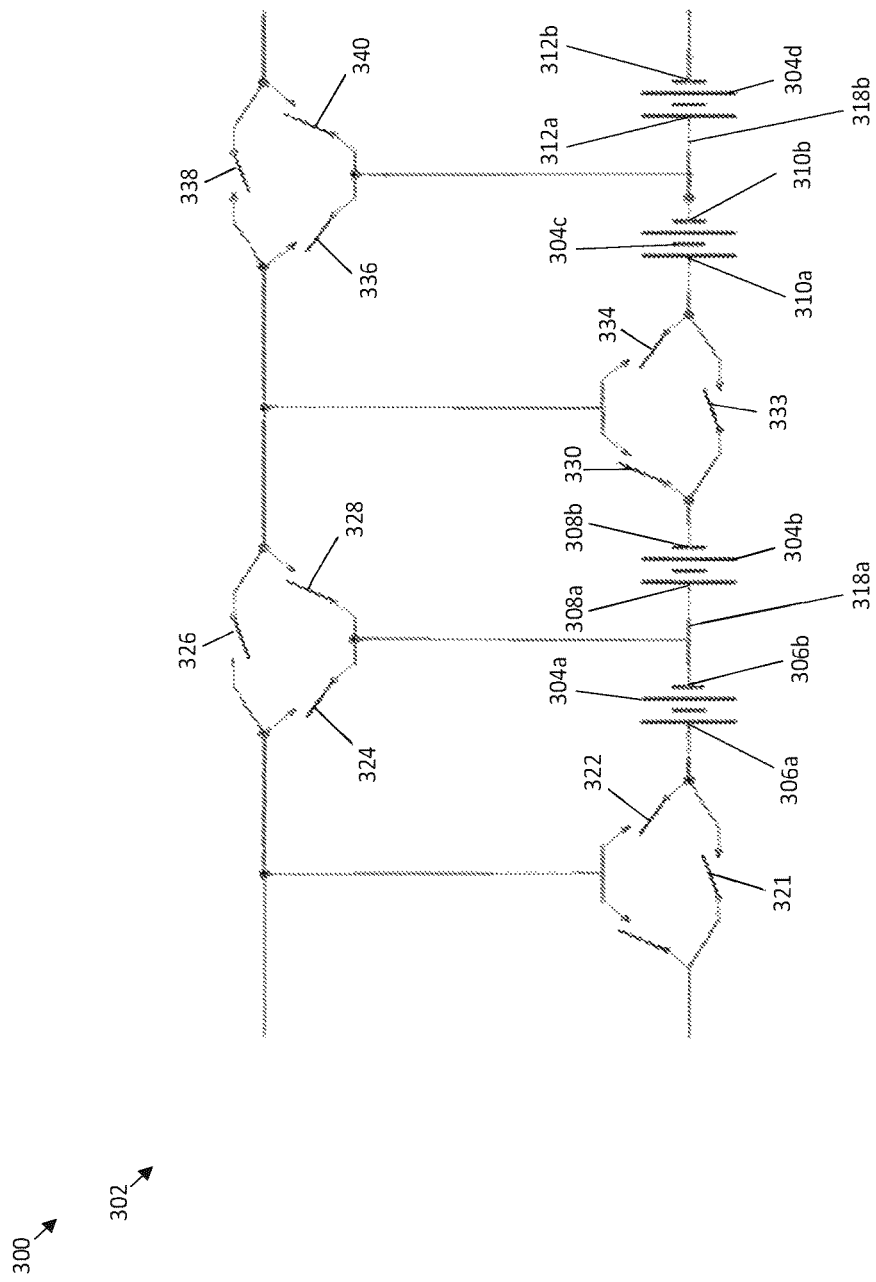
FIG. 3 is a circuit diagram of a battery system according to a further embodiment of the invention.

A battery system 300, portions of which can be repeated to form a larger battery system (not shown) is provided in FIG. 3. The battery system 300 includes circuit module 302 configured to receive four battery cell units 304a-304d coupled thereto.

The circuit module 302 includes four sets of terminals 306-312 for coupling with the battery cell units 304, each terminal set having a positive terminal 306a, 308a, 310a, 312a and a corresponding negative terminal 306b, 308b, 310b, 312b. Each terminal set 306-312 is configured for coupling to a battery cell unit 304.

In the battery system 300, the components of circuit module 302 are also arranged in such a way that a positive terminal of one set 308a, 312a is directly coupled to the negative terminal of an adjacent set of terminals 306b, 310b by a conductor 318a, 318b.

The positive terminal 306a of a first set of terminals 306 is coupled to a switching assembly comprising switches 322, 326. Battery cell unit 304a is connected to the circuit module 302 when switch 322 is closed and switch 324 is open, and the battery cell unit 304a is bypassed from the circuit module 302 when switch 322 is open and the second switch 324 is closed.

Similarly, the negative terminal 308b of a second set of terminals 308 is coupled to a second switching assembly comprising switches 328, 330. Battery cell unit 304b is connected to the circuit module 302 when switch 330 is closed and switch 328 is open, and battery cell unit 304b is bypassed from the circuit module 302 when switch 330 is open and the second switch 328 is closed. The switching assemblies associated with terminals 310 and 312 operate in a similar manner.

Accordingly, battery system 300 operates in a similar manner to battery system 100 of FIG. 1. Additional switch 326 is closed in the switching sequence that requires both switches 324, 328 to be closed. Using a single switch 326 rather than two switches 324, 328 reduces losses created by switch resistance. Switches 321, 333, 338 serve a similar function to switch 326.

In system 300, when all cell units 304a-304d are connected into the current path, the current only flows two switches 321, 333. In this switching state, current passes through less than one switch per active battery cell unit 304, which also results in a switch to active battery cell unit ratio of less than one.

Figure 4:
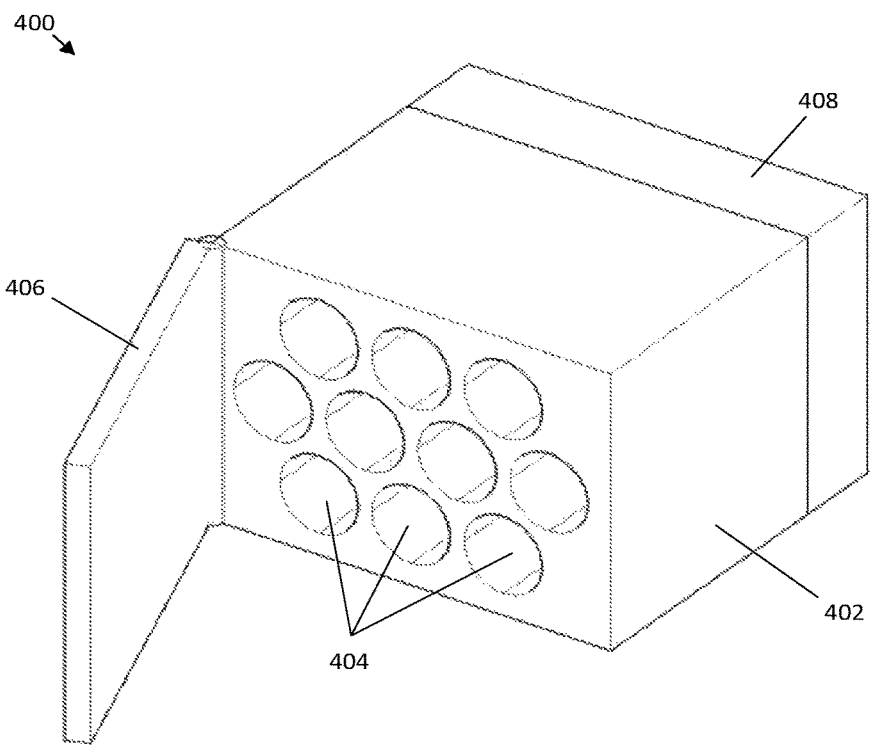
FIG. 4 is a perspective view of a housing of a battery system according to an embodiment of the invention.

A battery pack housing 400 for a battery system is shown in FIG. 4. The housing 400 provides a battery mount 402 mounting and dismounting individual battery cell units 104, 204, 304 for coupling to the circuit module 102, 202, 302. In particular, the battery mount 402 includes a plurality of enclosures 404, each enclosure being configured for receiving a battery cell unit 104, 204, 304 therein. The battery mount 402 allows the battery cell units 104, 204, 304 to be easily removable and replaceable.

The housing 400 includes a door 406 which includes conductors for coupling the battery cell units 104, 204, 304 to the circuit module 102, 202, 302. When the door 406 is open, for example for maintenance, the battery cell units 104, 204, 304 inside the housing 400 are disconnected. In a battery system comprising a number of battery packs each including a housing 400, the battery cell units 104, 204, 304 in any one of the housings 400 can be maintained via door 406 without affecting the operation of adjacent battery packs each having a separate housing 400.

Moreover, integrated circuit boards containing the switching assemblies are located on a single side 408 of the battery pack housing 400 for compactness, reduced losses due to conductor resistance, and manufacturing costs.

Figure 5:
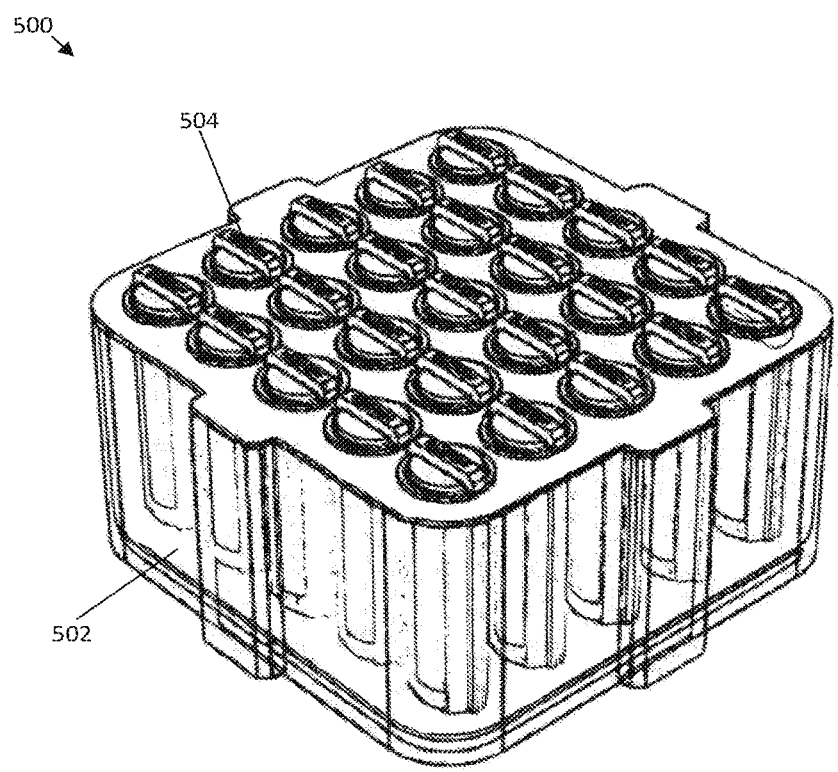
FIG. 5 is a perspective view of a battery pack of a battery system according to an embodiment of the invention.

An alternative battery pack 500 of a battery system is shown in FIG. 5. The battery pack 500 has a battery mount 502 similar to that shown in FIG. 4. However, the battery pack 500 housing provides each battery cell unit with its own individual connection interface 504 so that each individual battery cell unit 104, 204, 304 can be removed, replaced/maintained without disruption to the operation of the other connected battery cell units 104, 204, 304 in the battery pack 500.

A controller including a driving circuit is provided to determine the appropriate switching sequence of the switching assemblies described above. In some embodiments, the controller is a centralised controller to centrally control all switching assemblies. In other embodiments, the controller can include one or more decentralised controllers, each decentralised controller controlling a subset of the switching assemblies.

Figure 6:
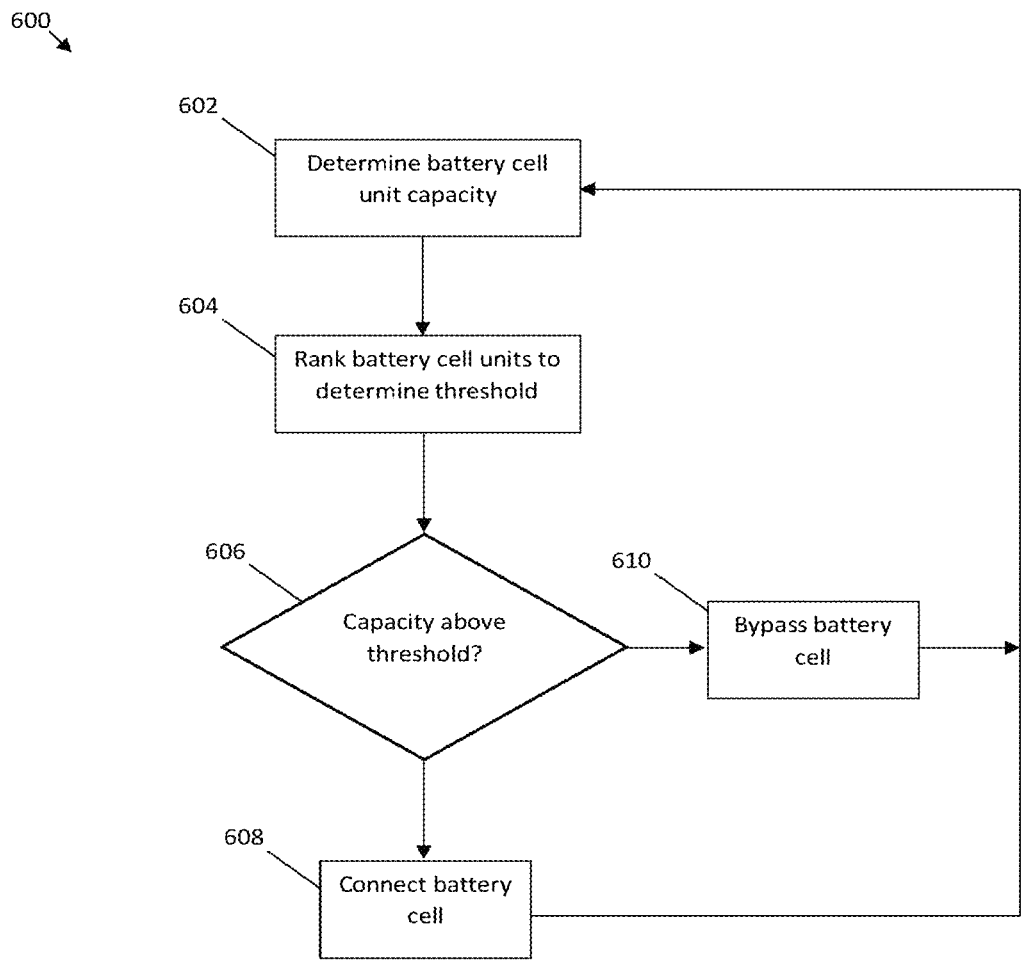
FIG. 6 is a flow diagram illustrating a method of controlling the switch assemblies of a battery system according to an embodiment of the invention.

Now turning to FIG. 6, a method 600 of controlling the switching assemblies is described.

At step 602, the charging and discharging capacity of each battery cell unit 104, 204, 304 is determined based on measurements of the battery voltage and/or battery current, thresholds for voltage and/or current, and/or historical battery measurement data.

At step 604, the controller ranks the capacity of each battery cell unit 104, 204, 304 from highest to lowest or vice versa, and determines a threshold capacity by halving the sum of the capacity for the cell unit with the highest capacity and the cell unit with the lowest capacity.

At query step 606, the controller determines whether the charging and discharging capacity of a given battery cell unit 104, 204, 304 is above or below the threshold determined in step 604. If the capacity of a particular battery cell unit 104, 204, 304 is above the threshold, the method 600 proceeds to step 608, and if not, the method 600 proceeds to step 610.

At step 608, the particular battery cell unit is made active or connected to the circuit module by opening and closing the appropriate switches in the associated switching assembly.

At step 610, the particular battery cell unit is made inactive or bypassed from the circuit module by opening and closing the appropriate switches in the associated switching assembly.

The method 100 is repeated until the battery cell units 104, 204, 304 which are connected to the respective circuit module 100, 200, 300 are fully charged or discharged.

In some embodiments, two or more threshold capacities can be determined and used based on the application requirements. For example, the controller may determine a lower threshold (calculated by multiplying the sum of the capacity for the cell unit with the highest capacity and the cell unit with the lowest capacity by ⅓) and an upper threshold (calculated by multiplying the sum of the capacity for the cell unit with the highest capacity and the cell unit with the lowest capacity by ⅔); and activate the battery cell units having a capacity below the lower threshold a third of the time, activate the battery cell units having a capacity above the lower threshold and below the upper threshold two thirds of the time, and activate the battery cell units having a capacity above the upper threshold on full time. This method can similarly be modified to have three or more thresholds, for example for battery packs having a larger number of battery cell units.

In some embodiments, the controller may monitor each battery cell unit 104, 204, 304 based on maintenance requirements to optimise battery system performance. This optimisation takes into account inputs regarding the battery cell unit behaviour, which can include current and/or past measurements of one or more voltages, currents, and/or temperatures, current and/or past computations of cell unit state of charge and/or state of health. It can also take into account inputs regarding battery maintenance requirements, which can include financial costs associated with battery maintenance, a schedule of when battery maintenance is next operationally feasible or advantageous.

In one scenario in which the next maintenance opportunity is some time away, this optimisation may reduce the utilisation and therefore the ageing of lower performing battery cell units to prolong their life until the next maintenance opportunity.

In a different scenario in which the next maintenance is impending, this optimisation may increase the utilisation of weaker battery cell units in order to maximise their utilisation before they get replaced as part of the maintenance.

In another embodiment, the controller carries out automated identification of battery cell unit characteristics. When using battery cell units with variations in performance, there is often value in identifying characteristics in order to provide inputs for battery cell unit usage optimisation. Existing state of the art methods require manual entering of battery data where battery cell units are labelled. This can be a time intense and/or error prone exercise. In one embodiment, automatic identification can be done by monitoring one or more battery cell units' charge and discharge behaviour including but not limited to measurements of voltage, current, and/or temperature. The system may then compare the observed behaviour to a database of information on cell unit types and/or chemistries. This database may provide characteristics that can include but are not limited to the battery chemistry, which may be linked to upper and/or lower voltage limits, current limits, temperature limits and/or ageing impacts of specific utilisation factors.

Figure 7:
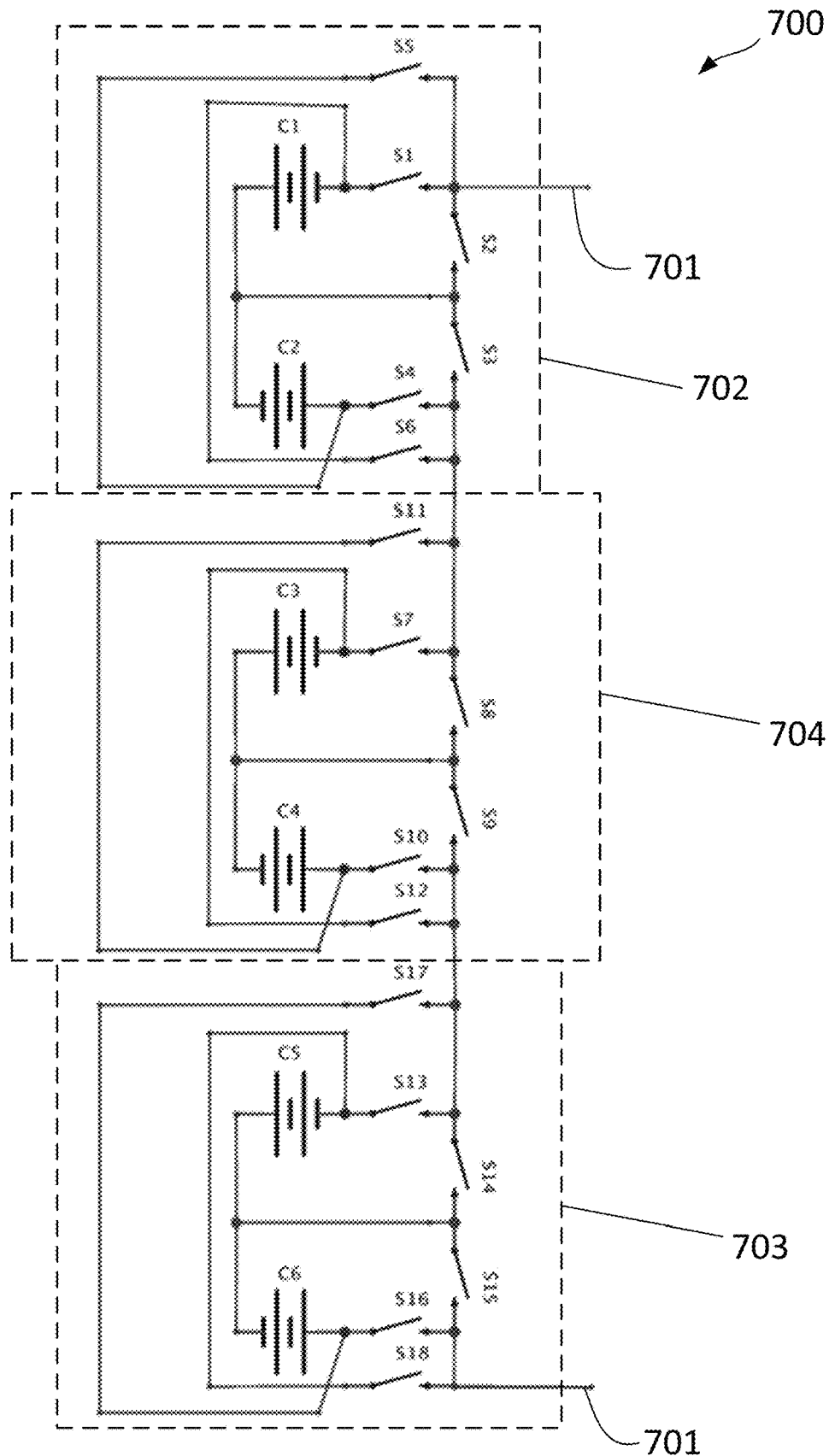
FIG. 7 is a circuit diagram of a battery system according to a further embodiment of the invention.

FIG. 7 shows another embodiment of a battery system 700 which enables combinations of cell units to be connected with either a negative or positive polarity. Advantages of this include the ability to generate both positive and negative voltages, including alternating current waveforms, without requiring additional conversion equipment at the battery system output such as a DC-AC converter or an h-bridge switching configuration. This may in turn reduce the system cost and efficiency losses in a battery system.

The exemplary depicted battery system 700 is a circuit module configured to receive six battery cell units C1-C6 coupled thereto. However, any suitable number of battery cell units may be used where one or more intermediate circuit unit blocks 704 can be removed or added to the circuit between the end unit blocks 702 and 703. The battery system 700 includes battery pack terminals 701 for providing electrical energy to an external load or receiving electrical energy from an external supply (not shown). The pack terminals 701 are ideally connected to the output of a first and last circuit block.

The circuit module of the depicted example includes six sets of terminals configured to couple with corresponding battery cell units, each set of terminals having a positive terminal, and a corresponding negative terminal. In particular, the circuit block 702 of the circuit module includes the negative terminal of a first set of terminals C1 and the positive terminal of a second set of terminals C2 which are in turn coupled to a switching assembly. This switching assembly is that described above with reference to 131a of FIG. 1, and includes a first switch S1 configured to connect battery cell unit C1 to the circuit module when closed, a second switch S2 configured to in positive polarity bypass battery cell unit C1 when closed, a third switch S4 configured to connect battery cell unit C2 to the circuit module when closed, a fourth switch S3 configured to in positive polarity bypass battery cell unit C2 when closed. Furthermore, the switching assembly this embodiments includes additional fifth S5 and sixth S6 switches which, when both closed, allow both battery cell units C1 and C2 to be configured in the opposite polarity. In operation, battery cell units C1 and C2 are positively connected to the circuit module when switches S1 and S4 are closed and switches S2, S3, S5, and S6 are open. When both battery cell units are considered positively connected, both cell units C1 and C2 have their respectively positive terminal connected towards the connection to a next switching assembly connecting towards cell unit C3.

Conversely, battery cell units C1 and C2 are negatively connected to the circuit module when switches S1, S2, S3 and S4 are open and switches S5 and S6 are closed. When both battery cell units are considered negatively connected, both cell units C1 and C2 have their respective negative terminal connected towards the connection to a next switching assembly connecting towards cell unit C3.

Any circuit block of a battery cell unit having cells desired to be switched into an opposing polarity may therefore incorporate the fifth and sixth switches S5, S6 as shown. In some embodiments, the fifth and sixth switches are included for each cell block in the battery cell unit therefore allowing equal positive and negative voltages to be generated at the cell terminals 701. In other embodiments, a selection of circuit blocks in a battery cell unit incorporate the fifth and sixth switches S5, S6. In this way, a full voltage of one polarity can be generated at the cell terminals, and a part opposing voltage. Where a part opposing voltage is desired, those cells remaining in the battery cell unit which have not had the polarity reversed would be bypassed by switches S1-S4 of the applicable circuit block.

When positively or when negatively connected, it is also possible to connect only either one of cell units C1 and C2. For example, C1 is bypassed and C2 negatively connected when switches S3 and S5 are closed and switches S1, S2, S4 and S6 are open. With reference to circuit block 701, various switching states are shown in the table below.

| Connection status | Closed switches | Open switches |
|---|---|---|
| Positive: C1 connected, C2 connected | S1, S4 | S2, S3, S5, S6 |
| Positive: C1 bypassed, C2 connected | S2, S4 | S1, S3, S5, S6 |
| Positive: C1 connected, C2 bypassed | S1, S3 | S2, S4, S5, S6 |
| Negative: C1 connected, C2 connected | S5, S6 | S1, S2, S3, S4 |
| Negative: C1 bypassed, C2 connected | S3, S5 | S1, S2, S4, S6 |
| Negative: C1 connected, C2 bypassed | S2, S6 | S1, S3, S4, S5 |
| Both bypassed: C1 bypassed, C2 bypassed | S2, S3 | S1, S4, S5, S6 |

Similarly, on an opposite end of the circuit module, the positive terminal of a first set of terminals C5 and a second set of terminals C6 coupled to another switching assembly as part of circuit block 703. This switching assembly includes a first switch S13 for connecting battery cell unit C5 to the circuit module when closed, a second switch S14 for in positive polarity bypassing battery cell unit C5 when closed, a third switch S16 for connecting battery cell unit C6 to the circuit module when closed, a fourth switch S15 for in positive polarity bypassing battery cell unit C6 when closed. Furthermore, the switching assembly includes a fifth switch S17 and sixth switch S18 which when both closed allow connecting both battery cell units C5 and C6 in opposite polarity. The circuit module comprising C5 and C6 can achieve equivalent switching states and polarities outlined for the circuit module comprising cell units C1 and C2.

One or more further intermediate circuit unit blocks are coupled between the end unit blocks and FIG. 7 shows one intermediate circuit block 704. For unit block 704, the battery cell units C3 and C4 are coupled to a switching assembly comprising switches S7-S12. Similar to cell units C1 and C2, battery cell units C3 and C4 can each be connected either positively or negatively and/or bypassed according to the switching states for switches S7-S12.

To reduce or increase the total number of cell units in battery system 700, one or more intermediate circuit unit blocks can be removed or added to the circuit between the end unit blocks.

In the battery system 700, the switches are arranged in such a way that for at least one switching state, a battery cell unit can be coupled to an adjacent battery cell unit with at most two closed switches in the current path connecting the two adjacent battery cell units. In addition, the system 700 allows a battery cell unit to be coupled to an adjacent or non-adjacent cell unit with at most two closed switches in the current path. For example, battery cell unit C1 can be coupled to adjacent battery cell unit C2 via a conductor and no switches; battery cell unit C1 can be coupled directly to non-adjacent battery cell unit C3 via conductors and two closed switches S3 and S7; battery cell unit C1 can be coupled directly to non-adjacent battery cell unit C4 via conductors and two closed switches S3 and S8. This configuration of circuit components advantageously reduces the total number of switches in the current path during operation to thereby reduce the ohmic energy losses due to on resistance of switches, and increasing the energy efficiency of the overall battery system 700.

Accordingly, to connect the positive terminal for battery cell unit C1 to the negative terminal of battery cell unit C4, whilst connecting intermediate battery cell units C2 and C3, the current only needs to pass through two switches S4 and S7. In this battery system 700, when all six battery cell units C1-C6 are to carry current, only six switches S1, S4, S7, S10, S13 and S16 are closed and all other switches are open. In this switching state, as the current only flows through six switches S1, S4, S7, S10, S13 and S16, a switch to active battery cell unit ratio of one is achieved. Battery system 700 therefore decreases switch associated energy loss.

Similar to previous figures, the system 700 of FIG. 7 also allows a plurality of switches to be located in close vicinity to one another and on a single side of the battery cell units, which in practice can decrease both manufacturing cost and space constraints.

In one exemplary implementation of the above described battery system there is a circuit module which couples a plurality of battery cell units. The circuit module includes a first set of terminals C1 having a positive terminal and a negative terminal for coupling to a first battery cell unit, a second set of terminals C2 having a positive terminal and a negative terminal for coupling to a second battery cell unit, a third set of terminals C3 having a positive terminal and a negative terminal for coupling to a third battery cell unit, and a fourth set of terminals C4 having a positive terminal and a negative terminal for coupling to a fourth battery cell unit. The positive terminal of the first set of terminals C1 is coupled to the negative terminal of the second set of terminals C2 either directly or via one or more passive components The positive terminal of the third set of terminals C3 is coupled to the negative terminal of the fourth set of terminals C4 either directly or via one or more passive components. The negative terminal of the first set of terminals C1, the positive terminal of the second set of terminals C2, at least one of the terminals of the third set of terminals C3 and at least one of the terminals of the fourth set of terminals C4 each being coupled to a switching assembly comprising switches S1-S18. The switching assemblies are operatively configured to selectively connect or disconnect each one of the battery cell units, each switching assembly including one or more switching devices, each switching device operable in a conductive state and a non-conductive state. The switching assemblies are operatively configured to selectively allow operating in a plurality of states in which any two or more battery cell units are connected in series. Each state includes a charging cycle and a discharging cycle of the battery cell units connected in series, the plurality of states including:

a first state in which the first battery cell unit C1 and the second battery cell unit C2 are electrically connected in series and the third battery cell unit C3 is disconnected, achieved for example by switches S1, S4, S8, S9, S14 and S15 being in a conductive state while all other switches shown are in a non-conductive state;

a second state in which the first battery cell unit C1 and the third battery cell unit C3 are electrically connected in series and the second battery cell unit C2 is disconnected, achieved for example by switches S1, S3, S7, S9, S14 and S15 being in a conductive state while all other switches shown are in a non-conductive state;

a third state in which the second battery cell unit C2 and the third battery cell unit C3 are electrically connected in series and the first battery cell unit C1 is disconnected, achieved for example by switches S2, S4, S7, S9, S14 and S15 being in a conductive state while all other switches shown are in a non-conductive state;

a fourth state in which the first battery cell unit C1, the second battery cell unit C2 and the fourth battery cell unit C4 are electrically connected in series and the third battery cell unit C3 is disconnected, achieved for example by switches S1, S4, S8, S10, S14 and S15 being in a conductive state while all other switches shown are in a non-conductive state; and a fifth state in which the first battery cell unit C1, the second battery cell unit C2, the third battery cell unit C3 and the fourth battery cell unit C4 are electrically connected in series, achieved for example by switches S1, S4, S7, S10, S14 and S15 being in a conductive state while all other switches shown are in a non-conductive state.

The switching assemblies are operatively configured to selectively allow operating in a plurality of connection modes, the plurality of connection modes including:

a first connection mode in which a series-connection of two or more battery cell units connect to the battery system output in a first electrical polarity, achieved for example by switches S1, S4, S8, S9, S14 and S15 being in a conductive state while all other switches shown are in a non-conductive state, connecting C1 and C2 between terminals of the battery system in one polarity; and a second connection mode in which a series-connection of two or more battery cell units connect to the battery system output in a second polarity that differs from the electrical polarity of the first electrical polarity, achieved for example by S5, S6, S8, S9, S14 and S15 being in a conductive state while all other switches shown are in a non-conductive state, connecting C1 and C2 between terminals of the battery system in a second and differing polarity.

The first battery cell unit C1, the second battery cell unit C2, the third battery cell unit C3 and the fourth battery cell unit C4 are adjacently positioned to one another such that the fifth state is achieved via a connection path having a minimum number of conducting switching devices within the circuit module.

A series connection path between the second battery cell unit C2 and the third battery cell unit C3 includes a maximum of two switching devices S4 and S7 operating in the conductive state when the second battery cell unit C2 and the third battery cell unit C3 are connected in series.

In some embodiments, each switching assembly includes a first switching device for connecting an associated battery cell unit, and a second switching device for disconnecting the associated battery cell unit. For example, cell unit C1 can be connected when switch S1 is in conductive mode, and in positive polarity disconnected when switch S2 is in conductive mode.

In one embodiment, switches S1-S18 is a transistor or several parallel-connected transistors or equivalent component or combination of components. In other embodiments, one or more of switches S1-18 are two or more series-connected transistors. This embodiment may be preferred in situations where the series connection of two or more transistors increases the switch terminal voltage capability. Other series and parallel combinations of transistors can be implemented to improve current and/or voltage conduction capability as desired.

The switching assemblies are operable to selectively connect or disconnect any one or more of the battery cell units so as to vary a total voltage output from the plurality of battery cell units. Time varying voltages are also able to be generated by selective time varying connection or disconnection of battery cell units. For example, a total voltage output mimicking a mains AC voltage can be generated by sequential connection of battery cell units equivalent to a desired mains voltage over a time period which mimics a mains AC frequency.

In some embodiments, the battery system further includes a battery mount configured to allow one or more battery cell units to be mounted for coupling to the circuit module. All switching assemblies of the circuit module are located to one side of the battery mount.

In some embodiments, the battery system further includes a controller (not shown) for controlling the switching assemblies of the circuit module. The controller is configured to control the switching assemblies based on the charge and discharge behaviour of the battery cell units. In some embodiments, the controller is further configured to determine the charge and discharge behaviour of each battery cell unit based on the voltage, current and/or temperature of the battery cell unit during charging and/or discharging. In some embodiments, the controller is further configured to compare a measured voltage, current and/or temperature of the battery cell unit with predetermined voltage, current and/or temperature ranges, determine one or more of the battery cell units to connect and/or bypass, and control the switching assemblies to connect or bypass each battery cell unit.

Figure 8:
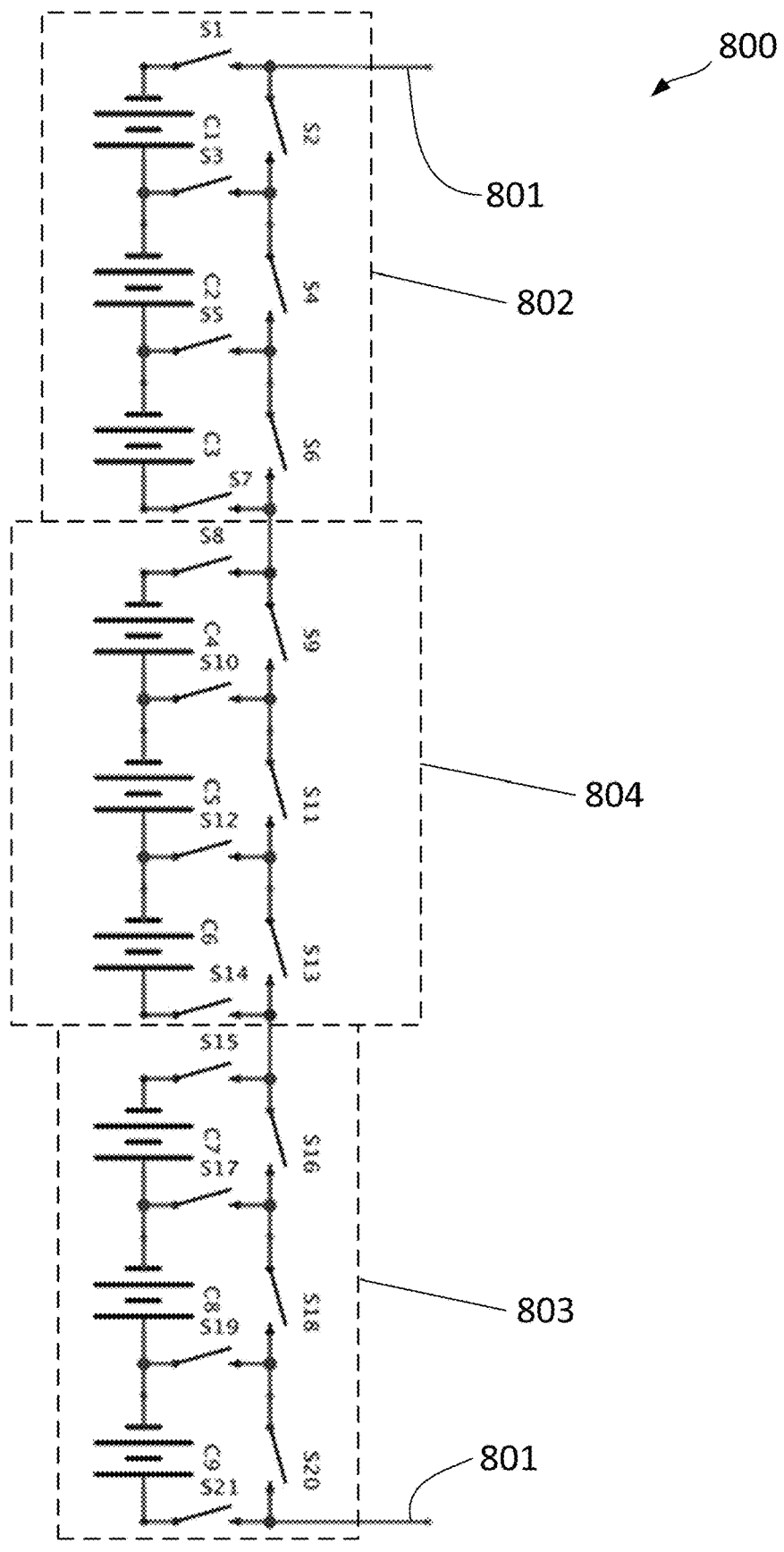
FIG. 8 is a circuit diagram of a battery system according to a further embodiment of the invention.

FIG. 8 shows another battery system 800 which is configured to allow a reduction in system on-resistance and associated energy losses by battery cell units, of which three or more battery cell units may have consecutive terminals connected to one-another. This is achieved by reducing the total number of closed switches in the current path in certain switching states as further explained below. FIG. 8 shows an embodiment in which three battery cell units are permanently connected in series with one another. Equivalent embodiments having four, five or more permanently series-connected battery cell units can equally be achieved.

The battery system includes a battery cell circuit module 802 configured to receive three battery modules (C1-C3), The exemplary battery system 800 shows three series-connected battery cell modules which include the cells C1-C9 coupled thereto. However, the battery modules may have any suitable number of series-connected battery cell units. The battery system 800 includes battery pack terminals 801 for providing electrical energy to an external load or receiving electrical energy from an external supply (not shown).

The circuit module includes nine sets of terminals for coupling with the battery cell units, each terminal set having a positive terminals C1a, C2a, C3a, 4a, C5a, C6a, C7a, C8a, C9a, and a corresponding negative terminals C1b, C2b, C3b C4b, C5b, C6b, C7b, 03b, C9b. Each terminal set C1-C9 is configured for coupling to a battery cell unit.

In the battery system 800, the components of the circuit module are also arranged in such a way that a positive terminal of one set of terminals Cia, C2a, C4a, C5a, C7a, C8a are directly coupled to the negative terminal of an adjacent set of terminals C2b, C3b, C5b, C6b, C8b, C9b by a conductor.

The negative terminal of a first set of terminals C1 is coupled to a switching assembly which includes a first switch S1 for connecting battery cell unit C1 to the circuit module when closed and a second switch S2 or bypassing battery cell unit C1 when closed. More particularly, battery cell unit C1 is connected to the circuit module when the first switch S1 is closed and the second switch S2 is open and the battery cell unit C1 is bypassed from the circuit module when the first switch S1 is open and the second switch S2 is closed. The circuit layout including the set of terminals and the switching assembly forms a first end circuit unit block 802.

Similarly, on an opposite end of the circuit module 803, the positive terminal of terminal set C9 is coupled to the switching assembly of module 803. In a similar manner to the switching assembly of module 802, the switching assembly of module 802 includes a first switch S21 for connecting battery cell unit C9 to the circuit module when closed and a second switch S20 for bypassing battery cell unit C9 when closed. The circuit layout including the set of terminals and the switching assembly forms a second end circuit unit block 802.

Another number of additional circuit unit modules are coupled between the two end circuit modules 802, 803. For example, one additional circuit module 804 is shown between modules 802 and 803. For circuit module 802, the battery cell units C1, C2 and C3 are coupled to a switching assembly comprising switches S1, S2, S3, S4, S5, S6, and S7. Battery cell units C1, C2 and C3 can each be connected and/or bypassed according to the switching states for switches S1, S2, S3, S4, S5, S6, and S7.

| Connection status | Conductive switches | Non-conductive switches |
| --- | --- | --- |
| C1 connected, C2 connected, C3 connected | S1, S7 | S2, S3, S4, S5, S6 |
| C1 connected, C2 connected, C3 bypassed | S1, S5, S6 | S2, S3, S4, S7 |

-continued

| Connection status | Conductive switches | Non-conductive switches |
|---|---|---|
| C1 connected, C2 bypassed, C3 connected | Not feasible | |
| C1 connected, C2 bypassed, C3 bypassed | S1, S3, S4, S6 | S2, S5, S7 |
| C1 bypassed, C2 connected, C3 connected | S2, S3, S7 | S1, S4, S5, S6 |
| C1 bypassed, C2 connected, C3 bypassed | S2, S3, S5, S6 | S1, S4, S7 |
| C1 bypassed, C2 bypassed, C3 connected | S2, S4, S5, S7 | S1, S3, S6 |
| C1 bypassed, C2 bypassed, C3 bypassed | S2, S4, S6 | S1, S3, S5, S7 |

Battery cell units C1, C2 and C3 are all connected to the circuit module 802 when switches S1 and S7 are closed and all other switches are open; cell units C1 and C2 are both connected to the circuit module, but C3 is bypassed when switches S1, S5 and S6 are closed and all other switches are open: and cell units C1, C2 and C3 are all bypassed from the circuit module when switches S2, S4 and S6 are closed and all other switches are open. With the exception that battery cell units C1 and C3 cannot both be connected to the circuit module if cell unit C2 is in a bypassed state, any combination of cell units C1, C2 and C3 may be connected to or bypassed from the circuit module according to the switching states for switches S1, S2, S3. S4, S5, S6, and S7. Circuit unit module 803 has cell units C7 C8 and C9 operates in the same manner as circuit unit block 802 with respect to the operation of cell units C1, C2 and C3.

To reduce or increase the total number of cell units in battery system 800, one or more intermediate circuit unit blocks can be removed or added to the circuit between end unit blocks.

In battery system 800, the switches S1-S21 are arranged in such a way that for at least one switching state, a battery cell unit can be coupled to an adjacent battery cell unit with at most two closed switches in the current path connecting the two adjacent battery cell units. In addition, the system allows a battery cell unit to be coupled to an adjacent or non-adjacent cell unit with at most two closed switches in the current path. For example, battery cell unit C1 can be coupled to adjacent battery cell unit C2 via a conductor and no switches; and battery cell unit C3 can be coupled directly to battery cell unit C4 via conductors and two closed switches S7 and S8. This configuration of circuit components advantageously reduces the total number of switches in the current path during operation to thereby reduce the ohmic energy losses due to on resistance of switches, and increasing the energy efficiency of the overall battery system 800.

Accordingly, to connect the positive terminal for battery cell unit C1 to the negative terminal of battery cell unit C4, whilst connecting intermediate battery cell units C2 and C3, the current only needs to pass through two switches S7 and S8. In this battery system 800, when all nine battery cell units C1-C9 are to carry current, only six switches S1, S7, S8, S14. S15 and S21 are closed and all other switches are open. In this switching state, as the current only flows through six switches S1, S7. S8, S14, S15 and S21, a switch to active battery cell unit ratio of less than one is achieved. Battery system 800 therefore decreases switch associated energy loss in this switching state.

Similar to previous figures, the system 800 of FIG. 8 also allows a plurality of switches to be located in close vicinity to one another and on a single side of the battery cell units, which in practice can decrease both manufacturing cost and space constraints.

While FIG. 8 shows an embodiment in which the terminals of three battery cell units are connected in series with one another directly or via passive elements, similar embodiments having four, five or more permanently series-connected battery cell units C4-C6 within each circuit module 804 can equally be achieved.

In one exemplary implementation of the above described battery system, the system has a circuit module that couples a plurality of battery cell units. The circuit module includes: a first set of terminals C2 having a positive terminal and a negative terminal for coupling to a first battery cell unit; a second set of terminals C3 having a positive terminal and a negative terminal for coupling to a second battery cell unit; a third set of terminals C4 having a positive terminal and a negative terminal for coupling to a third battery cell unit; a fourth set of terminals C5 having a positive terminal and a negative terminal for coupling to a fourth battery cell unit; and a fifth set of terminals C6 having a positive terminal and a negative terminal for coupling to a fifth battery cell unit.

The positive terminal of the first set of terminals C2 is coupled to the negative terminal of the second set of terminals C3 either directly or via one or more passive components. The positive terminal of the third set of terminals C4 is coupled to the negative terminal of the fourth set of terminals C5 either directly or via one or more passive components. The positive terminal of the fourth set of terminals C5 is coupled to the negative terminal of the fifth set of terminals C6 either directly or via one or more passive components. The negative terminal of the first set of terminals C2, the positive terminal of the second set of terminals C3, at least one of the terminals of the third set of terminals C4, at least one of the terminals of the fourth set of terminals C5, and at least one of the fifth set of terminals C6 each being coupled to a switching assembly.

The switching assemblies are operatively configured to selectively connect or disconnect each one of the battery cell units, each switching assembly includes one or more switching devices operable in a conductive state and a non-conductive state. The switching assemblies are operatively configured to selectively allow operating in a plurality of states in which any two or more battery cell units are connected in series, each state including a charging cycle and a discharging cycle of the battery cell units connected in series, the plurality of states including:

a first state in which the first battery cell unit C2 and the second battery cell unit C3 are electrically connected in series and the third battery cell unit C4 is disconnected, achieved for example by switches S2, S3, S7, S9, S11, S13, S16, S18 and S20 being in a conductive state while all other switches shown are in a non-conductive state;

a second state in which the first battery cell unit C2 and the third battery cell unit C4 are electrically connected in series and the second battery cell unit C3 is disconnected, achieved for example by switches S2, S3, S5, S6, S8, S10, S11, S13, S16, S18 and S20 being in a conductive state while all other switches shown are in a non-conductive state;

a third state in which the second battery cell unit C3 and the third battery cell unit C4 are electrically connected in series and the first battery cell unit C2 is disconnected, achieved for example by switches S2, S4, S5, S7, S8, S10, S11, S13, S16, S18 and S20 being in a conductive state while all other switches shown are in a non-conductive state;

a fourth state in which the first battery cell unit C2, the second battery cell unit C3 and the fourth battery cell unit C5 are electrically connected in series and the third battery cell unit C4 is disconnected, achieved for example by switches S2, S3, S7, S9, S10, S12, S13, S16, S18 and S20 being in a conductive state while all other switches shown are in a non-conductive state;

a fifth state in which the first battery cell unit C2, the second battery cell unit C3, the third battery cell unit C4, the fourth battery cell unit C5 and the fifth battery cell unit C6 are electrically connected in series, achieved for example by switches S2, S3, S7, S8, S14, S16, S18 and S20 being in a conductive state while all other switches shown are in a non-conductive state; and a sixth state in which the first battery cell unit C2, the second battery cell unit C3, the fourth battery cell unit C5 and the fifth battery cell unit C6 are electrically connected in series, and the third battery cell unit C4 is disconnected, achieved for example by switches S2, S3, S7, S9, S10, S11, S14, S16, S18 and S20 being in a conductive state while all other switches shown are in a non-conductive state.

In some embodiments, the switching assembly includes a first switching device for connecting an associated battery cell unit, and a second switching device for disconnecting the associated battery cell unit. For example, cell unit C1 can be connected when switch S1 is in conductive mode, and disconnected when switch S2 is in conductive mode.

In one embodiment, switches S1-S21 are a transistor. In other embodiments, switches S1-S21 may each comprise several parallel-connected transistors, which may provide an increased current capability and/or a decreased collective resistance when the several parallel connected transistors are in conductive mode. In other embodiments, one or more of switches S1-S21 may comprise two or more series-connected transistors, whereby the series connection may provide an increased switch terminal voltage capability. Other combinations of parallel and/or series transistors may be utilised as desired.

The switching assemblies are operatively configured to selectively connect or disconnect any one or more of the battery cell units so as to vary a voltage output measured across the output terminals.

In some embodiments, the system includes the aforementioned circuit modules alongside a plurality of battery cell units C1-C9 coupled to the circuit module.

In some embodiments, the system includes a battery mount configured to allow one or more battery cell units to be mounted for coupling to the circuit module. All switching assemblies of the circuit module are located to one side of the battery mount.

In some embodiments, the battery system includes a controller for controlling the switching assemblies of the circuit module. The controller may control the switching assemblies based on the charge and discharge behaviour of the battery cell units. The controller may further determine the charge and discharge behaviour of each battery cell unit based on the voltage, current and/or temperature of the battery cell unit during charging and/or discharging. The controller may further compare a measured voltage, current and/or temperature of the battery cell unit with predetermined voltage, current and/or temperature ranges, determines the battery cell units to connect and/or bypass, and controls the switching assemblies to connect or bypass each battery cell unit.

The invention disclosed in earlier embodiment with FIG. 7 overcomes the problem and limitations posed by the lowest capacity cell unit in an energy storage system comprising multiple cell units connected in series by providing a mechanism to select or disconnect required battery cell units. In addition, it also uses a certain number of switches to achieve cell level control of the battery module. Furthermore, the circuit module of FIG. 7 is also advantageous as it allows selective control of the switches and helps achieving controllable voltage profile (such as an AC signal). More importantly, the circuit module can be operated in a plurality of connection modes. In particular, the switching assemblies are operatively configured to selectively allow operating in a plurality of connection modes, the plurality of connection modes including: a first connection mode in which a series-connection of two or more battery cell units connect to the circuit module output in a first electrical polarity and a second connection mode in which a series-connection of two or more battery cell units connect to the circuit module output in a second polarity that differs from the electrical polarity of the first electrical polarity. Therefore, both positive and negative polarity signals (such as an AC signal) can be achieved by selective control of the switches, and especially without requiring an inverter or a voltage converter.

Furthermore, other factors to consider are when choosing a battery system are: total number of switching devices in the circuit module (total number of switch to battery cell ratio), total number of switching devices in the current path when all the battery cell units are connected in series and number of operating states achievable by the circuit module of the battery system. When the number of switching devices in the circuit module/battery system are more, it leads to additional manufacturing cost and requiring additional maintenance when any switch(es) turn(s) faulty. Furthermore, the additional switches result in additional resistance and additional energy losses when the circuit module is in operation.

It is intended that when all the battery cell units are connected in series, the total number of switching devices in a current path are minimal. This can be preferable since when battery cell units are relatively healthy, the state in which all battery cell units are connected in series may be used for a large share of the operation time.

Additionally, it is also intended that the circuit module facilitates a high number of the operating states. In other words, the ratio between the possible operating states achieved by selective control of the switching assembly (as limited by the actual circuit) to the total operating states possible based on the number of battery cell units (when no cells with different polarities are connected in series). The circuit module of FIG. 7 allows achieving 30 (for example, C1-C4 battery cell units) operating states out of all 30 states. Importantly, when a circuit module would facilitate achieving a high number of operating states, a better control of the circuit module is achieved, which is advantageous to only disconnect intended battery cell unit(s), without sacrificing any unintended battery cell unit(s) in the circuit module.

The embodiment of the invention is advantageous in terms of the number operating states achievable, however, it uses two switching devices in between the circuit path when four battery cell units are connected in series, which leads to high resistance and energy loss. Alternatively, it uses four switching devices when four battery cell units are connected with the same polarities.

The following embodiments (with FIGS. 9-21) describe the circuit modules that may reduce the number of switching devices further.

FIG. 9 shows another embodiment of a battery system 900 which enables combination of cell units to be connected with a negative or positive polarity. The battery system 900 which is configured to allow a reduction in system on-resistance and associated energy losses by battery cell units, of which six battery cell units have consecutive terminals connected to one-another. This is achieved by reducing the total number of closed switches in the current path in certain switching states as further explained below.

FIG. 10 is an alternate depiction of the circuit diagram shown in FIG. 9, which is shown for simplicity. Similar to the earlier embodiment described with reference to FIG. 7, advantages of this circuit module (FIG. 9 or FIG. 10) includes the ability to generate both positive and negative voltages, including alternating current waveforms, without requiring additional conversion equipment(s), such as a DC-AC converter or an h-bridge switching configuration, at the battery output. This may in turn reduce the system cost and efficiency losses in a battery system. Additional advantages of this circuit module are that it requires less number of switching devices (e.g. 6 switching devices less for 6 battery cell units based circuit module and 3 switching devices less for 4 battery cell units based circuit module) compared to the circuitry shown in the FIG. 7 and also requires less switching devices in between when 3 or more battery cell units are connected in series (with same polarity) either positively or negatively (e.g. 2 switching devices less for 6 battery cell units based circuit module and 1 switching devices less for 4 battery cell units based circuit module). The proposed circuit module is advantageous as it reduces the cost, minimises the overall ohmic energy losses due to resistance of the all twelve switching devices within the circuit module and the ohmic energy losses due to resistance of the switches when all battery cells units are connected in series and when the battery system is in operation. Moreover, it also assists in saving the space required to install the battery system and simplifies the circuitry as fewer switching devices are used.

The exemplary depicted battery system 900 (FIG. 9 or FIG. 10) is a circuit module configured to receive six battery cell units C1-C6 coupled thereto. However, any suitable number of battery cell units may be used where one or more base/intermediate circuit unit blocks (base circuits—B1/B2) can be added to the circuit between the end unit blocks 902 and 906 or one base/intermediate circuit block can be removed, provided that no two same base circuit unit blocks (B1/B2) are next to each other. The battery system 900 includes battery pack terminals 901, 909 for providing electrical energy to an external load or receiving electrical energy from an external supply (not shown). The pack terminals are ideally connected to the output of a first and last circuit block.

The circuit module of the depicted example includes six sets of terminals configured to couple with corresponding battery cell units, each set of terminals having a positive terminal, and a corresponding negative terminal. The positive terminal of the first set of terminals C1 being coupled to the negative terminal of the second set of terminals C2 either directly or via one or more passive components. The positive terminal of the third set of terminals C3 being coupled to the negative terminal of the fourth set of terminals C4 either directly or via one or more passive components. The positive terminal of the fifth set of terminals C5 being coupled to the negative terminal of the fourth set of terminals C6 either directly or via one or more passive components.

The positive and negative terminals of the first set of terminals C1, the positive and negative terminals of the second set of terminals C2, the positive and negative terminals of the of the third set of terminals C3 and the positive and negative terminals of the of the fourth set of terminals C4, the positive and negative terminals of the of the fifth set of terminals C5 and the positive and negative terminals of the fourth set of terminals C6 each is coupled to a switching assembly. The switching assemblies includes 12 switching devices including a first switch SA1, a second switch SB1, a third switch SC1, a fourth switch SA2, a fifth switch SB2, a sixth switch SC2, a seventh SA3, an eighth switch SB3, a ninth switch SC3, a tenth switch SA4, an eleventh switch SB4 and a twelfth switch SC4.

In operation, the first switch SA1 is configured to connect battery cell unit C1 to the circuit module negatively (with reference to terminal 901) when closed and any one of the fifth switch SB2 and the sixth switch SC2 is closed. The third switch SC1 is configured to connect battery cell unit C2 to the circuit module positively when closed and any one of the fourth switch SA2 and the fifth switch SB2 is closed. The fourth switch SA2 is configured to connect battery cell unit C4 to the circuit module positively when closed and any one of the eighth switch SB3 and the ninth switch SC3 is closed. The sixth switch SC2 is configured to connect battery cell unit C3 to the circuit module negatively when closed and any one of the eighth switch SB3 and the seventh switch SA3 is closed. The seventh switch SA3 is configured to connect battery cell unit C5 to the circuit module negatively when closed and any one of the eleventh switch SB4 and the twelfth switch SC4 is closed. The ninth switch SC3 is configured to connect battery cell unit C6 to the circuit module positively when closed and any one of the tenth switch SB4 and the ninth switch SA4 is closed.

The battery cell units C1 and C2 can be positively connected to the circuit module when switches SC1 and SA2 are closed and switches SA1, SA2, SB1 and SB2 are open. When both battery cell units are considered positively connected, both cell units C1 and C2 have their respectively negative terminal connected towards the connection to a next switching assembly located left to the battery cell unit C2 in FIG. 10.

When positively or when negatively connected, it is also possible to connect only either one of C1 and C2. For example, C1 is bypassed and C2 is negatively connected when switches SB1 and SC2 are closed and switches SA1, SC1, SA2 and SB2 are open.

The circuit diagram 900 offers certain improvements over the circuit diagram 700 as depicted in FIG. 7. In particular, for base circuit 902 and 904, there is a reduction of 3 switches (requiring 6 switching devices less compared to the circuit module of FIG. 7). Furthermore, the battery cell units are also arranged differently compared to the arrangement of the battery cell units in FIG. 7. In particular, both the adjacent base circuits (B1/B2) include battery cell units connected in opposite order of polarity. For example, the base circuit 902 includes the cell C1 and cell C2 connected in series negatively from the switch SA1 whereas the base circuit 904 includes the cell C4 and cell C3 connected in series positively from the switch SA2. Similarly, the base circuit B3 includes the cell C5 and cell C6 connected in series negatively from the switch SA3. Therefore, for the intermediate circuitries 902, 904 and 906, negative, positive and negative order of polarity (when looked from bottom of the circuit) is provided respectively. It shall be understood that by including additional base circuits, a circuit module with a larger number of battery cell units can be achieved.

Figure 11:
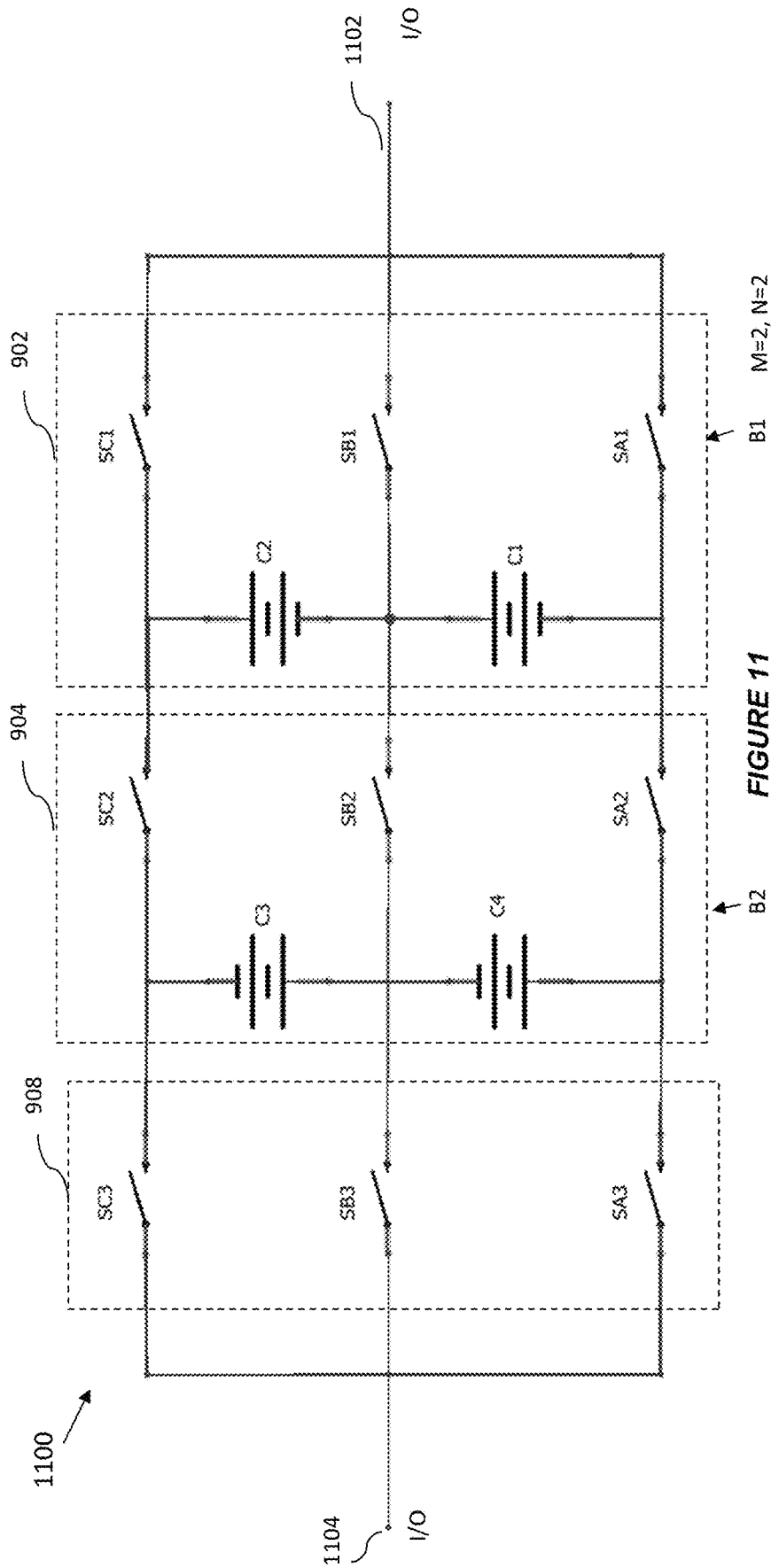
FIG. 11 is a 2*2 circuit diagram (M=2 N=2) of a battery system, which is depicted by reducing one base circuitry from the 3*2 circuit diagram shown in FIG. 9.

FIG. 11 shows a battery system 1100 according to another embodiment, which includes a circuit module configured to receive four battery cell units C1-C4 coupled thereto. In particular, this circuit is derived by using two base circuitries 902 (B1) and 904 (B2) and switching devices 908 in arrangement similar to the circuit module shown in FIG. 10.

The circuit module of the depicted example includes four sets of terminals configured to couple with corresponding battery cell units, each set of terminals having a positive terminal, and a corresponding negative terminal. The positive terminal of the first set of terminals C1 being coupled to the negative terminal of the second set of terminals C2 either directly or via one or more passive components. The positive terminal of the third set of terminals C3 being coupled to the negative terminal of the fourth set of terminals C4 either directly or via one or more passive components.

The positive terminal of the first set of terminals C1 being coupled to the negative terminal of the second set of terminals C2 either directly or via one or more passive components. The positive terminal of the third set of terminals C3 being coupled to the negative terminal of the fourth set of terminals C4 either directly or via one or more passive components.

The positive and negative terminals of the first set of terminals C1, the positive and negative terminals of the second set of terminals C2, the positive and negative terminals of the of the third set of terminals C3 and the positive and negative terminals of the of the fourth set of terminals C4 each are coupled to a switching assembly. The switching assemblies includes nine switching devices including a first switch SA1, a second switch SB1, a third switch SC1, a fourth switch SA2, a fifth switch SB2, a sixth switch SC2, a seventh SA3, an eighth switch SB3 and a ninth switch SC3.

With the circuit module 1100, various possible switching states are shown in the table below. In particular, the states where two or more battery cell units are connected are numbered as a state in this table.

| State | Polarity | Connection Status | Closed Switch | Open Switch |
|---|---|---|---|---|
| Single Cell | Negative | C1 Connected; C2, C3 and C4 Disconnected | SA1, SB2, SB3 | SA2, SB1, SC1, SC2, SA3, SC3 |
| Single Cell | Positive | C1 Connected; C2, C3 and C4 Disconnected | SB1, SA2, SA3 | SA1, SB2, SC1, SC2, SB3, SC3 |
| Single Cell | Negative | C2 Connected; C1, C3 and C4 Disconnected | SB1, SC2, SC3 | SA1, SC1, SB2, SA2, SA3, SB3 |
| Single Cell | Positive | C2 Connected; C1, C3 and C4 Disconnected | SC1, SB2, SB3 | SA1, SA2, SB1, SC2, SA3, SC3 |
| Single Cell | Negative | C3 Connected; C1, C2 and C4 Disconnected | SC1, SC2, SB3 | SA1, SA2, SB1, SB2, SA3, SC3 |
| Single Cell | Positive | C3 Connected; C1, C2 and C4 Disconnected | SB1, SB2, SC3 | SA1, SA2, SC1, SC2, SA3, SB3 |
| Single Cell | Negative | C4 Connected; C1, C2 and C3 Disconnected | SB1, SB2, SA3 | SA1, SA2, SC1, SC2, SB3, SC3 |
| Single Cell | Positive | C4 Connected; C1, C2 and C3 Disconnected | SA1, SA2. SB3 | SB1, SB2, SC1, SC2, SA3, SC3 |
| 1st | Negative | C1 and C2 Connected; C3 and C4 Disconnected | SA1, SC2, SC3 | SA2, SB1, SB2, SC1, SA3, SB3 |
| 1st | Positive | C1 and C2 Connected; C3 and C4 Disconnected | SC1, SA2, SA3 | SA1, SB1, SB2, SC2, SB3, SC3 |
| 2nd | Negative | C1 and C3 Connected; C2 and C4 Disconnected | Not Feasible | Not Feasible |
| 2nd | Positive | C1 and C3 Connected; C2 and C4 Disconnected | Not Feasible | Not Feasible |
| 6th | Negative | C1 and C4 Connected; C2 and C3 Disconnected | SA1, SB2, SA3 | SA2, SB1, SB3, SC1, SC2, SC3 |
| 6th | Positive | C1 and C4 Connected; C2 and C3 Disconnected | SB1, SA2, SB3 | SA1, SA3, SB3, SC1, SC2, SC3 |
| 7th | Negative | C1, C2 and C3 Connected; C4 Disconnected | SA1, SC2, SB3 | SA2, SA3, SB1, SB2, SC1, SC3 |
| 7th | Positive | C1, C2 and C3 Connected; C4 Disconnected | Not Feasible | Not Feasible |
| 4th | Negative | C1, C2 and C4 Connected; C3 Disconnected | Not Feasible | Not Feasible |
| 4th | Positive | C1, C2 and C4 Connected; C3 Disconnected | SC1, SA2, SB3 | SA1, SA3, SB1, SB2, SC2, SC3 |
| 8th | Negative | C1, C3 and C4 Connected; C2 Disconnected | Not Feasible | Not Feasible |
| 8th | Positive | C1, C3 and C4 Connected; C2 Disconnected | SB1, SA2, SC3 | SA1, SA3, SB2, SB3, SC1, SC2 |
| 5th | Negative | C1, C2, C3 and C4 Connected | SA1, SC2, SA3, | SA2, SB1, SB2, SB3, SC1, SC3 |
| 5th | Positive | C1, C2, C3 and C4 Connected | SC1, SA2, SC3 | SA1, SA3, SB1, SB2, SB3, SC2 |

-continued

| State | Polarity | Connection Status | Closed Switch | Open Switch |
|---|---|---|---|---|
| 3rd | Negative | C2 and C3 Connected; C1 and C4 Disconnected | SB1, SC2, SB3 | SA1, SA2, SA3, SB2, SC1, SC3 |
| 3rd | Positive | C2 and C3 Connected; C1 and C4 Disconnected | SC1, SB2, SC3 | SA1, SA2, SA3, SB1, SB3, SC2 |
| 9th | Negative | C2 and C4 Connected; C1 and C3 Disconnected | Not Feasible | Not Feasible |
| 9th | Positive | C2 and C4 Connected; C1 and C3 Disconnected | Not Feasible | Not Feasible |
| 10th | Negative | C3 and C4 Connected; C1 and C2 Disconnected | SC1, SC2, SA3 | SA1, SA2, SB1, SB2, SB3, SC3 |
| 10th | Positive | C3 and C4 Connected; C1 and C2 Disconnected | SA1, SA2, SC3 | SA3, SB1, SB2, SB3, SC1, SC2 |
| 11th | Negative | C2, C3 and C4 Connected; C1 Disconnected | SB1, SC2, SA3 | SA1, SA2, SB2, SB3, SC1, SC3 |
| 11th | Positive | C2, C3 and C4 Connected; C1 Disconnected | Not Feasible | Not Feasible |

It shall be understood that one or more base circuit (either B1 or B32) can be coupled as an intermediate circuit to the circuit module 1100 (e.g. left to the base circuit 902 or to the right to the base circuit 902) provided B1 and B2 circuits are made alternative between both the I/O terminals (901, 909). Whilst the base circuit can be coupled horizontally, for example as 904 is coupled between 902 and 906 in FIG. 9 (or 10), the base circuit can also be coupled vertically, for example as depicted in FIGS. 12, 13, 14A, 14R and 15 (described further).

The circuit module 1100 allows battery cell unit C1 to be coupled to an adjacent battery cell unit C2 via a conductor and no switches; battery cell unit C1 to be coupled directly to battery cell unit C4 via a conductor and one closed switch SA2 or SB2, and the battery cell unit C2 to be coupled directly to an adjacent battery cell unit C3 via a conductor and one closed switch SC2 or SB2.

The circuit module 1100 allows all four battery cell units (C1-C4) to be coupled with no more than two closed switches in the current path. For example, via battery cell unit C1, battery cell unit C2, switching device SC2, battery cell unit C3 and battery cell unit C4 or via battery cell unit C2, battery cell unit C1, switching device SA2, battery cell unit C4 and battery cell unit C3. In these both examples, only one closed switching device is required to connect all four battery cell units in series. Therefore, compared to the circuit diagram depicted in FIG. 7, this configuration of circuit components can advantageously reduce the total number of switches in the current path during operation, thereby reducing the ohmic energy losses due to resistance of the switch(es), and increases the energy efficiency of the battery system 1100. In contrast to the circuit module depicted in FIG. 7, the present circuitry does not allow direct coupling of battery cell unit C1 with battery cell unit C3 and direct coupling of battery cell unit C2 and battery cell unit C4.

In this circuit, when all four battery cell units C1-C4 are to carry current, only three switches SA1, SC2 and SA3 for negative polarity (alternatively SC1, SA2 and SC3 for positive polarity) are closed and all other switches are kept open. In this switching state (state 5), as the current only flows through three switches, the ratio of conducting switching devices to active battery cell units during operation of the circuit module can be 0.75 for this circuit module. This, in particular, assists in decreasing switch associated energy loss.

Additionally, compared with FIG. 7, the circuit module 1100 is also advantageous as it allows a less number of switches to be located in close vicinity to one another and on a single side of the battery cell units, which in practice can decrease both manufacturing cost and space constraints.

The circuit module 1100 depicted in FIG. 11 allows 22 operating states to be achieved by selective control of the switching devices out of 30 possible operating states (compared to 30 operating states achievable out of 30 operating states for the circuit module depicted in FIG. 7), however, it is advantageous due to less number of total switching devices in the circuit module and less number of switching device in between when all four battery cell units are connected in series.

Figure 12:
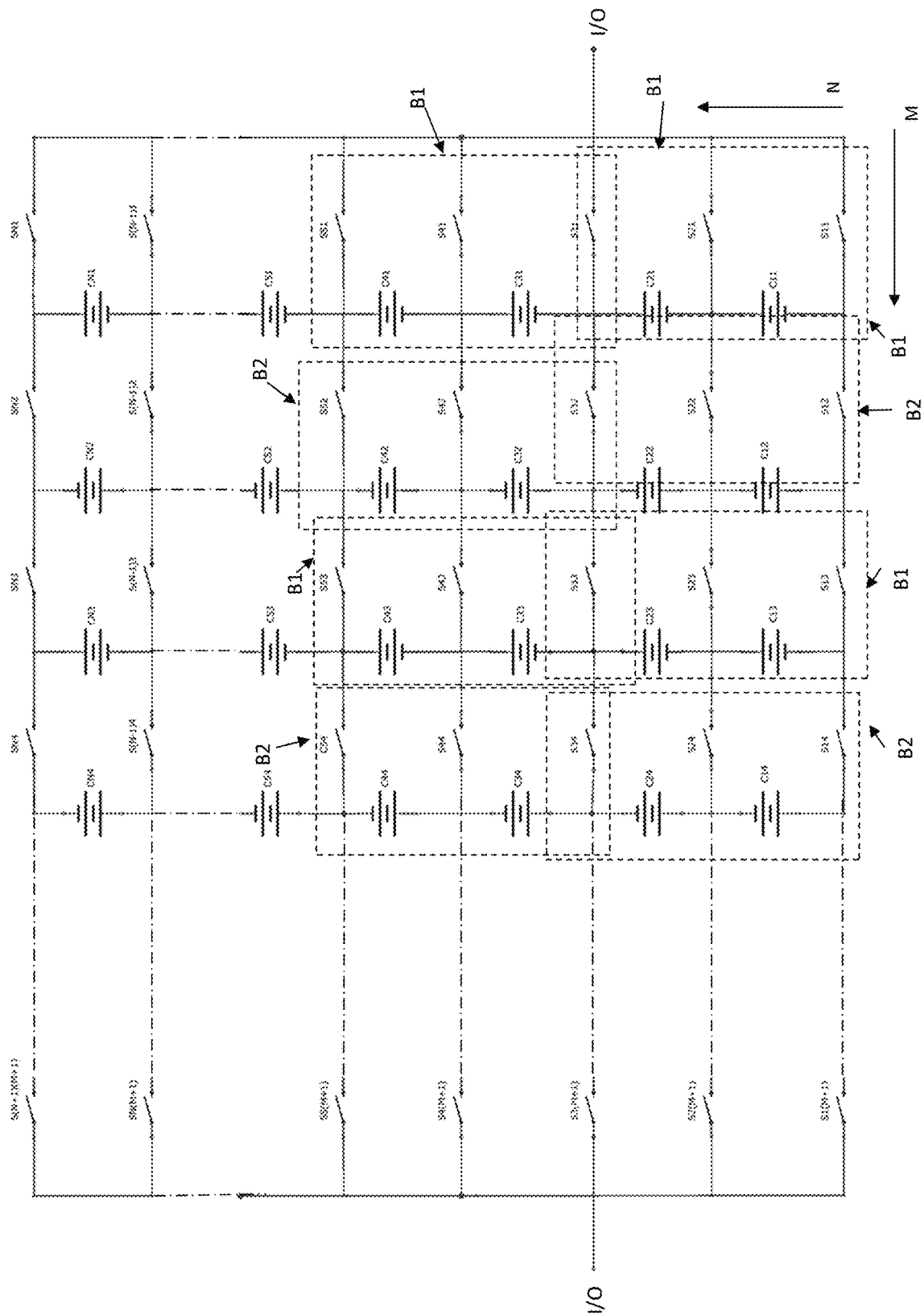
FIG. 12 is an M*N circuit diagram of a battery system, which is depicted by extending the 2*2 circuit diagram shown in FIG. 11.

FIG. 12 shows a generic extension circuit of the circuitry depicted in FIG. 11. The base or intermediary circuit B1 and B2 can be used to extend and achieve an example M*N circuit module. M (width) and N (height) are integers ranging from 1, 2, 3, 4 and so on. The circuit includes a plurality of circuit modules depicted in FIG. 11. It shall also be understood that a different M*N circuit module can be achieved by simply replacing B1 base circuit with B2 base circuit and vice versa. The M*N circuit module can be used to generate large battery systems starting from minimum 4 battery cell units to a much larger number of battery cell units based on the overall battery system capacity required. It shall also be noted that in some embodiments for a battery system, the base circuit would overlap with each other when N or M is in the odd number.

The following table demonstrates the number of battery cell units and the number of switching devices required to achieve the example circuit module for a given width (M) and height (N).

| M (Width) | N (Height) | No of battery cell units required | No of Switches required |
|---|---|---|---|
| 2 | 2 | 4 | 9 |
| 3 | 4 | 12 | 20 |
| 3 | 3 | 9 | 16 |
| 4 | 2 | 8 | 15 |
| 4 | 3 | 12 | 20 |
| 4 | 4 | 16 | 25 |

In accordance to this table, the circuit module shown in FIG. 9 (FIG. 10) and FIG. 11 can be considered to be of 3*2 and 2*2 circuitry respectively. For the M*N circuitry: the number of battery cell units required are: M+N and the number of switches required are (M+1)*(N+1), for a circuit module having M width and N height.

FIG. 13 shows a 2*3 circuit module (M=2; N=3) of a battery system similarly derived based on M*N extension circuit module depicted in FIG. 12. As can be noted, it has 6 battery cell units and 12 switches coupled thereto and achieved by starting with two base circuits B2 instead of base circuit B1. It shall be noted that the base circuits (e.g. bottom B2 and top B2 are overlapping and bottom B1 and top B1 are overlapping) are overlapping on each other. Accordingly, other circuitries can also be achieved by such overlapping of the base circuitries (B1 and B2) either horizontally or vertically.

FIG. 14A shows a 4*3 circuit module (M=4; N=3) of a battery system similarly derived based on M*N generic extension circuit depicted in FIG. 12.

FIG. 14B shows a 4*2 circuit module (M=4; N=2) of a battery system similarly derived based on M*N generic extension circuit depicted in FIG. 12.

FIG. 15 shows a battery system according to a further embodiment of the invention. The figure shows a circuit module of a battery system where height of the circuit on M axis is varied. As can be seen, for M=1 and 4, N is 3. However, for M=2 and 3, N is 4. It shall be understood that base circuits B1 and B2 can be used to derive other circuit modules on similar lines. Accordingly, other circuitries can also be achieved by having variation in the height and width.

Figure 16:
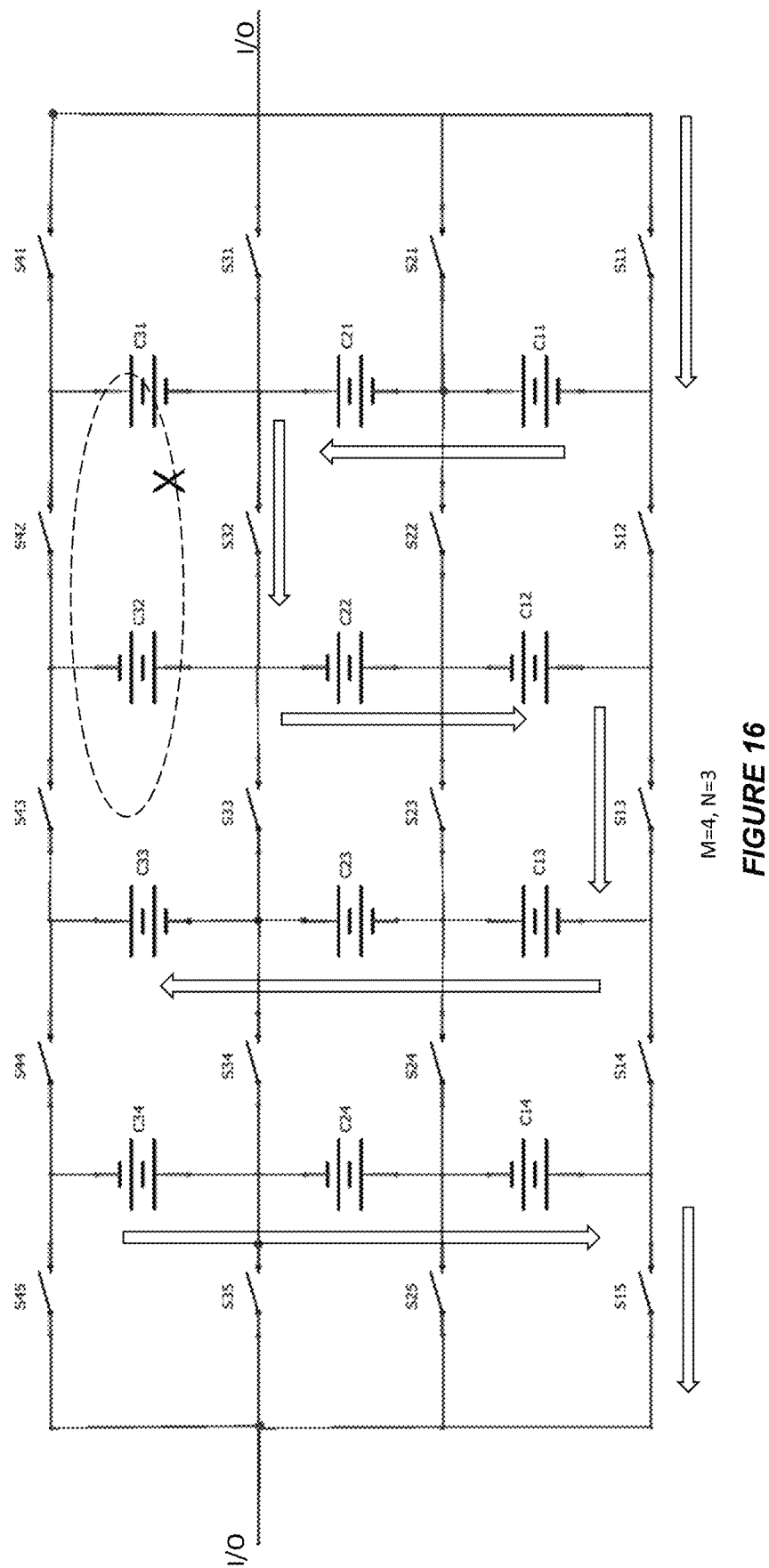
FIG. 16 is a demonstration of a scenario when the battery system depicted in FIG. 14 is in operation.

FIG. 16 is a demonstration of a scenario when the circuit module of a battery system depicted in FIG. 14 is in operation. In this circuit module, when a conductive path or a battery cell unit C31 (marked as X) for example, is detected as faulty, the controller controls the switching assemblies of the circuit module so that rest of the available battery cell units can still be used (during charging and discharging). In particular, switches S11, S32, S113, S44 and S15 are closed, whereas the rest of the switches are kept open. As it can be seen in the figure, out of the 12 battery cell units, 10 battery cell units are still operational by selective control of the switching devices. It can be noted that the battery cell units C31 (the faulty cell or faulty conductive path cell) and an additional battery cell unit C32 (healthy cell) is not used. In comparison to embodiment described in relation to FIG. 7, the proposed embodiment doesn't permit one additional battery cell unit to be used other than the intended battery cell unit (C31). It is since the circuit module allows less number of operating states to be achieved compared to the circuit module of FIG. 7. Nevertheless, the battery system of FIG. 11 uses less switching devices and therefore the circuit module can still be advantageous (due to low energy losses), for example when the battery cells and the conductive path tend to be healthy for longer duration of the usage of the circuit module.

Figure 17:
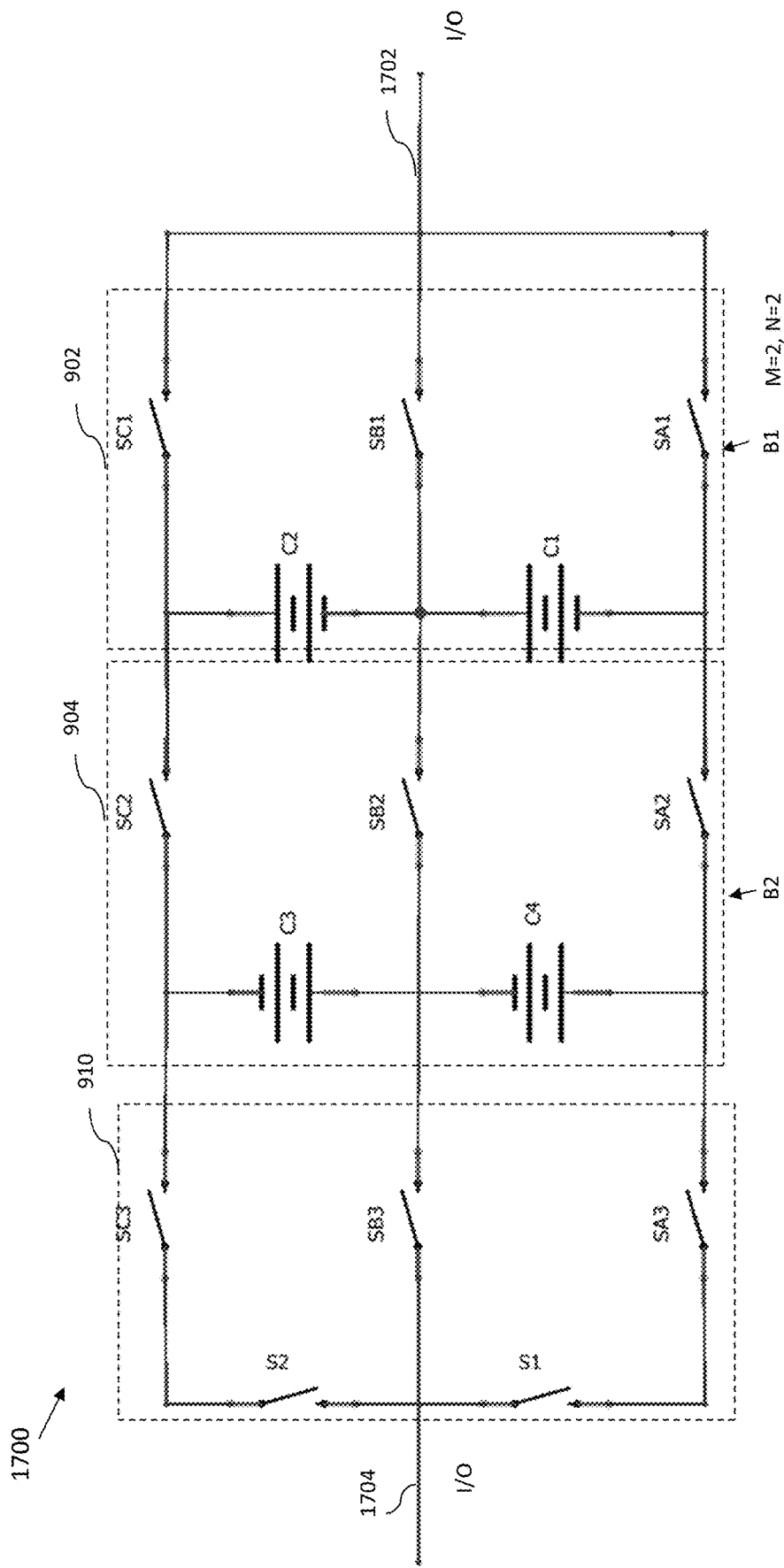
FIG. 17 is a circuit diagram of a battery system according to a further embodiment of the invention.

FIG. 17 shows an alternative embodiment of the present invention. The circuit module is different only from the circuit module depicted in FIG. 11, in that it uses two additional switching devices. As it can be noted, an additional switching S1 is used along with switching device SA3 and a switching device S2 is used along with switching device SC3.

In a similar way, the other alternative circuit modules can also be achieved by providing preferably one additional switching device with any one or more of the switching devices such as SB3, SA1, SB1 and SC1 (and SA3, and SC3). These additional switches (with any one or more of the switching devices SA1, SB1, SC1, SA3, SB3, SC3) can be provided considering the importance of the lines (at the left and right edges of the circuit module where I/O lines are placed) and to avoid situation where the circuit module is nonoperative.

Referring back to the embodiment described with FIG. 11, the switching assemblies are operatively configured to selectively connect or disconnect each one of the battery cell units, each switching assembly includes one or more switching devices operable in a conductive state and a non-conductive state. The switching assemblies are operatively configured to selectively allow operating in a plurality of states in which any two or more battery cell units are connected in series, each state including a charging cycle and a discharging cycle of the battery cell units including:

a first state in which the first battery cell unit C1 and the second battery cell unit C2 are electrically connected in series and the third battery cell unit C3 and the fourth battery cell unit C4 are disconnected,
for negative polarity, achieved for example by switches SA1, SC2 and SC3 being in a conductive state while all other switches shown are in a non-conductive state,
whereas for positive polarity, achieved for example by switches SC1, SA2 and SA3 being in a conductive state while all other switches shown are in a non-conductive state;

a third state in which the second battery cell unit C2 and the third battery cell unit C3 are electrically connected in series and the second battery cell unit C1 and the second battery cell unit C4 is disconnected,
for negative polarity, achieved for example by switches SB1, SC2 and SB3 being in a conductive state while all other switches shown are in a non-conductive state,
whereas for positive polarity, achieved for example by switches SC1, SB2 and SC3 being in a conductive state while all other switches shown are in a non-conductive state, a fourth state in which the first battery cell unit C1, the second battery cell unit C2 and the fourth battery cell unit C4 are electrically connected in series and the first battery cell unit C3 is disconnected,
for positive polarity, achieved for example by switches SC1, SA2 and SB3 being in a conductive state while all other switches shown are in a non-conductive state, a fifth state in which the first battery cell unit C1, the second battery cell unit C2, the third battery cell unit C3 and the fourth battery cell unit C4 are electrically connected in series,
for negative polarity, achieved for example by switches SA1, SC2 and SA3 being in a conductive state while all other switches shown are in a non-conductive state,
whereas for positive polarity, achieved for example by switches SC1, SA2 and SC3 being in a conductive state while all other switches shown are in a non-conductive state, a sixth state in which the first battery cell unit C1 and the fourth battery cell unit C4 are electrically connected in series and the second battery cell unit C2 and the third battery cell unit C3 are disconnected,
for negative polarity, achieved for example by switches SA1, SB2 and SA3 being in a conductive state while all other switches shown are in a non-conductive state,
whereas for positive polarity, achieved for example by switches SB1, SA2 and SB3 being in a conductive state while all other switches shown are in a non-conductive state, a seventh state in which the first battery cell unit C1, the second battery cell unit C2 and the third battery cell unit C3 are electrically connected in series, and the fourth battery cell unit C4 is disconnected,
- for negative polarity, achieved for example by switches SA1, SC2 and SB3 being in a conductive state while all other switches shown are in a non-conductive state, an eight state in which the first battery cell unit C1, the third battery cell unit C3 and the fourth battery cell unit C4 are electrically connected in series and the second battery cell unit C2 is disconnected,
- for positive polarity, achieved for example by switches SB1, SA2 and SC3 being in a conductive state while all other switches shown are in a non-conductive state, a tenth state in which the third battery cell unit C3, the fourth battery cell unit C4 are electrically connected in series, and the first battery cell unit C1 and second battery cell unit C2 are disconnected,
- for negative polarity, achieved for example by switches SC1, SC2 and SA3 being in a conductive state while all other switches shown are in a non-conductive state,
- whereas for positive polarity, achieved for example by switches SA1, SA2 and SC3 being in a conductive state while all other switches shown are in a non-conductive state; and an eleventh state in which the second battery cell unit C2, the third battery cell unit C3 and the fourth battery cell unit C4 are electrically connected in series and the first battery cell unit C3 is disconnected,
- for positive polarity, achieved for example by switches SB1, SC2 and SA3 being in a conductive state while all other switches shown are in a non-conductive state.

In one embodiment, switches SA1-SC3 are formed of transistor(s). In other embodiments, switches SA1-SC3 may each comprise several parallel-connected transistors, which may provide an increased current capability and/or a decreased collective resistance when the several parallel connected transistors are in conductive mode. In other embodiments, one or more of switches SA1-SC3 may comprise two or more series-connected transistors, whereby the series connection may provide an increased switch terminal voltage capability. Other combinations of parallel and/or series transistors may be utilised as desired.

The switching assemblies are operatively configured to selectively connect or disconnect any one or more of the battery cell units so as to vary a voltage output measured across the output terminals.

In some embodiments, the system includes the aforementioned circuit modules alongside a plurality of battery cell units coupled to the circuit module.

In some embodiments, the switching assemblies are operatively configured to selectively allow operating in a plurality of connection modes, the plurality of connection modes including a first connection mode in which a series-connection of two or more battery cell units connect to the circuit module output in a first electrical polarity, and a second connection mode in which a series-connection of two or more battery cell units connect to the circuit module output in a second polarity that differs from the electrical polarity of the first electrical polarity.

In some embodiments, the system includes a battery mount configured to allow one or more battery cell units to be mounted for coupling to the circuit module. All switching assemblies of the circuit module are located to one side of the battery mount.

In some embodiments, the battery system includes a controller for controlling the switching assemblies of the circuit module. The controller may control the switching assemblies based on the charge and discharge behaviour of the battery cell units. The controller may further determine the charge and discharge behaviour of each battery cell unit based on the voltage, current and/or temperature of the battery cell unit during charging and/or discharging. The controller may further compare a measured voltage, current and/or temperature of the battery cell unit with predetermined voltage, current and/or temperature ranges, determines the battery cell units to connect and/or bypass, and controls the switching assemblies to connect or bypass each battery cell unit.

Figures 18, 19:
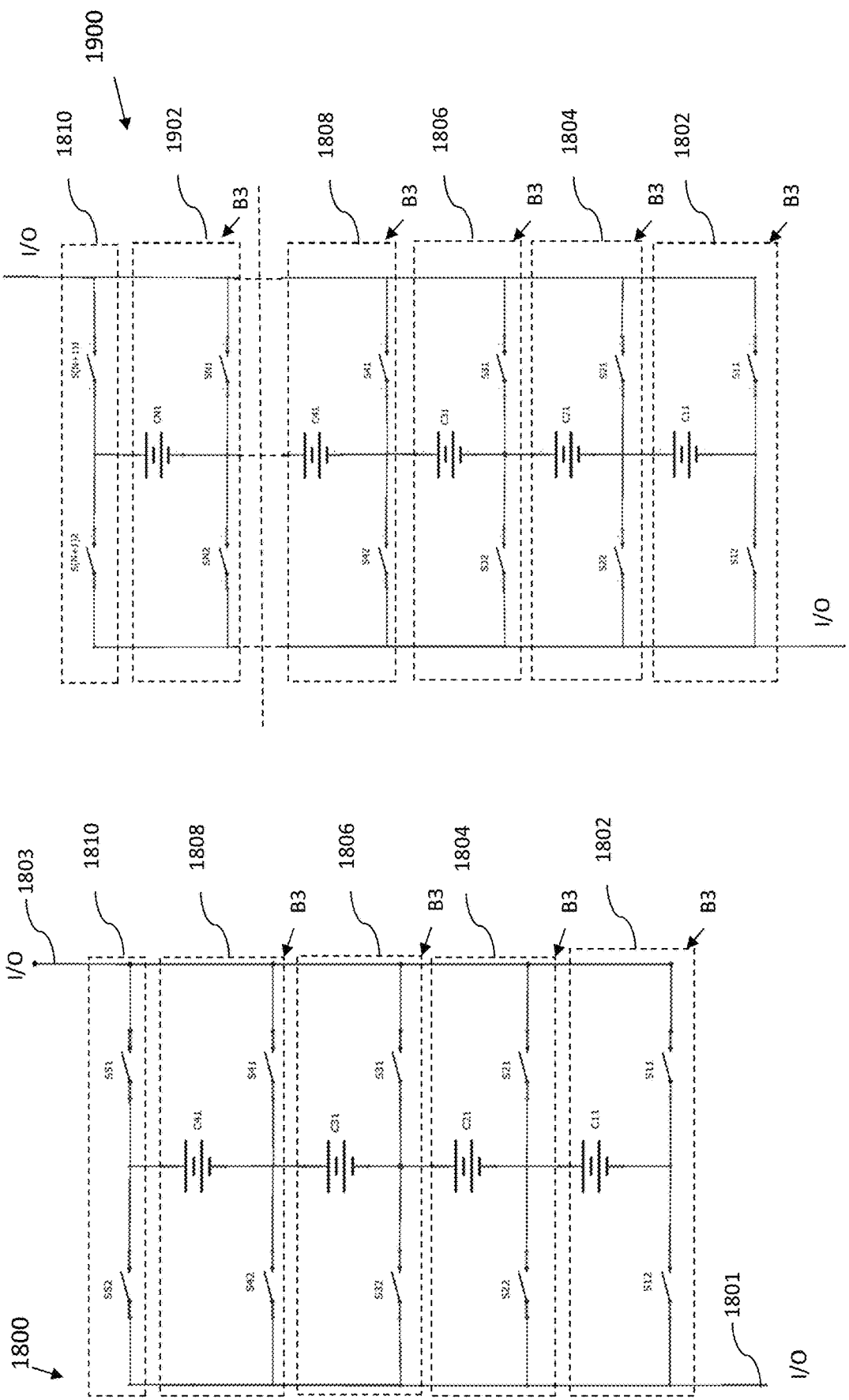
FIG. 18 is a circuit diagram of a battery system according to a further embodiment of the invention.
FIG. 19 is 1*N circuit diagram of a battery system, which is depicted by extending the 1*4 circuit diagram shown in FIG. 11.

FIG. 18 shows another embodiment of a battery system 1800 which enables combination of cell units to be connected with a negative or positive polarity. Similar to the earlier embodiment described with FIGS. 7 and 9-17, advantages of this circuit module includes the ability to generate both positive and negative voltages, including alternating current waveforms, without requiring additional conversion equipment(s), such as a DC-AC converter or an h-bridge switching configuration, at the battery output. This may in turn reduce the system cost and efficiency losses in a battery system. Additional advantage of this circuit module is that it requires no switching devices in between when a plurality of battery cell units are connected in series (with same polarity) either positively or negatively. Thereby, meaning it requires two switching devices less compared to the embodiment described in FIG. 7 and one switching device less when compared to the embodiment described with FIGS. 9 and 10.

The exemplary depicted battery system 1800 is a circuit module configured to receive four battery cell units C1-C4 coupled thereto. However, any suitable number of battery cell units may be used where one or more base/intermediate circuit unit blocks can be added to the circuit between the end unit blocks 1802 and 1808. The battery system 1800 includes battery pack terminals 1801, 1803 for providing electrical energy to an external load or receiving electrical energy from an external supply (not shown). The pack terminals are ideally connected to the output of a first and last circuit block.

The circuit module of the depicted example includes four sets of terminals configured to couple with corresponding battery cell units, each set of terminals having a positive terminal, and a corresponding negative terminal. The circuit module as depicted includes four base circuits B3 (1802, 1804, 1806, 1808) adjacently placed and coupled to each other. The circuit module has a switching circuit 1810 at the one end which includes two switches. Each base circuit includes two switches and a battery cell unit.

The circuit modules include 4 battery cell units (C11, C21, C31, C41) and 10 switching devices. The positive terminal of the first set of terminals of the first battery cell unit C11 and the negative terminal of a second set of terminals of the second battery cell unit C21 are coupled via a conductor directly. The positive terminal of the second set of terminals of the second battery cell unit C21 and the negative terminal of a third set of terminals of the third battery cell unit C31 are coupled via a conductor directly. The positive terminal of the third set of terminals of the third battery cell unit C31 and the negative terminal of a fourth set of terminals of the fourth battery cell unit C41 are coupled via a conductor directly. Both negative and positive terminals of each of the four battery cell units are coupled to a switching assembly. The switching assemblies includes a first, second, third, fourth, fifth, sixth, seventh, eighth, ninth, tenth switching devices—S1, S12, 21, S22, C31, S32, C41, S42, S51, S52 respectively.

The switching assembly disconnects the battery cell unit C11, when switching devices S1i and S12 are open. The switching assembly disconnects the battery cell unit C21, when switching devices S21 and S22 are open. The switching assembly disconnects the battery cell unit C31, when switching devices S31 and S32 are open. The switching assembly disconnects the battery cell unit C41, when switching devices S41 and S42 are open.

With reference to circuit module 1800, various possible switching states are shown in the table below. In particular, the states where two or more battery cell units are connected are numbered as a state in this table.

| State | Polarity | Connection Status | Closed Switch | Open Switch |
|---|---|---|---|---|
| Single Cell | Negative | C11 Connected; C21, C31 and C41 Disconnected | S12, S21 | S11, S22, S31, S32, S41, S42, S51, S52 |
| Single Cell | Positive | C11 Connected; C21, C31 and C41 Disconnected | S22, S11 | S12, S21, S31, S32, S41, S42, S51, S52 |
| Single Cell | Negative | C21 Connected; C11, C31 and C41 Disconnected | S22, S31 | S11, S12, S21, S32, S41, S42, S51, S52 |
| Single Cell | Positive | C21 Connected; C11, C31 and C41 Disconnected | S32, S21 | S11, S12, S22, S31, S41, S42, S51, S52 |
| Single Cell | Negative | C31 Connected; C11, C21 and C41 Disconnected | S32, S41 | S11, S12, S21, S22, S31, S42, S51, S52 |
| Single Cell | Positive | C31 Connected; C11, C21 and C41 Disconnected | S42, S31 | S11, S12, S21, S22, S32, S41, S51, S52 |
| Single Cell | Negative | C41 Connected; C11, C21 and C31 Disconnected | S42, S51 | S11, S12, S21, S22, S31, S32, S41, S52 |
| Single Cell | Positive | C41 Connected; C11, C21 and C31 Disconnected | S52, S41 | S11, S12, S21, S22, S31, S32, S42, S51 |
| 1st | Negative | C11 and C21 Connected; C31 and C41 Disconnected | S12, S31 | S11, S21, S22, S32, S41, S42, S51, S52 |
| 1st | Positive | C11 and C21 Connected; C31 and C41 Disconnected | S32, S11 | S12, S21, S22, S31, S41, S42, S51, S52 |
| 2nd | Negative | C11 and C31 Connected; C21 and C41 Disconnected | Not Feasible | Not Feasible |
| 2nd | Positive | C11 and C31 Connected; C21 and C41 Disconnected | Not Feasible | Not Feasible |
| 6th | Negative | C11 and C41 Connected; C21 and C31 Disconnected | Not Feasible | Not Feasible |
| 6th | Positive | C11 and C41 Connected; C21 and C31 Disconnected | Not Feasible | Not Feasible |
| 7th | Negative | C11, C21 and C31 Connected; C41 Disconnected | S12, S41 | S11, S21, S22, S31, S32, S42, S51, S52 |
| 7th | Positive | C11, C21 and C31 Connected; C41 Disconnected | S42, S11 | S12, S21, S22, S31, S32, S41, S51, S52 |
| 4th | Negative | C11, C21 and C41 Connected; C31 Disconnected | Not Feasible | Not Feasible |
| 4th | Positive | C11, C21 and C41 Connected; C31 Disconnected | Not Feasible | Not Feasible |
| 8th | Negative | C11, C31 and C41 Connected; C21 Disconnected | Not Feasible | Not Feasible |
| 8th | Positive | C11, C31 and C41 Connected; C21 Disconnected | Not Feasible | Not Feasible |
| 5th | Negative | C11, C21, C31 and C41 Connected | S12, S51 | S11, S21, S22, S31, S32, S41, S42, S52 |
| 5th | Positive | C11, C21, C31 and C41 Connected | S52, S11 | S12, S21, S22, S31, S32, S41, S42, S51, |
| 3rd | Negative | C21 and C31 Connected; C11 and C41 Disconnected | S22, S41 | S11, S12, S21, S31, S32, S42, S51, S52 |
| 3rd | Positive | C21 and C31 Connected; C11 and C41 Disconnected | S42, S21 | S11, S12, S22, S31, S32, S41, S51, S52 |
| 9th | Negative | C21 and C41 Connected; C11 and C31 Disconnected | Not Feasible | Not Feasible |
| 9th | Positive | C21 and C41 Connected; C11 and C31 Disconnected | Not Feasible | Not Feasible |

| State | Polarity | Connection Status | Closed Switch | Open Switch |
|---|---|---|---|---|
| 10th | Negative | C31 and C41 Connected; C11 and C21 Disconnected | S32, S51 | S11, S12, S21, S22, S31, S41, S42, S52 |
| 10th | Positive | C31 and C41 Connected; C11 and C21 Disconnected | S52, S31 | S11, S12, S21, S22, S32, S41, S42, S51 |
| 11th | Negative | C21, C31 and C41 Connected; C11 Disconnected | S22, S51 | S11, S12, S21, S31, S32, S41, S42, S52 |
| 11th | Positive | C21, C31 and C41 Connected; C11 Disconnected | S52, S21 | S11, S12, S22, S31, S32, S41, S42, S51 |

As can be noted in the table, the circuit module allows achieving 20 states out of 30 states. The advantage of this circuit module is that only two switches are required to be closed when operating on any of those 20 states. Furthermore, when all the battery cell units are connected in series, no switching device is required to be connected in series in between the battery cell units. This, in particular, helps in reducing the energy losses of the circuit module.

The ratio of conducting switching devices to active battery cell units during operation of the circuit module is minimal to be 0.50 for this circuit module (refer state 5).

Figure 21B:
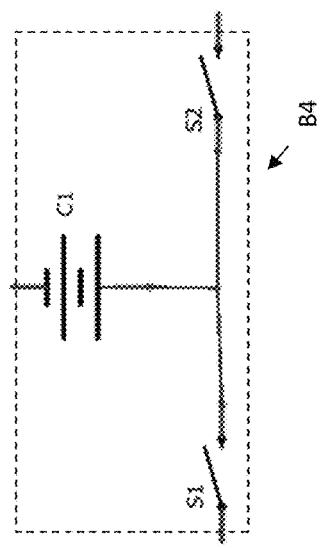
FIG. 21B is a circuit diagram of a base circuit B4 that can be used as an intermediate circuit block in various embodiments of the invention.

FIG. 19 shows a generic extension circuit 1900 of the circuit depicted in FIG. 18. The base or intermediary circuit B3 is used similarly the circuit module of FIG. 18 to extend and achieve an example N*1 circuit module. The circuit module can include one or more base circuits (B3) between base circuits 1808 and 1902. It shall also be understood that another type of N*1 circuit module can also be achieved by simply replacing B3 base circuit of FIG. 19 with B4 base circuit (which is shown in FIG. 21B). As can be noted, the base circuit B4 has a similar configuration as the B3 base circuit, however, polarity of the battery cell units are reversed with reference to their connection to the corresponding switches.

Accordingly, the N*1 circuit module (either with B3 or B4 base circuits) can be used to achieve various other circuit modules having a minimum of 4 battery cell units to a very large number of battery cell units.

The following table shows the number of battery cell units and the number of switching devices required to achieve the example circuit module for a given height (N) according to present embodiment.

| N (Height) | No of battery cell units required | No of Switches required |
|---|---|---|
| 4 | 4 | 10 |
| 8 | 8 | 18 |
| 9 | 9 | 20 |
| 10 | 10 | 22 |
| 12 | 12 | 26 |
| 16 | 16 | 34 |

Figure 20:
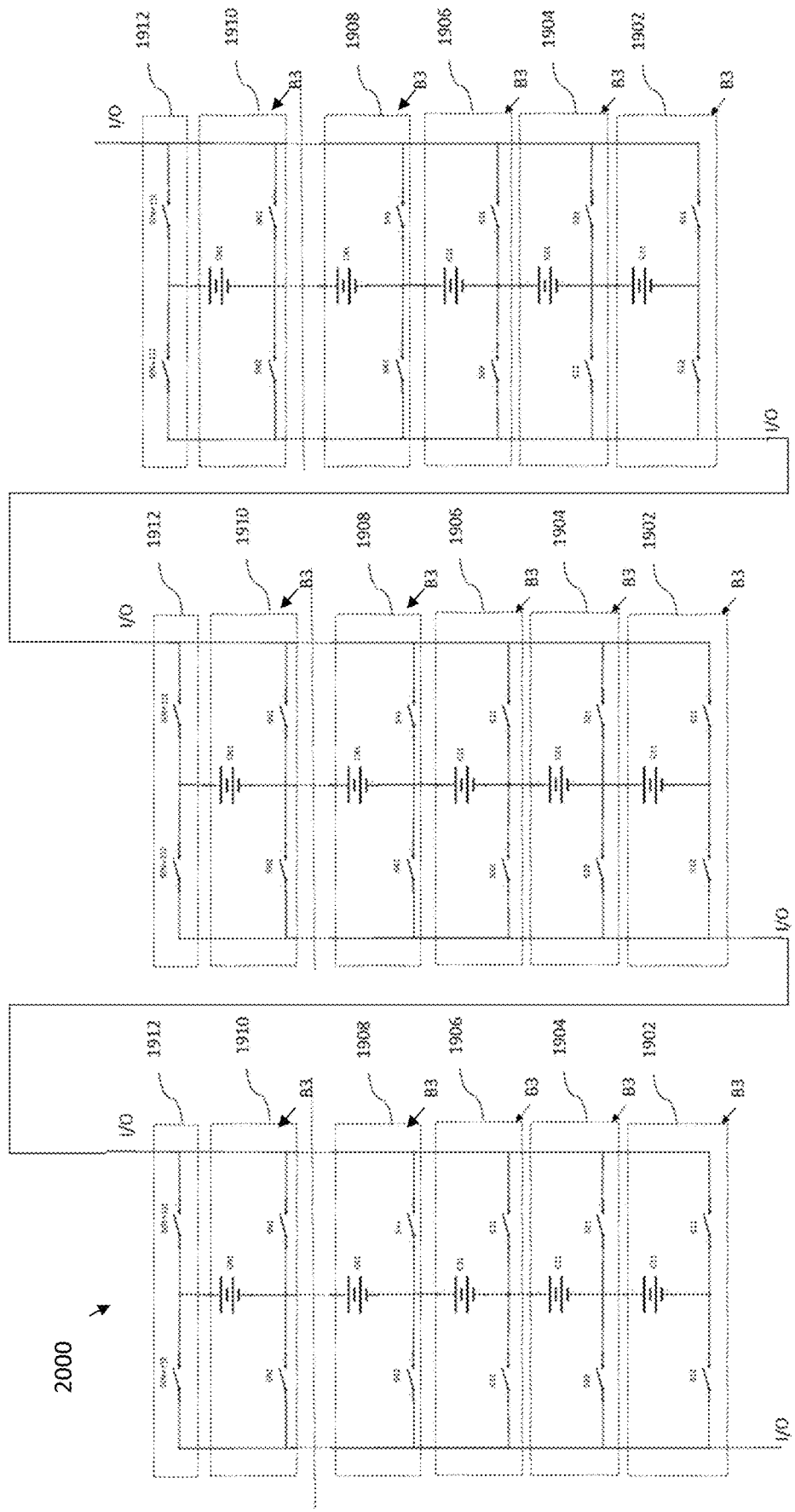
FIG. 20 is a circuit diagram of a battery system in which three 1*N circuits depicted in FIG. 19 are connected in series.

FIG. 20 shows another embodiment of a battery system 2000, which demonstrates series connection of three circuit module 1900.

The present embodiment is advantageous noting that the industry is moving to battery packs which generally have more than two battery cell units in a battery pack. For example, few battery pack manufacturers have 10 battery cell units in each battery pack. In such case, embodiment described with FIG. 19 can be used to achieve a 10*1 circuit module (N=10). To achieve such a battery module, as shown in above table, 22 switching devices would require to be coupled to the battery cell units according to the circuit depicted in FIG. 19.

According to the present embodiment, a plurality of such battery packs can be connected in series for example as shown in FIG. 20 to achieve a battery system with higher voltage capacity.

Referring back to the embodiment described with FIG. 18, the switching assemblies are operatively configured to selectively connect or disconnect each one of the battery cell units, each switching assembly includes one or more switching devices operable in a conductive state and a non-conductive state. The switching assemblies are operatively configured to selectively allow operating in a plurality of states in which any two or more battery cell units are connected in series, each state including a charging cycle and a discharging cycle of the battery cell units including:

a first state in which the first battery cell unit C11 and the second battery cell unit C21 are electrically connected in series and the third battery cell unit C31 and the fourth battery cell unit C41 are disconnected, achieved for negative polarity, for example by switches S12 and S31 being in a conductive state while all other switches shown are in a non-conductive state, and whereas achieved for positive polarity, for example by switches S32 and S11 being in a conductive state while all other switches shown are in a non-conductive state;

a third state in which the second battery cell unit C21 and the third battery cell unit C31 are electrically connected in series and the second battery cell unit C11 and the second battery cell unit C41 is disconnected, achieved for negative polarity, for example by switches S22 and S41 being in a conductive state while all other switches shown are in a non-conductive state, and whereas achieved for positive polarity, for example by switches S42 and S21 being in a conductive state while all other switches shown are in a non-conductive state;

a fifth state in which the first battery cell unit C11, the second battery cell unit C21, the third battery cell unit C31 and the fourth battery cell unit C41 are electrically connected in series, achieved for negative polarity, for example by switches S12 and S51 being in a conductive state while all other switches shown are in a non-conductive state, and whereas achieved for positive polarity, for example by switches S52 and S11 being in a conductive state while all other switches shown are in a non-conductive state;

a seventh state in which the first battery cell unit C11, the second battery cell unit C21 and the third battery cell unit C31 are electrically connected in series, and the fourth battery cell unit C41 is disconnected, achieved for negative polarity, for example by switches S12 and S41 being in a conductive state while all other switches shown are in a non-conductive state, and whereas achieved for positive polarity, for example by switches S42 and S11 being in a conductive state while all other switches shown are in a non-conductive state;

a tenth state in which the third battery cell unit C31, the fourth battery cell unit C41 are electrically connected in series, and the first battery cell unit C11 and second battery cell unit C21 are disconnected, achieved for negative polarity, for example by switches S32 and S51 being in a conductive state while all other switches shown are in a non-conductive state, and whereas achieved for positive polarity, for example by switches S52 and S31 being in a conductive state while all other switches shown are in a non-conductive state; and an eleventh state in which the second battery cell unit C21, the third battery cell unit C31 and the fourth battery cell unit C41 are electrically connected in series and first battery cell unit C11 is disconnected, achieved for negative polarity, for example by switches S22 and S51 being in a conductive state while all other switches shown are in a non-conductive state, and whereas achieved for positive polarity, for example by switches S52 and S21 being in a conductive state while all other switches shown are in a non-conductive state.

In one embodiment, switches S11-S52 are formed of transistor(s). In other embodiments, switches S11-S52 may each comprise several parallel-connected transistors, which may provide an increased current capability and/or a decreased collective resistance when the several parallel connected transistors are in conductive mode. In other embodiments, one or more of switches S11-S52 may comprise two or more series-connected transistors, whereby the series connection may provide an increased switch terminal voltage capability. Other combinations of parallel and/or series transistors may be utilised as desired.

The switching assemblies are operatively configured to selectively connect or disconnect any one or more of the battery cell units so as to vary a voltage output measured across the output terminals.

In some embodiments, the system includes the aforementioned circuit modules alongside a plurality of battery cell units coupled to the circuit module.

In some embodiments, the switching assemblies are operatively configured to selectively allow operating in a plurality of connection modes, the plurality of connection modes including a first connection mode in which a series-connection of two or more battery cell units connect to the circuit module output in a first electrical polarity, and a second connection mode in which a series-connection of two or more battery cell units connect to the circuit module output in a second polarity that differs from the electrical polarity of the first electrical polarity.

In some embodiments, the system includes a battery mount configured to allow one or more battery cell units to be mounted for coupling to the circuit module. All switching assemblies of the circuit module are located to one side of the battery mount.

In some embodiments, the battery system includes a controller for controlling the switching assemblies of the circuit module. The controller may control the switching assemblies based on the charge and discharge behaviour of the battery cell units. The controller may further determine the charge and discharge behaviour of each battery cell unit based on the voltage, current and/or temperature of the battery cell unit during charging and/or discharging. The controller may further compare a measured voltage, current and/or temperature of the battery cell unit with predetermined voltage, current and/or temperature ranges, determines the battery cell units to connect and/or bypass, and controls the switching assemblies to connect or bypass each battery cell unit.

Figure 21A:
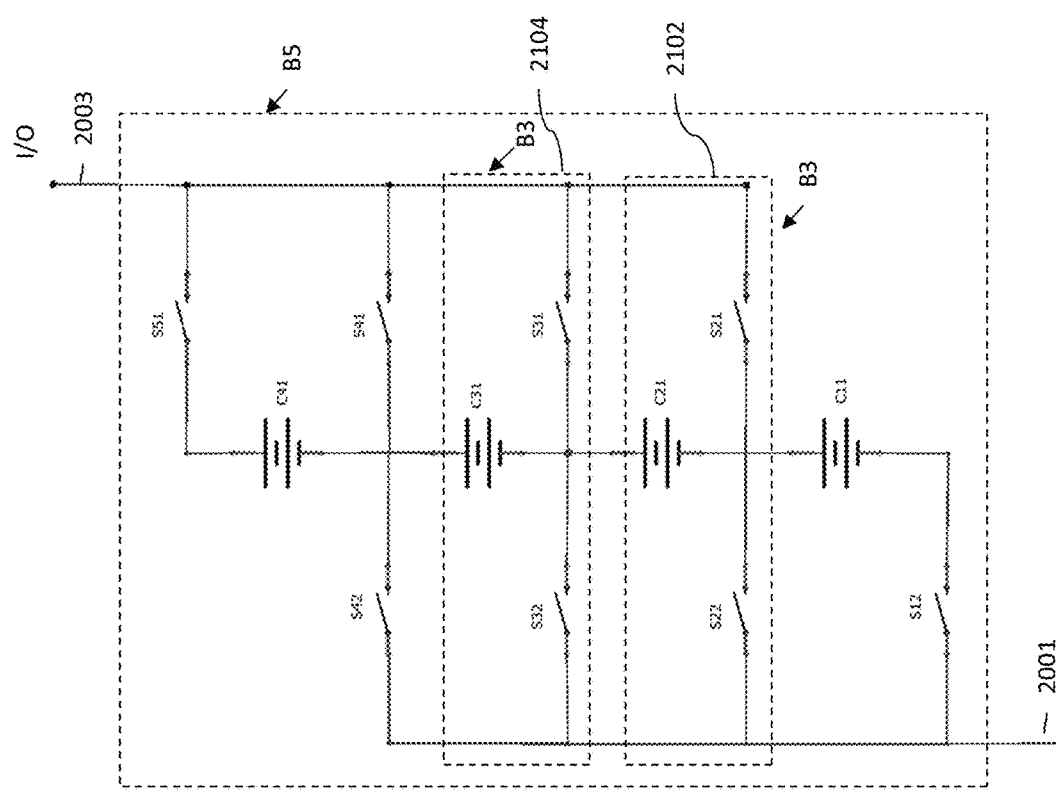
FIG. 21A is a circuit diagram of a battery system according to a further embodiment of the invention.

FIG. 21A shows another embodiment of a battery system 2100 which enables a combination of cell units to be connected with a negative or positive polarity. Similar to the earlier embodiment described with FIGS. 7 and 9-20, advantages of this circuit module includes the ability to generate both positive and negative voltages, including alternating current waveforms, without requiring additional conversion equipment(s), such as a DC-AC converter or an h-bridge switching configuration, at the battery output. This may in turn reduce the system cost and efficiency losses in a battery system. Additional advantage of this circuit module is that it requires no switching devices in between when a plurality of battery cell units are connected in series (with same polarity) either positively or negatively. Thereby, meaning it requires 2 switching devices less compared to the embodiment described in FIG. 7, and 1 switching device less when compared to the embodiment described with FIG. 9/10. Furthermore, the circuit module uses 2 switching devices less compared to the circuit module depicted in FIG. 18, which in turns reduces the number of operating states achievable. However, the circuit module uses no switching device in the current path when all the four battery cell units are connected in series and therefore, the circuit module can be advantageous in situations where all the battery cell units are healthy.

The exemplary depicted battery system 2100 is a circuit module configured to receive four battery cell units C1-C4 coupled thereto. However, any suitable number of battery cell units may be used where one or more base/intermediate circuit unit blocks (B3) can be added to the circuit between the end unit blocks 2102 and 2104. The battery system 2100 includes battery pack terminals 2001, 2003 for providing electrical energy to an external load or receiving electrical energy from an external supply (not shown). The pack terminals are ideally connected to the output of a first and last circuit block.

The circuit module of the depicted example includes four sets of terminals configured to couple with corresponding battery cell units, each set of terminals having a positive terminal, and a corresponding negative terminal. The circuit module of the depicted example includes four sets of terminals configured to couple with corresponding battery cell units, each set of terminals having a positive terminal, and a corresponding negative terminal. The positive terminal of the first set of terminals C11 being coupled to the negative terminal of the second set of terminals C22 either directly or via one or more passive components. The positive terminal of the third set of terminals C31 being coupled to the negative terminal of the fourth set of terminals C41 either directly or via one or more passive components. All the battery cell unit C11, C21, C31 and C41 are adjacently placed.

The circuit module as depicted includes two base circuits B3 (2102, 2104) adjacently placed and coupled to each other. The circuit module has a switching device S51 positively connected to the battery cell unit C41 and a switching device S12 negatively connected to the battery cell unit C11. Each base circuit includes two switches and a battery cell unit in the base circuit (B3).

The circuit modules include 4 battery cell units (C11, C21, C31, C41) and 8 switching devices. The positive terminal of the first set of terminals of the first battery cell unit C11 and the negative terminal of a second set of terminals of the second battery cell unit C21 are coupled via a conductor directly. The positive terminal of the second set of terminals of the second battery cell unit C21 and the negative terminal of a third set of terminals of the third battery cell unit C31 are coupled via a conductor directly. The positive terminal of the third set of terminals of the third battery cell unit C21 and the negative terminal of a fourth set of terminals of the fourth battery cell unit C41 are coupled via a conductor directly. Both negative and positive terminals of each of the four battery cell units are coupled to a switching assembly. The switching assemblies includes a first, second, third, fourth, fifth, sixth, seventh, eighth switching devices—S12, S21, S22, S31, S32, S41, S42 and S51 respectively.

The switching assembly disconnects the battery cell unit C11, when switching device S12 is open. The switching assembly disconnects the battery cell unit C21, when switching devices S21 and S22 are open. The switching assembly disconnects the battery cell unit C31, when switching devices S31 and S32 are open. The switching assembly disconnects the battery cell unit C41, when switching devices S41 and S42 are open.

With reference to circuit module 2100, various possible switching states are shown in the table below. In particular, the states where two or more battery cell units are connected are numbered as a state in this table.

| State | Polarity | Connection Status | Closed Switch | Open Switch |
|---|---|---|---|---|
| Single Cell | Negative | C11 Connected; C21, C31 and C41 Disconnected | S12, S21 | S22, S31, S32, S41, S42, S51 |
| Single Cell | Positive | C11 Connected; C21, C31 and C41 Disconnected | Not Feasible | Not Feasible |
| Single Cell | Negative | C21 Connected; C11, C31 and C41 Disconnected | S22, S31 | S12, S21, S32, S41, S42, S51 |
| Single Cell | Positive | C21 Connected; C11, C31 and C41 Disconnected | S32, S21 | S12, S22, S31, S41, S42, S51 |
| Single Cell | Negative | C31 Connected; C11, C21 and C41 Disconnected | S32, S41 | S12, S21, S22, S31, S42, S51 |
| Single Cell | Positive | C31 Connected; C11, C21 and C41 Disconnected | S42, S31 | S12, S21, S22, S32, S41, S51 |
| Single Cell | Negative | C41 Connected; C11, C21 and C31 Disconnected | S42, S51 | S12, S21, S22, S31, S32, S41, S42, S51 |
| Single Cell | Positive | C41 Connected; C11, C21 and C31 Disconnected | Not Feasible | Not Feasible |
| 1st | Negative | C11 and C21 Connected; C31 and C41 Disconnected | S12, S31 | S21, S22, S32, S41, S42, S51 |
| 1st | Positive | C11 and C21 Connected; C31 and C41 Disconnected | Not Feasible | Not Feasible |
| 2nd | Negative | C11 and C31 Connected; C21 and C41 Disconnected | Not Feasible | Not Feasible |
| 2nd | Positive | C11 and C31 Connected; C21 and C41 Disconnected | Not Feasible | Not Feasible |
| 6th | Negative | C11 and C41 Connected; C21 and C31 Disconnected | Not Feasible | Not Feasible |
| 6th | Positive | C11 and C41 Connected; C21 and C31 Disconnected | Not Feasible | Not Feasible |
| 7th | Negative | C11, C21 and C31 Connected; C41 Disconnected | S12, S41 | S21, S22, S31, S32, S42, S51 |
| 7th | Positive | C11, C21 and C31 Connected; C41 Disconnected | Not Feasible | Not Feasible |
| 4th | Negative | C11, C21 and C41 Connected; C31 Disconnected | Not Feasible | Not Feasible |
| 4th | Positive | C11, C21 and C41 Connected; C31 Disconnected | Not Feasible | Not Feasible |
| 8th | Negative | C11, C31 and C41 Connected; C21 Disconnected | Not Feasible | Not Feasible |

-continued

| State | Polarity | Connection Status | Closed Switch | Open Switch |
| --- | --- | --- | --- | --- |
| 8th | Positive | C11, C31 and C41 Connected; C21 Disconnected | Not Feasible | Not Feasible |
| 5th | Negative | C11, C21, C31 and C41 Connected | S12, S51 | S21, S22, S31, S32, S41, S42 |
| 5th | Positive | C11, C21, C31 and C41 Connected | Not Feasible | Not Feasible |
| 3rd | Negative | C21 and C31 Connected; C11 and C41 Disconnected | S22, S41 | S12, S21, S31, S32, S42, S51 |
| 3rd | Positive | C21 and C31 Connected; C11 and C41 Disconnected | S42, S21 | S12, S22, S31, S32, S41, S51 |
| $9^{th}$ | Negative | C21 and C41 Connected; C11 and C31 Disconnected | Not Feasible | Not Feasible |
| $9^{th}$ | Positive | C21 and C41 Connected; C11 and C31 Disconnected | Not Feasible | Not Feasible |
| $10^{th}$ | Negative | C31 and C41 Connected; C11 and C21 Disconnected | S32, S51 | S12, S21, S22, S31, S41, S42 |
| $10^{th}$ | Positive | C31 and C41 Connected; C11 and C21 Disconnected | Not Feasible | Not Feasible |
| $11^{th}$ | Negative | C21, C31 and C41 Connected; C11 Disconnected | S22, S51 | S12, S21, S31, S32, S41, S42 |
| $11^{th}$ | Positive | C21, C31 and C41 Connected; C11 Disconnected | Not Feasible | Not Feasible |

As can be noted in the table, the circuit module allows achieving 13 states out of 30 states. An advantage of this circuit module is that only two switches are required to be closed when operating on any of those 13 states. Furthermore, when all the battery cell units are connected in series, no switching device is required to be connected in series in between the battery cell units. This, in particular, helps in reducing the energy losses of the circuit module.

The ratio of conducting switching devices to active battery cell units during operation of the circuit module is minimal to be 0.50 for this circuit module (refer state 5).

In embodiment described with FIG. 21A, the switching assemblies are operatively configured to selectively connect or disconnect each one of the battery cell units, each switching assembly includes one or more switching devices operable in a conductive state and a non-conductive state. The switching assemblies are operatively configured to selectively allow operating in a plurality of states in which any two or more battery cell units are connected in series, each state including a charging cycle and a discharging cycle of the battery cell units including:

a first state in which the first battery cell unit C11 and the second battery cell unit C21 are electrically connected in series and the third battery cell unit C31 and the fourth battery cell unit C41 are disconnected,
achieved for negative polarity, for example by switches S12 and S31 being in a conductive state while all other switches shown are in a non-conductive state;

a third state in which the second battery cell unit C21 and the third battery cell unit C31 are electrically connected in series and the second battery cell unit C11 and the second battery cell unit C41 is disconnected,
achieved for negative polarity, for example by switches S22 and S41 being in a conductive state while all other switches shown are in a non-conductive state, and
whereas achieved for positive polarity, for example by switches S42 and S21 being in a conductive state while all other switches shown are in a non-conductive state;

a fifth state in which the first battery cell unit C11, the second battery cell unit C21, the third battery cell unit C31 and the fourth battery cell unit C41 are electrically connected in series,
achieved for negative polarity, for example by switches S12 and S51 being in a conductive state while all other switches shown are in a non-conductive state;

a seventh state in which the first battery cell unit C11, the second battery cell unit C21 and the third battery cell unit C31 are electrically connected in series, and the fourth battery cell unit C41 is disconnected,
achieved for negative polarity, for example by switches S12 and S41 being in a conductive state while all other switches shown are in a non-conductive state;

a tenth state in which the third battery cell unit C31, the fourth battery cell unit C41 are electrically connected in series, and the first battery cell unit C11 and second battery cell unit C21 are disconnected,
achieved for negative polarity, for example by switches S32 and S51 being in a conductive state while all other switches shown are in a non-conductive state; and an eleventh state in which the second battery cell unit C21, the third battery cell unit C31 and the fourth battery cell unit C41 are electrically connected in series and first battery cell unit C11 is disconnected,
achieved for negative polarity, for example by switches S22 and S51 being in a conductive state while all other switches shown are in a non-conductive state.

In one embodiment, switches S12-S51 are formed of transistor(s). In other embodiments, switches S12-S51 may each comprise several parallel-connected transistors, which may provide an increased current capability and/or a decreased collective resistance when the several parallel connected transistors are in conductive mode. In other embodiments, one or more of switches S12-S51 may comprise two or more series-connected transistors, whereby the series connection may provide an increased switch terminal voltage capability. Other combinations of parallel and/or series transistors may be utilised as desired.

The switching assemblies are operatively configured to selectively connect or disconnect any one or more of the battery cell units so as to vary a voltage output measured across the output terminals.

In some embodiments, a plurality of the circuit module (B5) are connected in series to generate a larger battery system.

In some embodiments, the system includes the aforementioned circuit modules alongside a plurality of battery cell units coupled to the circuit module.

In some embodiments, the switching assemblies are operatively configured to selectively allow operating in a plurality of connection modes, the plurality of connection modes including a first connection mode in which a series-connection of two or more battery cell units connect to the circuit module output in a first electrical polarity, and a second connection mode in which a series-connection of two or more battery cell units connect to the circuit module output in a second polarity that differs from the electrical polarity of the first electrical polarity.

In some embodiments, the system includes a battery mount configured to allow one or more battery cell units to be mounted for coupling to the circuit module. All switching assemblies of the circuit module are located to one side of the battery mount.

In some embodiments, the battery system includes a controller for controlling the switching assemblies of the circuit module. The controller may control the switching assemblies based on the charge and discharge behaviour of the battery cell units. The controller may further determine the charge and discharge behaviour of each battery cell unit based on the voltage, current and/or temperature of the battery cell unit during charging and/or discharging. The controller may further compare a measured voltage, current and/or temperature of the battery cell unit with predetermined voltage, current and/or temperature ranges, determines the battery cell units to connect and/or bypass, and controls the switching assemblies to connect or bypass each battery cell unit.

Figure 22:
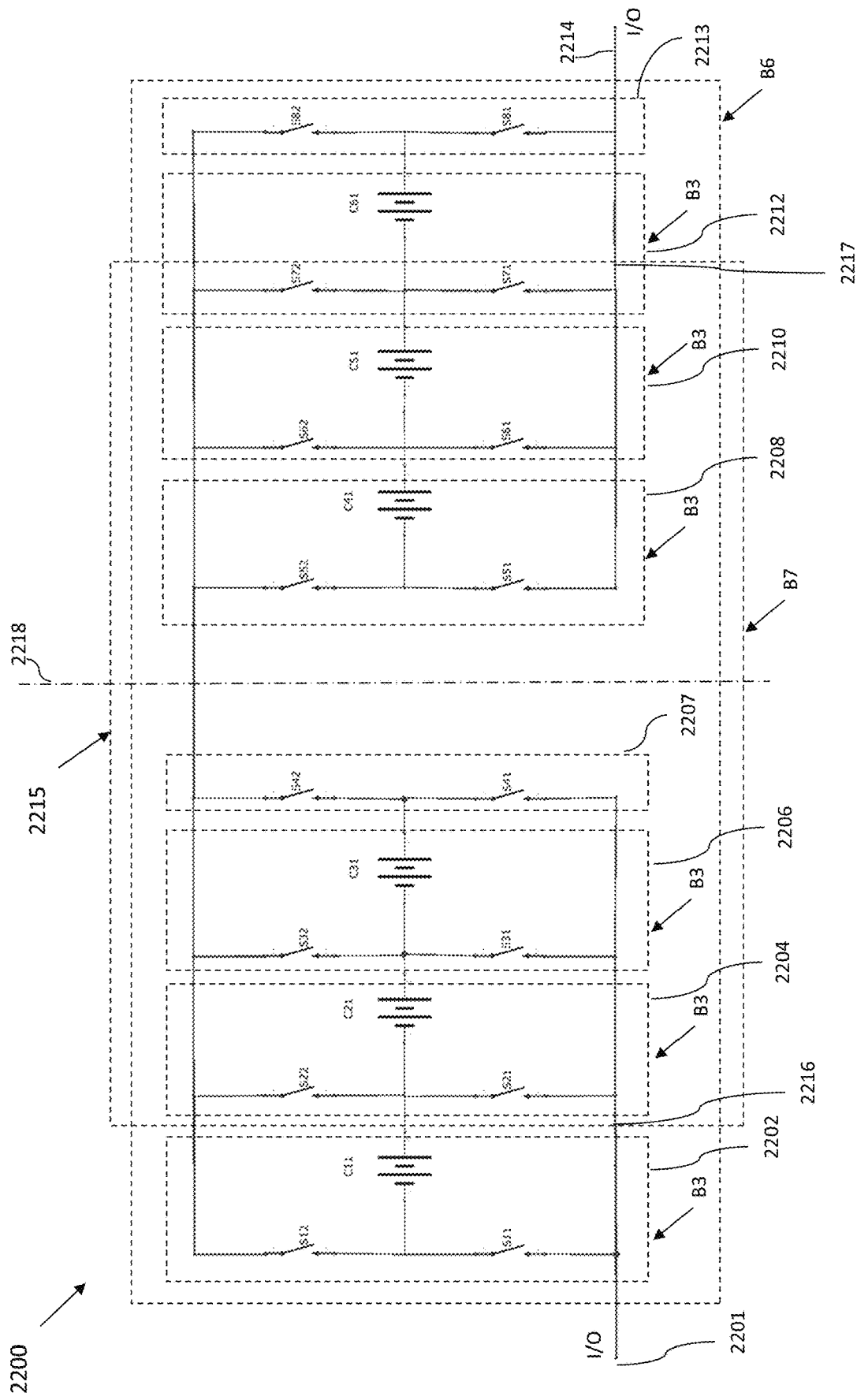
FIG. 22 is a circuit diagram of a battery system according to a further embodiment of the invention.

FIG. 22 shows another embodiment of a battery system 2200 which enables combination of battery cell units to be connected with a negative or positive polarity. Similar to the earlier embodiment described with FIGS. 7 and 9-21, advantages of this circuit module includes the ability to generate both positive and negative voltages, including alternating current waveforms, without requiring additional conversion equipment(s), such as a DC-AC converter or an h-bridge switching configuration, at the battery output. This may in turn reduce the system cost and efficiency losses in a battery system. The circuit module requires two switching devices when any four battery cell units are connected in series with the same polarity. However, the circuit module is advantageous as it supports a high number of states compared to embodiments described with FIGS. 9 to 21A.

The exemplary depicted battery system 2200 is a circuit module (B6) configured to receive six battery cell units C21-C51 coupled thereto. However, any suitable number of battery cell units may be used where one or more base/intermediate circuit unit blocks (B3) can be added to the circuit between the end unit blocks 2202 and 2106 as well as the end unit blocks 2208 and 2112. The battery system 2200 includes battery pack terminals 2201, 2213 for providing electrical energy to an external load or receiving electrical energy from an external supply (not shown). The pack terminals are ideally connected to the output of a first and last circuit block. The circuit module 2200 includes six battery cell units C11, C21, C31, C41, C51 and C61 and 16 switching devices S11, S12, S21, S22, S31, S32, S41, S42, S51, S52, S61, S71, S72, S81 and S82.

The battery system 2200 of the depicted example also includes a base/intermediate circuit module (B7) that can also be used as a battery system 2215.

The circuit module 2215 includes four sets of terminals configured to couple with corresponding battery cell units, each set of terminals having a positive terminal, and a corresponding negative terminal. The battery system 2215 includes battery pack terminals 2216, 2217 for providing electrical energy to an external load or receiving electrical energy from an external supply (not shown). The circuit module (B7) as depicted includes four base circuits B3 (2204, 2206, 2208, 2210) coupled to each other. The circuit module (B7) includes four battery cell units C21, C31, C41 and C51 and 12 switching devices S21, S22, S31, S32, S41, S42, S51, S52, S61, S71 and S72.

The positive terminal of the first set of terminals of the first battery cell unit C21 and the negative terminal of a second set of terminals of the second battery cell unit C31 are coupled via a conductor directly. The positive terminal of the second set of terminals of the second battery cell unit C31 and the negative terminal of a third set of terminals of the third battery cell unit 41 are coupled via a conductor directly. The positive terminal of the third set of terminals of the third battery cell unit C41 and the negative terminal of a fourth set of terminals of the fourth battery cell unit C51 are coupled via a conductor directly. Both negative and positive terminals of all of the four battery cell units are coupled to a switching assembly. The switching assembly includes a first, second, third, fourth, fifth, sixth, seventh, eighth, ninth, tenth, eleventh, twelfth switching devices— S21, S22, S31, S32, S41, S42, S51, S52, S61, S62, S71 and S72 respectively. It shall be understood that the switching assembly may include additional switching devices (for example: S11, S12, S81 and S82) when the battery system 2215 includes additional battery cell units.

With reference to battery system 2215, various possible switching states are shown in the table below. In particular, the states where two or more battery cell units are connected are numbered as a state in this table.

| State | Polarity | Connection Status | Closed Switch | Open Switch |
|---|---|---|---|---|
| Single Cell | Negative | C21 Connected; C31, C41 and C51 Disconnected | S21, S32, S52, S51 (Alternatives: S62, S61; S72, S71) | S22, S31, S41, S42, S61, S62, S71, S72 |
| Single Cell | Positive | C21 Connected; C31, C41 and C51 Disconnected | S31, S22, S52, S51 (Alternatives: S62, S61; S72, S71) | S21, S32, S41, S42, S61, S62, S71, S72 |

-continued

| State | Polarity | Connection Status | Closed Switch | Open Switch |
|---|---|---|---|---|
| Single Cell | Negative | C31 Connected; C21, C41 and C51 Disconnected | S31, S42, S52, S51 (Alternatives: S62, S61; S72, S71) | S21, S22, S32, S41, S61, S62, S71, S72 |
| Single Cell | Positive | C31 Connected; C21, C41 and C51 Disconnected | S41, S32, S52, S51 (Alternatives: S62, S61; S72, S71) | S21, S22, S31, S42, S61, S62, S71, S72 |
| Single Cell | Negative | C41 Connected; C21, C31 and C51 Disconnected | S21, S22 (Alternatives: S31, S32, S41, S42) S52, S61 | S31, S32, S41, S42, S51, S62, S71, S72 |
| Single Cell | Positive | C41 Connected; C21, C31 and C51 Disconnected | S21, S22 (Alternatives: S31, S32, S41, S42) S62, S51 | S31, S32, S41, S42, S51, S52, S71, S72 |
| Single Cell | Negative | C51 Connected; C21, C31 and C41 Disconnected | S21, S22 (Alternatives: S31, S32, S41, S42) S62, S71 | S31, S32, S41, S42, S51, S52, S61, S72 |
| Single Cell | Positive | C51 Connected; C21, C31 and C41 Disconnected | S21, S22 (Alternatives: S31, S32, S41, S42) S72, S61 | S31, S32, S41, S42, S51, S52, S62, S71 |
| 1st | Negative | C21 and C31 Connected; C41 and C51 Disconnected | S21, S42, S52, S51 (Alternatives: S62, S61; S72, S71) | S22, S31, S32, S41, S61, S62, S71, S72 |
| 1st | Positive | C21 and C31 Connected; C41 and C51 Disconnected | S41, S22, S52, S51 (Alternatives: S62, S61; S72, S71) | S31, S32, S42, S61, S62, S71, S72 |
| 2nd | Negative | C21 and C41 Connected; C31 and C51 Disconnected | S21, S32, S52, S61 | S22, S31, S41, S42, S51, S62, S71, S72 |
| 2nd | Positive | C21 and C41 Connected; C31 and C51 Disconnected | S31, S22, S62, S51 | S21, S32, S41, S42, S52, S61, S71, S72 |
| 6th | Negative | C21 and C51 Connected; C31 and C41 Disconnected | S21, S32, S62, S71 | S22, S31, S41, S42, S51, S52, S61, S72 |
| 6th | Positive | C21 and C51 Connected; C31 and C41 Disconnected | S31, S22, S72, S61 | S21, S32, S41, S42, S51, S52, S62, S71 |
| 7th | Negative | C21, C31 and C41 Connected; C51 Disconnected | S21, S42, S52, S61 | S22, S31, S32, S41, S51, S62, S71, S72 |
| 7th | Positive | C21, C31 and C41 Connected; C51 Disconnected | S41, S22, S62, S51 | S21, S31, S32, S42, S52, S61, S71, S72 |
| 4th | Negative | C21, C31 and C51 Connected; C41 Disconnected | S21, S42, S62, S71 | S22, S31, S32, S41, S51, S52, S61, S72 |
| 4th | Positive | C21, C31 and C51 Connected; C41 Disconnected | S41, S22, S72, S61 | S21, S31, S32, S42, S51, S52, S62, S71 |
| 8th | Negative | C21, C41 and C51 Connected; C31 Disconnected | S21, S32, S52, S71 | S22, S31, S41, S42, S51, S61, S62, S72 |
| 8th | Positive | C21, C41 and C51 Connected; C31 Disconnected | S31, S22, S72, S51 | S21, S32, S41, S42, S52, S61, S62, S71 |
| 5th | Negative | C21, C31, C41 and C51 Connected | S21, S42, S52, S71 | S22, S31, S32, S41, S51, S61, S62, S72 |
| 5th | Positive | C21, C31, C41 and C51 Connected | S41, S22, S72, S51 | S21, S31, S32, S42, S52, S61, S62, S71 |
| 3rd | Negative | C31 and C41 Connected; C21 and C51 Disconnected | S31, S42, S52, S61 | S21, S22, S32, S41, S51, S62, S71, S72 |
| 3rd | Positive | C31 and C41 Connected; C21 and C51 Disconnected | S41, S32, S62, S51 | S21, S22, S31, S42, S52, S61, S71, S72 |
| 9th | Negative | C31 and C51 Connected; C21 and C41 Disconnected | S31, S42, S62, S71 | S21, S22, S32, S41, S51, S52, S61, S72 |

-continued

| State | Polarity | Connection Status | Closed Switch | Open Switch |
|---|---|---|---|---|
| 9th | Positive | C31 and C51 Connected; C21 and C41 Disconnected | S41, S32, S72, S61 | S21, S22, S31, S42, S51, S52, S62, S71 |
| 10th | Negative | C41 and C51 Connected; C21 and C31 Disconnected | S21, S22 (Alternatives: S31, S32; S41, S42), S52, S71 | S31, S32, S41, S42, S51, S61, S62, S72 |
| 10th | Positive | C41 and C51 Connected; C21 and C31 Disconnected | S21, S22 (Alternatives: S31, S32; S41, S42), S72, S51 | S31, S32, S41, S42, S52, S61, S62, S71, |
| 11th | Negative | C31, C41 and C51 Connected; C21 Disconnected | S31, S42, S52, S71 | S21, S22, S32, S41, S51, S61, S62, S72 |
| 11th | Positive | C31, C41 and C51 Connected; C21 Disconnected | S41, S32, S72, S51 | S21, S22, S31, S42, S52, S61, S62, S71 |

It shall be understood that the circuit module 2200 includes 6 battery cell units, 3 on each side of a centre line 2218, however, another battery system can also be derived by connecting one or more base circuit (B3) on either side of the centre line accordingly. It shall also be understood that a plurality of battery system 2200 or 2215, each having 2 or more base circuits, can also be connected in series to derive larger battery systems.

The battery system 2215 described above includes the switching assemblies which are operatively configured to selectively connect or disconnect each one of the battery cell units (C21-C51), each switching assembly includes one or more switching devices (S21-S72) operable in a conductive state and a non-conductive state. The switching assemblies are operatively configured to selectively allow operating in a plurality of states in which any two or more battery cell units are connected in series, each state including a charging cycle and a discharging cycle of the battery cell units including:

a first state in which the first battery cell unit C21 and the second battery cell unit C31 are electrically connected in series and the third battery cell unit C41 and the fourth battery cell unit C51 are disconnected,
   achieved for negative polarity, for example by switches S21, S42, S52 and S51 being in a conductive state while all other switches shown are in a non-conductive state, and
   whereas achieved for positive polarity, for example by switches S41, S22, S52 and S51 being in a conductive state while all other switches shown are in a non-conductive state;

a second state in which the first battery cell unit C21 and the third battery cell unit C41 are electrically connected in series and the second battery cell unit C31 and the fourth battery cell unit C51 are disconnected,
   achieved for negative polarity, for example by switches S21, S32, S52 and S61 being in a conductive state while all other switches shown are in a non-conductive state, and
   whereas achieved for positive polarity, for example by switches S31, S22, S62 and S51 being in a conductive state while all other switches shown are in a non-conductive state;

a third state in which the second battery cell unit C31 and the third battery cell unit C41 are electrically connected in series and the first battery cell unit C21 and the fourth battery cell unit C51 is disconnected,
   achieved for negative polarity, for example by switches S31, S42, S52 and S61 being in a conductive state while all other switches shown are in a non-conductive state, and
   whereas achieved for positive polarity, for example by switches S41, S32, S62 and S51 being in a conductive state while all other switches shown are in a non-conductive state;

a fourth state in which the first battery cell unit C21, the second battery cell unit C31 and the fourth battery cell unit 51 are electrically connected in series and the third battery cell unit C41 is disconnected,
   achieved for negative polarity, for example by switches S21, S42, S62 and S71 being in a conductive state while all other switches shown are in a non-conductive state, and
   whereas achieved for positive polarity, for example by switches S41, S22, S72 and S61 being in a conductive state while all other switches shown are in a non-conductive state;

a fifth state in which the first battery cell unit C21, the second battery cell unit C31, the third battery cell unit C41 and the fourth battery cell unit C51 are electrically connected in series,
   achieved for negative polarity, for example by switches S21, S42, S52 and S71 being in a conductive state while all other switches shown are in a non-conductive state, and
   whereas achieved for positive polarity, for example by switches S41, S22, S72 and S51 being in a conductive state while all other switches shown are in a non-conductive state;

a sixth state in which the first battery cell unit C21 and the fourth battery cell unit C51 are electrically connected in series and the second battery cell unit C31 and the third battery cell unit C41 are disconnected,
   achieved for negative polarity, for example by switches S21, S32, S62 and S71 being in a conductive state while all other switches shown are in a non-conductive state, and
   whereas achieved for positive polarity, for example by switches S31, S22, S72 and S61 being in a conductive state while all other switches shown are in a non-conductive state;

a seventh state in which the first battery cell unit C21, the second battery cell unit C31 and the third battery cell unit C41 are electrically connected in series, and the fourth battery cell unit C51 is disconnected, achieved for negative polarity, for example by switches S21, S42, S52 and S61 being in a conductive state while all other switches shown are in a non-conductive state, and whereas achieved for positive polarity, for example by switches S41, S22, S62 and S51 being in a conductive state while all other switches shown are in a non-conductive state;

an eighth state in which the first battery cell unit C21, the third battery cell unit C41 and the fourth battery cell unit C51 are electrically connected in series, and the second battery cell unit C31 is disconnected, achieved for negative polarity, for example by switches S21, S32, S52 and S71 being in a conductive state while all other switches shown are in a non-conductive state, and whereas achieved for positive polarity, for example by switches S31, S22, S72 and S51 being in a conductive state while all other switches shown are in a non-conductive state;

a ninth state in which the second battery cell unit C31 and the fourth battery cell unit C51 are electrically connected in series and the first battery cell unit C21 and the third battery cell unit C41 are disconnected, achieved for negative polarity, for example by switches S31, S42, S62 and S71 being in a conductive state while all other switches shown are in a non-conductive state, and whereas achieved for positive polarity, for example by switches S41, S32, S72 and S61 being in a conductive state while all other switches shown are in a non-conductive state;

a tenth state in which the third battery cell unit C41, the fourth battery cell unit C51 are electrically connected in series, and the first battery cell unit C21 and second battery cell unit C31 are disconnected, achieved for negative polarity, for example by switches S21, S22, S52, and S71 being in a conductive state while all other switches shown are in a non-conductive state, and whereas achieved for positive polarity, for example by switches S21, S22, S72, and S51 being in a conductive state while all other switches shown are in a non-conductive state; and an eleventh state in which the second battery cell unit C31, the third battery cell unit C41 and the fourth battery cell unit C51 are electrically connected in series and first battery cell unit C21 is disconnected, achieved for negative polarity, for example by switches S31, S42, S52 and S71 being in a conductive state while all other switches shown are in a non-conductive state, and whereas achieved for positive polarity, for example by switches S41, S32, S72 and S51 being in a conductive state while all other switches shown are in a non-conductive state.

In one embodiment, switches S11-S82 are formed of transistor(s). In other embodiments, switches S11-S82 may each comprise several parallel-connected transistors, which may provide an increased current capability and/or a decreased collective resistance when the several parallel connected transistors are in conductive mode. In other embodiments, one or more of switches S11-S82 may comprise two or more series-connected transistors, whereby the series connection may provide an increased switch terminal voltage capability. Other combinations of parallel and/or series transistors may be utilised as desired.

The switching assemblies are operatively configured to selectively connect or disconnect any one or more of the battery cell units so as to vary a voltage output measured across the output terminals.

In some embodiments, the system includes the aforementioned circuit modules alongside a plurality of battery cell units coupled to the circuit module.

In some embodiments, the switching assemblies are operatively configured to selectively allow operating in a plurality of connection modes, the plurality of connection modes including a first connection mode in which a series-connection of two or more battery cell units connect to the circuit module output in a first electrical polarity, and a second connection mode in which a series-connection of two or more battery cell units connect to the circuit module output in a second polarity that differs from the electrical polarity of the first electrical polarity.

In some embodiments, the system includes a battery mount configured to allow one or more battery cell units to be mounted for coupling to the circuit module. All switching assemblies of the circuit module are located to one side of the battery mount.

In some embodiments, the battery system includes a controller for controlling the switching assemblies of the circuit module. The controller may control the switching assemblies based on the charge and discharge behaviour of the battery cell units. The controller may further determine the charge and discharge behaviour of each battery cell unit based on the voltage, current and/or temperature of the battery cell unit during charging and/or discharging. The controller may further compare a measured voltage, current and/or temperature of the battery cell unit with predetermined voltage, current and/or temperature ranges, determines the battery cell units to connect and/or bypass, and controls the switching assemblies to connect or bypass each battery cell unit.

Figure 23:
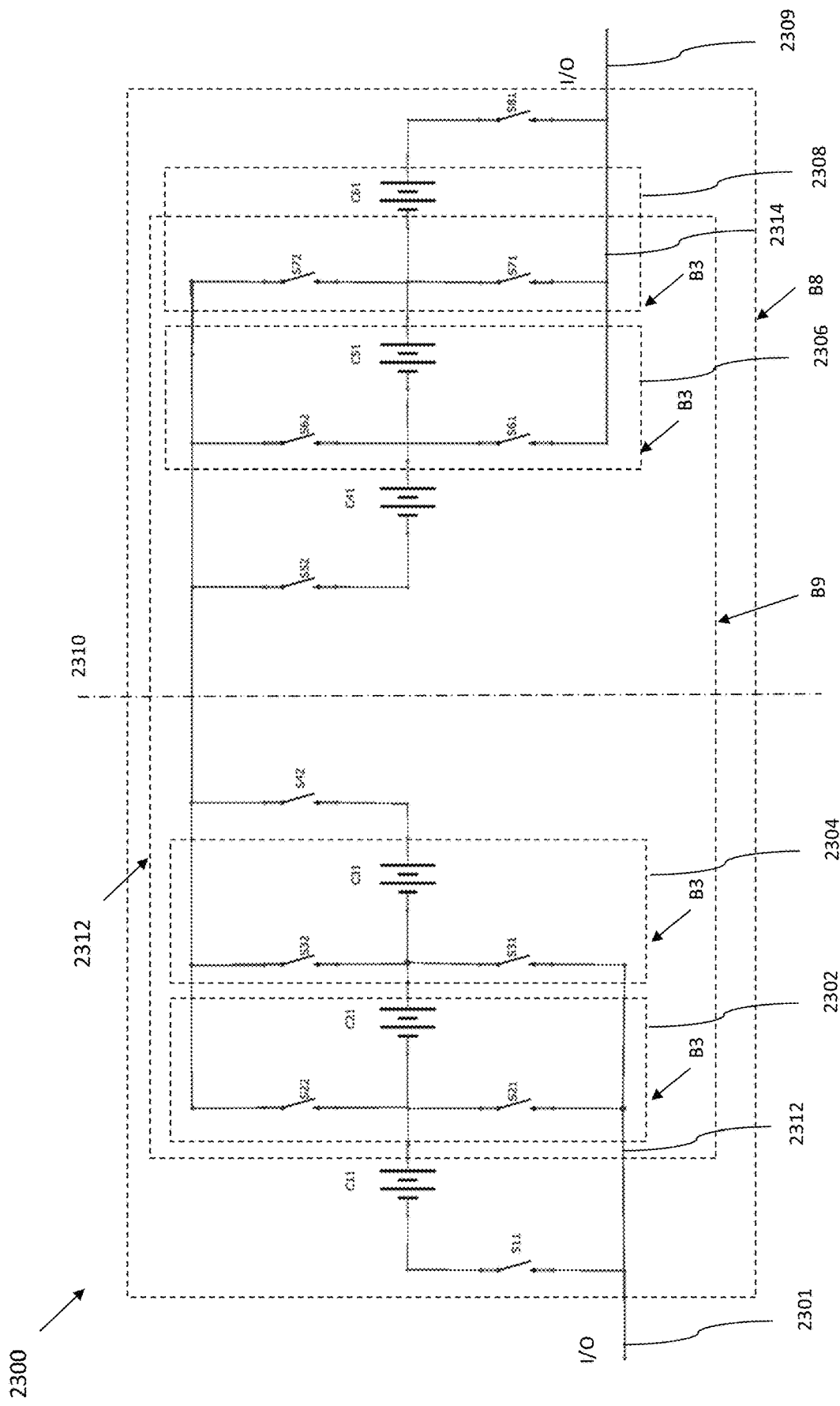
FIG. 23 is a circuit diagram of a battery system according to a further embodiment of the invention.

FIG. 23 shows another embodiment of a battery system 2300 which enables a combination of cell units to be connected with a negative or positive polarity. Similar to the earlier embodiments described with FIGS. 7 and 9-22, advantages of this circuit module includes the ability to generate both positive and negative voltages, including alternating current waveforms, without requiring additional conversion equipment(s), such as a DC-AC converter or an h-bridge switching configuration, at the battery output. This may in turn reduce the system cost and efficiency losses in a battery system.

The circuit module of battery system 2300 requires two switching devices in the current path when any four battery cell units connected in series with the same polarity. Nevertheless, the circuit module may be advantageous as it uses four switching devices less when compared to the circuit module depicted in FIG. 22. This in turn, reduces the total number of operating state achievable by battery system 2300 compared to battery system 2200 depicted in FIG. 23, however, similar to the battery system 2200, the battery module 2300 includes only two switching devices in series when four battery cell units (C21, C31, C41 and C42) are coupled. Therefore, in scenarios when the battery system includes healthy battery cell units which are generally operational for the more duration, the battery system 2300 can still be beneficial.

The battery system 2300 include a circuit module (B9) configured to receive four battery cell units C21-C51 coupled thereto. However, any suitable number of battery cell units may be used where one or more base/intermediate circuit unit blocks (B3) can be added to the circuit between the unit blocks 2302 and 2304 as well as the unit blocks 2206 and 2308. The battery system 2300 includes battery pack terminals 2301, 2309 for providing electrical energy to an external load or receiving electrical energy from an external supply (not shown). The circuit module 2300 includes six battery cell units C11, C21, C31, C41, C51 and C61 and 12 switching devices S11, S21, S22, S31, S32, S42, S52, S61, S71, S72 and S81.

The battery system 2300 of the depicted example also includes a base/intermediate circuit module (B9) that can also be used as a battery system 2212.

The circuit module of the battery system 2312 includes four sets of terminals configured to couple with corresponding battery cell units, each set of terminals having a positive terminal, and a corresponding negative terminal. The battery system 2215 includes battery pack terminals 2312 and 2314 for providing electrical energy to an external load or receiving electrical energy from an external supply (not shown). The pack terminals can be connected to the output of the first and last circuit blocks (2302, 2108). The circuit module (B9) as depicted includes four base circuits B3 (2302, 2304, 2206, 2208) coupled to each other. The circuit module (B9) includes four battery cell units C21, C31, C41 and C51 and 10 switching devices S21, S22, S31, S32, S42, S52, S61, S71 and S72.

The positive terminal of the first set of terminals of the first battery cell unit C21 and the negative terminal of a second set of terminals of the second battery cell unit C31 are coupled via a conductor directly. The positive terminal of the second set of terminals of the second battery cell unit C31 and the negative terminal of a third set of terminals of the third battery cell unit C41 are coupled via a conductor directly. The positive terminal of the third set of terminals of the third battery cell unit C41 and the negative terminal of a fourth set of terminals of the fourth battery cell unit C51 are coupled via a conductor directly. Both negative and positive terminals of all of the four battery cell units are coupled to a switching assembly. The switching assembly includes a first, second, third, fourth, fifth, sixth, seventh, eighth, ninth, tenth switching devices—S21, S22, S31, S32, S42, S52, S61, S62, S71 and S72 respectively. It shall be understood that the switching assembly may include additional switching devices (for example: S11, S12, S81 and S82) when the battery system 2215 includes additional battery cell units.

With reference to battery system 2312, various possible switching states are shown in the table below. In particular, the states where two or more battery cell units are connected are numbered as a state in this table.

| State | Polarity | Connection Status | Closed Switch | Open Switch |
|---|---|---|---|---|
| Single Cell | Negative | C21 Connected; C31, C41 and C51 Disconnected | S21, S32, S62, S61 (Alternative: S72, S71) | S22, S31, S42, S52, S71, S72 |
| Single Cell | Positive | C21 Connected; C31, C41 and C51 Disconnected | S31, S22, S62, S61 (Alternative: S72, S71) | S21, S32, S42, S52, S71, S72 |
| Single Cell | Negative | C31 Connected; C21, C41 and C51 Disconnected | S31, S42, S62, S61 (Alternative: S72, S71) | S21, S22, S32, S52, S71, S72 |
| Single Cell | Positive | C31 Connected; C21, C41 and C51 Disconnected | Not Feasible | Not Feasible |
| Single Cell | Negative | C41 Connected; C21, C31 and C51 Disconnected | S21, S22 (Alternatives: S21, S22; S31, S32) S52, S61 | S31, S32, S42, S62, S71, S72 |
| Single Cell | Positive | C41 Connected; C21, C31 and C51 Disconnected | Not Feasible | Not Feasible |
| Single Cell | Negative | C51 Connected; C21, C31 and C41 Disconnected | S21, S22 (Alternatives: S21, S22; S31, S32) S62, S71 | S31, S32, S42, S52, S61, S72 |
| Single Cell | Positive | C51 Connected; C21, C31 and C41 Disconnected | S21, S22 (Alternatives: S21, S22; S31, S32), S72, S61 | S31, S32, S42, S52, S62, S71 |
| 1st | Negative | C21 and C31 Connected; C41 and C51 Disconnected | S21, S42, S62, S61 (Alternative: S72, S71) | S22, S31, S32, S52, S71, S72 |
| 1st | Positive | C21 and C31 Connected; C41 and C51 Disconnected | Not Feasible | Not Feasible |
| 2nd | Negative | C21 and C41 Connected; C31 and C51 Disconnected | S21, S32, S62, S61 (Alternative: S72, S71) | S22, S31, S42, S52, S71, S72 |
| 2nd | Positive | C21 and C41 Connected; C31 and C51 Disconnected | Not Feasible | Not Feasible |
| 6th | Negative | C21 and C51 Connected; C31 and C41 Disconnected | S21, S32, S62, S71 | S22, S31, S42, S52, S61, S72 |
| 6th | Positive | C21 and C51 Connected; C31 and C41 Disconnected | S31, S22, S72, S61 | S21, S32, S42, S52, S62, S71 |
| 7th | Negative | C21, C31 and C41 Connected; C51 Disconnected | S21, S42, S52, S61 | S22, S31, S32, S62, S71, S72 |
| 7th | Positive | C21, C31 and C41 Connected; C51 Disconnected | Not Feasible | Not Feasible |

| State | Polarity | Connection Status | Closed Switch | Open Switch |
| --- | --- | --- | --- | --- |
| 4th | Negative | C21, C31 and C51 Connected; C41 Disconnected | S21, S42, S62, S71 | S22, S31, S32, S52, S61, S72 |
| 4th | Positive | C21, C31 and C51 Connected; C41 Disconnected | Not Feasible | Not Feasible |
| 8th | Negative | C21, C41 and C51 Connected; C31 Disconnected | S21, S32, S52, S71 | S22, S31, S42, S61, S62, S72 |
| 8th | Positive | C21, C41 and C51 Connected; C31 Disconnected | Not Feasible | Not Feasible |
| 5th | Negative | C21, C31, C41 and C51 Connected | S21, S42, S52, S71 | S22, S31, S32, S61, S62, S72 |
| 5th | Positive | C21, C31, C41 and C51 Connected | Not Feasible | Not Feasible |
| 3rd | Negative | C31 and C41 Connected; C21 and C51 Disconnected | S31, S42, S52, S61 | S21, S22, S32, S62, S71, S72 |
| 3rd | Positive | C31 and C41 Connected; C21 and C51 Disconnected | Not Feasible | Not Feasible |
| 9th | Negative | C31 and C51 Connected; C21 and C41 Disconnected | S31, S42, S62, S71 | S21, S22, S32, S52, S61, S72 |
| 9th | Positive | C31 and C51 Connected; C21 and C41 Disconnected | Not Feasible | Not Feasible |
| 10th | Negative | C41 and C51 Connected; C21 and C31 Disconnected | S21, S22 (Alternative: S31, S32), S52, S71 | S31, S32, S42 S61, S62, S72 |
| 10th | Positive | C41 and C51 Connected; C21 and C31 Disconnected | Not Feasible | Not Feasible |
| 11th | Negative | C31, C41 and C51 Connected; C21 Disconnected | S31, S42, S52, S71 | S21, S22, S32, S61, S62, S72 |
| 11th | Positive | C31, C41 and C51 Connected; C21 Disconnected | Not Feasible | Not Feasible |

It shall be understood that the circuit module 2300 includes 6 battery cell units, 3 on each side of a centre line 2310, however, another battery system can also be derived by connecting one or more base circuit (B3) on either side of the centre line. It shall also be understood that a plurality of battery system 2300 or 2312, each having 2 or more base circuits, can also be connected in series to derive larger battery systems.

The battery system 2312 described above includes the switching assemblies which are operatively configured to selectively connect or disconnect each one of the battery cell units (C21-C51), each switching assembly includes one or more switching devices (S21-S72) operable in a conductive state and a non-conductive state. The switching assemblies are operatively configured to selectively allow operating in a plurality of states in which any two or more battery cell units are connected in series, each state including a charging cycle and a discharging cycle of the battery cell units including:

a first state in which the first battery cell unit C21 and the second battery cell unit C31 are electrically connected in series and the third battery cell unit C41 and the fourth battery cell unit C51 are disconnected,
  achieved for negative polarity, for example by switches S21, S42, S62 and S61 being in a conductive state while all other switches shown are in a non-conductive state;

a second state in which the first battery cell unit C21 and the third battery cell unit C41 are electrically connected in series and the second battery cell unit C31 and the fourth battery cell unit C51 are disconnected,
  achieved for negative polarity, for example by switches S21, S32, S62 and S61 being in a conductive state while all other switches shown are in a non-conductive state;

a third state in which the second battery cell unit C31 and the third battery cell unit C41 are electrically connected in series and the first battery cell unit C21 and the fourth battery cell unit C51 is disconnected,
  achieved for negative polarity, for example by switches S31, S42, S52 and S61 being in a conductive state while all other switches shown are in a non-conductive state;

a fourth state in which the first battery cell unit C21, the second battery cell unit C31, the fourth battery cell unit C51 are electrically connected in series and the third battery cell unit C41 is disconnected
  achieved for negative polarity, for example by switches S21, S42, S62 and S71 being in a conductive state while all other switches shown are in a non-conductive state;

a fifth state in which the first battery cell unit C21, the second battery cell unit C31, the third battery cell unit C41 and the fourth battery cell unit C51 are electrically connected in series,
  achieved for negative polarity, for example by switches S21, S42, S62 and S71 being in a conductive state while all other switches shown are in a non-conductive state;

a sixth state in which the first battery cell unit C21, the fourth battery cell unit C51 are electrically connected in series, and the second battery cell unit C31 and the third battery cell unit C41 are disconnected, achieved for negative polarity, for example by switches S21, S32, S62 and S71 being in a conductive state while all other switches shown are in a non-conductive state;

whereas achieved for positive polarity, for example by switches S31, S22, S72 and S61 being in a conductive state while all other switches shown are in a non-conductive state.

a seventh state in which the first battery cell unit C21, the second battery cell unit C31 and the third battery cell unit C41 are electrically connected in series, and the fourth battery cell unit C51 is disconnected, achieved for negative polarity, for example by switches S21, S42, S52 and S61 being in a conductive state while all other switches shown are in a non-conductive state;

an eighth state in which the first battery cell unit C21, the third battery cell unit C41 and the fourth battery cell unit C51 are electrically connected in series, and the third battery cell unit C31 is disconnected, achieved for negative polarity, for example by switches S21, S32, S52 and S71 being in a conductive state while all other switches shown are in a non-conductive state;

a ninth state in which the second battery cell unit C31 and the fourth battery cell unit C51 are electrically connected in series, and the first battery cell unit C21 and the third battery cell unit C41 is disconnected, achieved for negative polarity, for example by switches S31, S42, S62 and S71 being in a conductive state while all other switches shown are in a non-conductive state;

a tenth state in which the third battery cell unit C41, the fourth battery cell unit C51 are electrically connected in series, and the first battery cell unit C21 and second battery cell unit C31 are disconnected, achieved for negative polarity, for example by switches S21, S22, S52 and S71 being in a conductive state while all other switches shown are in a non-conductive state; and an eleventh state in which the second battery cell unit C31, the third battery cell unit C41 and the fourth battery cell unit C51 are electrically connected in series and first battery cell unit C21 is disconnected, achieved for negative polarity, for example by switches S31, S42, S52 and S71 being in a conductive state while all other switches shown are in a non-conductive state.

In one embodiment, switches S21-S72 are formed of transistor(s). In other embodiments, switches S21-S72 may each comprise several parallel-connected transistors, which may provide an increased current capability and/or a decreased collective resistance when the several parallel connected transistors are in conductive mode. In other embodiments, one or more of switches S21-S72 may comprise two or more series-connected transistors, whereby the series connection may provide an increased switch terminal voltage capability. Other combinations of parallel and/or series transistors may be utilised as desired.

The switching assemblies are operatively configured to selectively connect or disconnect any one or more of the battery cell units so as to vary a voltage output measured across the output terminals.

In some embodiments, the system includes the aforementioned circuit modules alongside a plurality of battery cell units coupled to the circuit module.

In some embodiments, the switching assemblies are operatively configured to selectively allow operating in a plurality of connection modes, the plurality of connection modes including a first connection mode in which a series-connection of two or more battery cell units connect to the circuit module output in a first electrical polarity, and a second connection mode in which a series-connection of two or more battery cell units connect to the circuit module output in a second polarity that differs from the electrical polarity of the first electrical polarity.

In some embodiments, the system includes a battery mount configured to allow one or more battery cell units to be mounted for coupling to the circuit module. All switching assemblies of the circuit module are located to one side of the battery mount.

In some embodiments, the battery system includes a controller for controlling the switching assemblies of the circuit module. The controller may control the switching assemblies based on the charge and discharge behaviour of the battery cell units. The controller may further determine the charge and discharge behaviour of each battery cell unit based on the voltage, current and/or temperature of the battery cell unit during charging and/or discharging. The controller may further compare a measured voltage, current and/or temperature of the battery cell unit with predetermined voltage, current and/or temperature ranges, determines the battery cell units to connect and/or bypass, and controls the switching assemblies to connect or bypass each battery cell unit.

In some embodiments, the battery system can include one or more of circuit module depicted in FIG. 11, FIG. 12, FIG. 13, FIG. 14A, FIG. 14B, FIG. 15, FIG. 17, FIG. 19, FIG. 21A, FIG. 22, FIG. 23 or one or more base/intermediate circuit blocks such as B1, B2, B3, B4, B5, B6, B7, B8 and B9 connected in series. It shall be understood that the polarity of one or more of the battery cell units can be changed in such a series connected circuit module, for example by interchanging a base circuit module B3 with B4 or vice versa.

In some embodiments, the battery system can include one or more of circuit module depicted in FIG. 11, FIG. 12, FIG. 13, FIG. 14A, FIG. 14B, FIG. 15, FIG. 17, FIG. 19, FIG. 21A, FIG. 22, FIG. 23 or one or more base/intermediate circuit blocks such as B1, B2, B3, B4, B5, B6, B7, B8 and B9 connected in series. It shall be understood that the polarity of one or more of the battery cell units can be changed in such a series connected circuit module, for example by interchanging a base circuit module B3 with B4 or vice versa.

Figure 24:
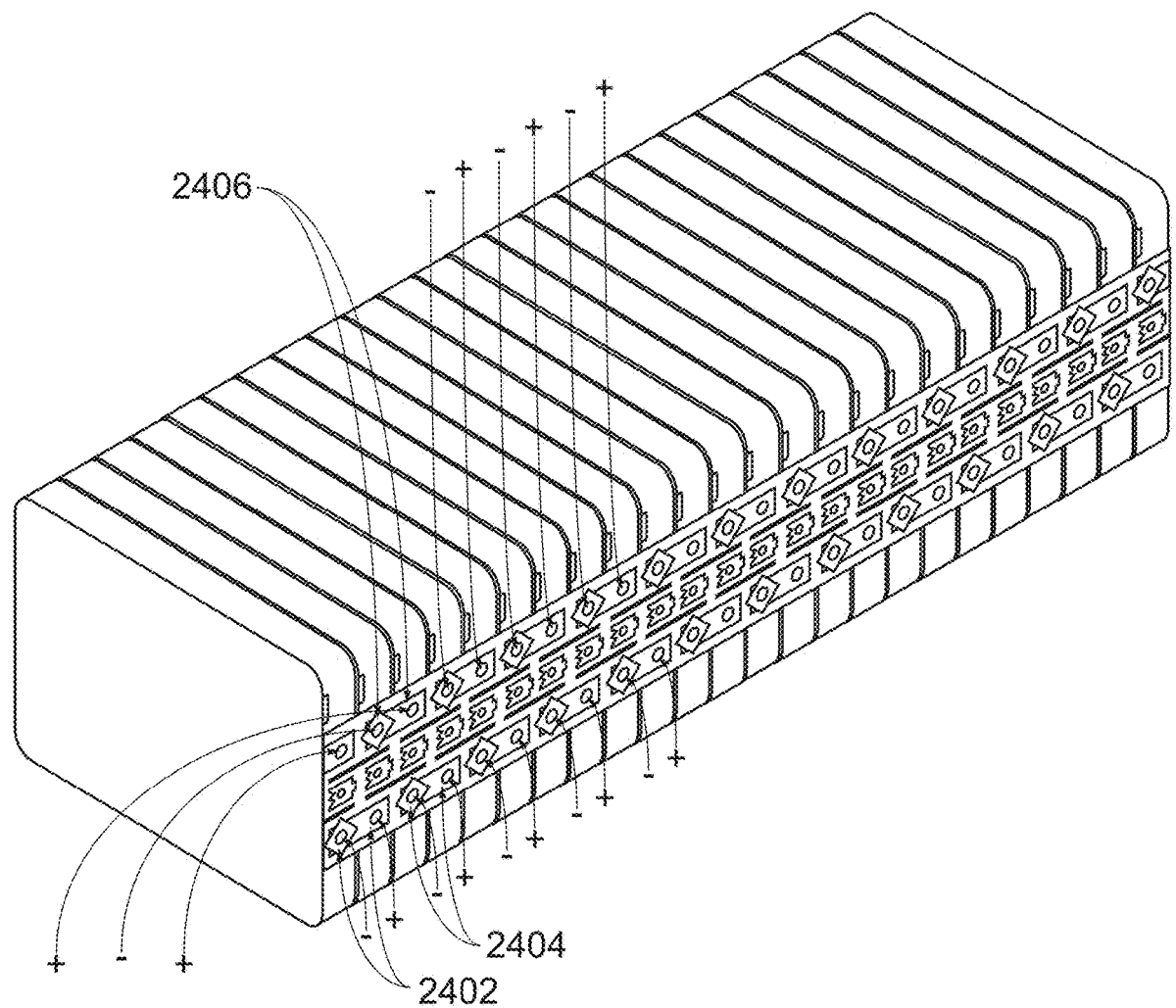
FIG. 24 depicts an example of rigidly connected terminals of a battery pack having eighth battery cell units.

The embodiments disclosed in FIGS. 12, 14A, 14B, 15 and 18-23 provide a further advantage that the switching assembly can be coupled to the battery cell units without cutting off the terminals of the battery packs that have more than 2 battery cell units included in it. For example, FIG. 24 depicts one example battery pack that includes 24 battery segments. Each of these battery segments has three electrical terminals and has two battery cell units connected in series. Internally within each battery segment, each battery cell unit has two terminals including one positive and one negative terminal. Externally the battery cell unit provides access only to the positive terminal of a first battery cell unit, the negative with a second battery cell unit, and one central terminal connected to both the negative terminal of the first battery cell unit and the negative terminal of the second battery cell unit. This shared terminal represents a series connection between the first battery cell unit and the second battery cell unit. As can be noted, the battery segments are horizontally stacked. To connect multiple battery segments in series, the terminals of the battery segments are attached rigidly by metal busbars. For example, the figure demonstrates that, starting from the left, a first battery segment is connected in series to the second battery segment by a busbar 2402. Similarly, the second battery segment and the third battery segment are connected by a busbar 2404 and the third battery segment and the fourth battery segment are connected by a busbar 2408. An advantage of few of the embodiments of the invention is that the requirement of removing the series connection between battery cell units for the purpose of integrating a circuit module is eliminated. For example, a circuit module can be applied to a battery segments with multiple series connected cells and/or shared terminals between cells, without need to open the battery segment to disconnect the internal battery cell units' terminals in order to integrate the circuit module. As a different example, a circuit module can be applied to cells to two or more battery segments, whether the segments contain only one two or more series-connected battery cell units, without need to cut or remove the rigid busbar connection in order to integrate the circuit module. This can thereby save significant manual effort and time. Furthermore, this also allows fabricating integrated chips that can easily and directly be attached or detached to the terminals of the battery cell units.

The embodiments with FIGS. 11, 17, 18 and 21A also provide an additional advantage over embodiment with FIG. 7 that the entire battery system can be bypassed or disconnected by closing just 2 switching devices and keeping open the rest of the switching devices.

It shall be understood that other electronics components such as resistor, inductor, capacitors etc. can also be coupled to the circuit module described in earlier embodiments.

It shall be understood that any of the above described embodiments of the inventions may be adopted based on parameters such as strength and drawback of each of these embodiments, the battery cell properties such as battery type (including chemistry, battery size and others), type of the terminal used on the battery packs, battery cost, battery voltage, longevity of the cell, fault probability of the battery cell, switching device properties (including type, resistance/energy losses, longevity of the switching device), application type (including utilisation and importance of reliability), difficulty in changing battery cell packs, and other practical scenarios.

Interpretation

This specification, including the claims, is intended to be interpreted as follows: Embodiments or examples described in the specification are intended to be illustrative of the invention, without limiting the scope thereof. The invention is capable of being practised with various modifications and additions as will readily occur to those skilled in the art. Accordingly, it is to be understood that the scope of the invention is not to be limited to the exact construction and operation described or illustrated, but only by the following claims.

The mere disclosure of a method step or product element in the specification should not be construed as being essential to the invention claimed herein, except where it is either expressly stated to be so or expressly recited in a claim.

The terms in the claims have the broadest scope of meaning they would have been given by a person of ordinary skill in the art as of the relevant date.

The terms "a" and "an" mean "one or more", unless expressly specified otherwise.

Neither the title nor the abstract of the present application is to be taken as limiting in any way as the scope of the claimed invention.

Where the preamble of a claim recites a purpose, benefit or possible use of the claimed invention, it does not limit the claimed invention to having only that purpose, benefit or possible use.

In the specification, including the claims, the term "comprise", and variants of that term such as "comprises" or "comprising", are used to mean "including but not limited to", unless expressly specified otherwise, or unless in the context or usage an exclusive interpretation of the term is required.

The disclosure of any document referred to herein is incorporated by reference into this patent application as part of the present disclosure, but only for purposes of written description and enablement and should in no way be used to limit, define, or otherwise construe any term of the present application where the present application, without such incorporation by reference, would not have failed to provide an ascertainable meaning. Any incorporation by reference does not, in and of itself, constitute any endorsement or ratification of any statement, opinion or argument contained in any incorporated document.

Reference to any background art or prior art in this specification is not an admission such background art or prior art constitutes common general knowledge in the relevant field or is otherwise admissible prior art in relation to the validity of the claims.

The claims defining the invention are as follows:

1. A circuit module for coupling a plurality of battery cell units, the circuit module including
   a first set of terminals having a positive terminal and a negative terminal for coupling to a first battery cell unit,
   a second set of terminals having a positive terminal and a negative terminal for coupling to a second battery cell unit,
   a third set of terminals having a positive terminal and a negative terminal for coupling to a third battery cell unit, and
   a fourth set of terminals having a positive terminal and a negative terminal for coupling to a fourth battery cell unit,
   the positive terminal of the first set of terminals being coupled to the negative terminal of the second set of terminals either directly or via one or more passive components,
   the positive terminal of the third set of terminals being coupled to the negative terminal of the fourth set of terminals either directly or via one or more passive components,
   the negative terminal of the first set of terminals, the positive terminal of the second set of terminals, at least one of the terminals of the third set of terminals and at least one of the terminals of the fourth set of terminals each being coupled to a switching assembly, and
   wherein the switching assemblies are operatively configured to selectively connect or disconnect each one of the battery cell units, each switching assembly including one or more switching devices, each switching device operable in a conductive state and a non-conductive state,
   wherein the switching assemblies are operatively configured to selectively allow operating in a plurality of states in which any two or more battery cell units are connected in series, each state including a charging cycle and a discharging cycle of the battery cell units connected in series, the plurality of states including
a first state in which the first battery cell unit and the second battery cell unit are electrically connected in series and the third battery cell unit is disconnected,
a second state in which the second battery cell unit and the third battery cell unit are electrically connected in series and the first battery cell unit is disconnected,
a third state in which the first battery cell unit, the second battery cell unit, the third battery cell unit and the fourth battery cell unit are electrically connected in series,
a fourth state in which the first battery cell unit and the fourth battery cell unit are electrically connected in series and the second battery cell unit and the third battery cell unit are disconnected; and
wherein the first battery cell unit, the second battery cell unit, the third battery cell unit and the fourth battery cell unit are adjacently positioned to one another such that the third state is achieved via a connection path having a minimum number of conducting switching devices within the circuit module, and
wherein when the second battery cell unit and the third battery cell unit are connected in series, a series connection path between the second battery cell unit and the third battery cell unit includes a maximum of two switching devices operating in the conductive state.

2. The circuit module of claim 1, wherein the switching assemblies are operatively configured to selectively allow operating in a plurality of connection modes, the plurality of connection modes including
a first connection mode in which a series-connection of two or more battery cell units connect to the circuit module output in a first electrical polarity, and
a second connection mode in which a series-connection of two or more battery cell units connect to the circuit module output in a second polarity that differs from the electrical polarity of the first electrical polarity.

3. The circuit module of claim 1, wherein a series connection path between the second battery cell unit and the third battery cell unit includes a maximum of one switching device operating in the conductive state when the second battery cell unit and the third battery cell unit are connected in series.

4. The circuit module of claim 1, wherein the circuit module is configured to connect a battery cell unit to a non-adjacent battery cell unit with at most one closed switch in a current path therebetween.

5. The circuit module of claim 1, wherein the ratio of conductive switching devices to battery cell units is less than one during operation of the circuit module in any switching state of the switching assemblies.

6. The circuit module of claim 1, wherein a ratio of conducting switching devices to active battery cell units is less than one during operation of the circuit module in one of the plurality of states.

7. The circuit module of claim 1, wherein a ratio of conducting switching devices to active battery cell units is less than one during operation of the circuit module in one of the plurality of states.

8. The circuit module of claim 1, wherein each switching assembly includes a first switching device for connecting an associated battery cell unit, and a second switching device for disconnecting the associated battery cell unit.

9. The circuit module of claim 1, wherein the switching assemblies include one or more transistors.

10. The circuit module of claim 1, wherein the switching assemblies are operatively configured to selectively connect or disconnect any one or more of the battery cell units according to a desired total voltage output from the plurality of battery cell units.

11. The circuit module of claim 1, further including a battery mount configured to allow one or more battery cell units to be mounted for coupling to the circuit module, wherein all switching assemblies of the circuit module are located to one side of the battery mount.

12. The circuit module of claim 1, further including a controller configured to control the switching assemblies of the circuit module.

13. The circuit module of claim 12, wherein the controller is configured to control the switching assemblies based on a determined charge and discharge behaviour of the battery cell units.

14. The circuit module of claim 12, wherein the controller is configured to determine the charge and discharge behaviour of each battery cell unit based on the voltage, current and/or temperature of the battery cell unit during charging and/or discharging.

15. The circuit module of claim 12, wherein the controller is configured to:
compare a measured voltage, current and/or temperature of the battery cell unit with predetermined voltage, current and/or temperature ranges,
determine the battery cell units to connect and/or bypass based on the comparison, and
control the switching assemblies to connect or bypass each battery cell unit based on the determination.

16. A battery system including:
one or more circuit modules of claim 1, and
a plurality of battery cell units coupled to the circuit module.

* * * * *